United States Patent
Hyodo et al.

(10) Patent No.: US 6,257,209 B1
(45) Date of Patent: Jul. 10, 2001

(54) EVAPORATIVE FUEL PROCESSING APPARATUS FOR LEAN-BURN INTERNAL COMBUSTION ENGINE

(75) Inventors: Yoshihiko Hyodo, Gotenba; Naoya Takagi, Susono; Motoki Ohtani, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/261,169

(22) Filed: Mar. 3, 1999

(30) Foreign Application Priority Data

Mar. 18, 1998 (JP) .................................................. 10-068965
Apr. 17, 1998 (JP) .................................................. 10-108180

(51) Int. Cl.⁷ .................................................. F02M 37/04
(52) U.S. Cl. ........................................ 123/520; 123/516
(58) Field of Search .................................. 123/520, 519, 123/518, 521, 198 D, 516

(56) References Cited

U.S. PATENT DOCUMENTS

| 5,245,975 | 9/1993 | Ito . |
| 5,438,967 | 8/1995 | Ito . |
| 5,613,481 | 3/1997 | Kitagawa et al. . |
| 5,632,261 | 5/1997 | Maki et al. . |
| 5,655,507 | 8/1997 | Kawasaki . |
| 5,699,778 | 12/1997 | Muraguchi et al. . |
| 5,765,372 | 6/1998 | Mitobe et al. . |
| 6,079,397 | 6/2000 | Matsumoto et al. . |

FOREIGN PATENT DOCUMENTS

| 4402588 | 1/1994 | (DE) . |
| 19538786 | 10/1995 | (DE) . |
| WO 97/23721 | 7/1997 | (DE) . |
| 0 719 926 A2 | 7/1996 | (EP) . |
| 0 848 156 A2 | 6/1998 | (EP) . |
| 0 893 593 A2 | 1/1999 | (EP) . |
| 0 931 921 A1 | 7/1999 | (EP) . |
| 57-143155 | 9/1982 | (JP) . |
| 63-51148 | 4/1988 | (JP) . |
| 4-194354 | 7/1992 | (JP) . |
| 4-295150 | 10/1992 | (JP) . |
| 5-71430 | 3/1993 | (JP) . |
| 5-223017 | 8/1993 | (JP) . |
| 6-137190 | 5/1994 | (JP) . |
| 6-147033 | 5/1994 | (JP) . |
| 6-200794 | 7/1994 | (JP) . |
| 8-177572 | 7/1996 | (JP) . |

Primary Examiner—Carl S. Miller
(74) Attorney, Agent, or Firm—Oliff & Berridge, PLC

(57) ABSTRACT

In an internal combustion engine in which a throttle valve is substantially fully opened in most of the operating regions such as an in-cylinder injection type internal combustion engine, a technique is provided capable of effectively processing an evaporative fuel while stabilizing a combustion state of the internal combustion engine even in the case that an amount of evaporative fuel generated in a fuel tank or the like is increased. To achieve this technique, a purge amount of evaporative fuel is increased by increasing a differential pressure between an upstream portion and a downstream portion of a purge passage, and the differential pressure between an upstream portion and a downstream portion of a purge passage, and the differential pressure is adjusted in accordance with the combustion state of the internal combustion engine at that time, thereby making it possible to purge the maximum amount of evaporative fuel within a range in which the combustion state is not unstabilized.

19 Claims, 28 Drawing Sheets

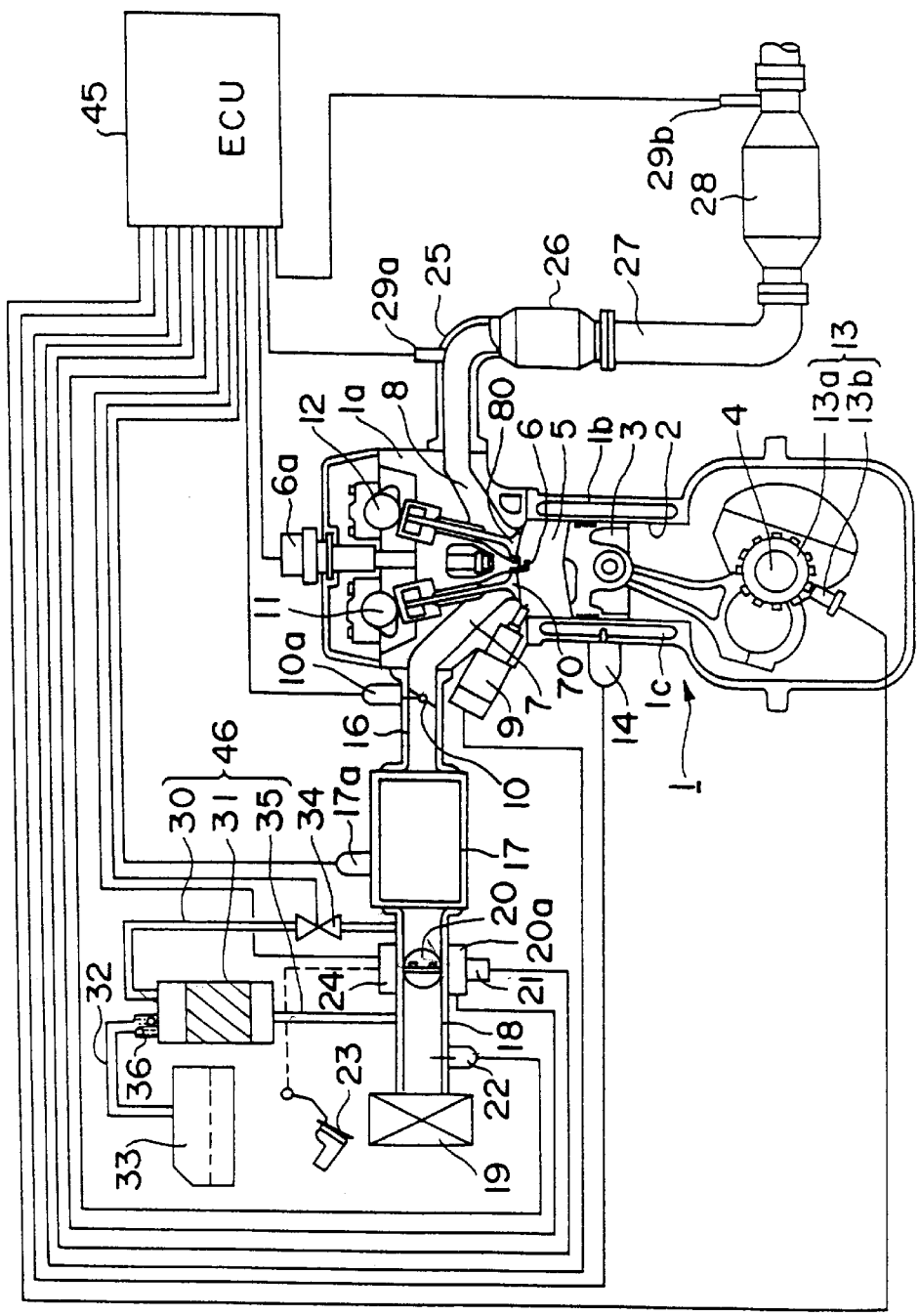
F I G. 1

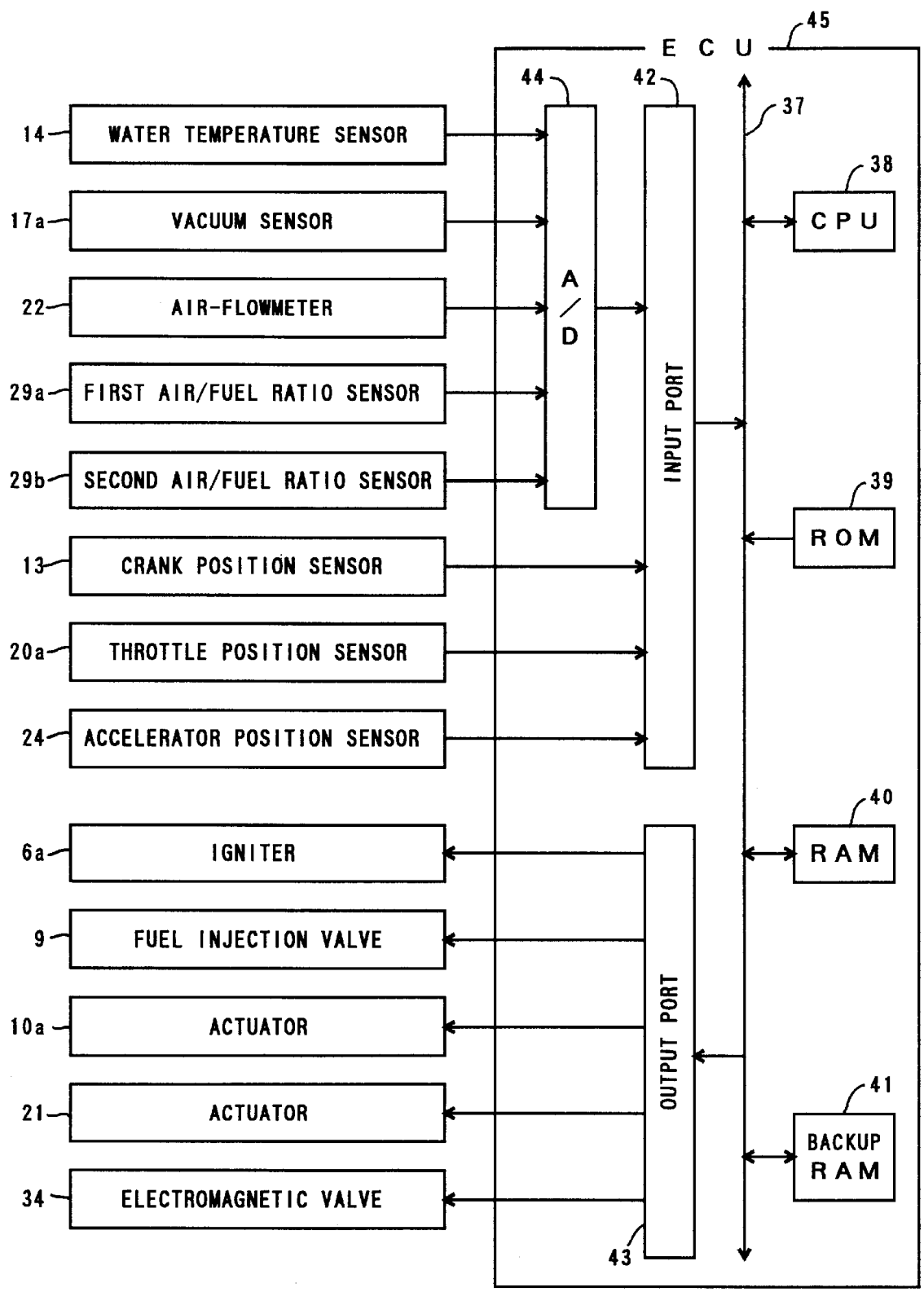
F I G. 2

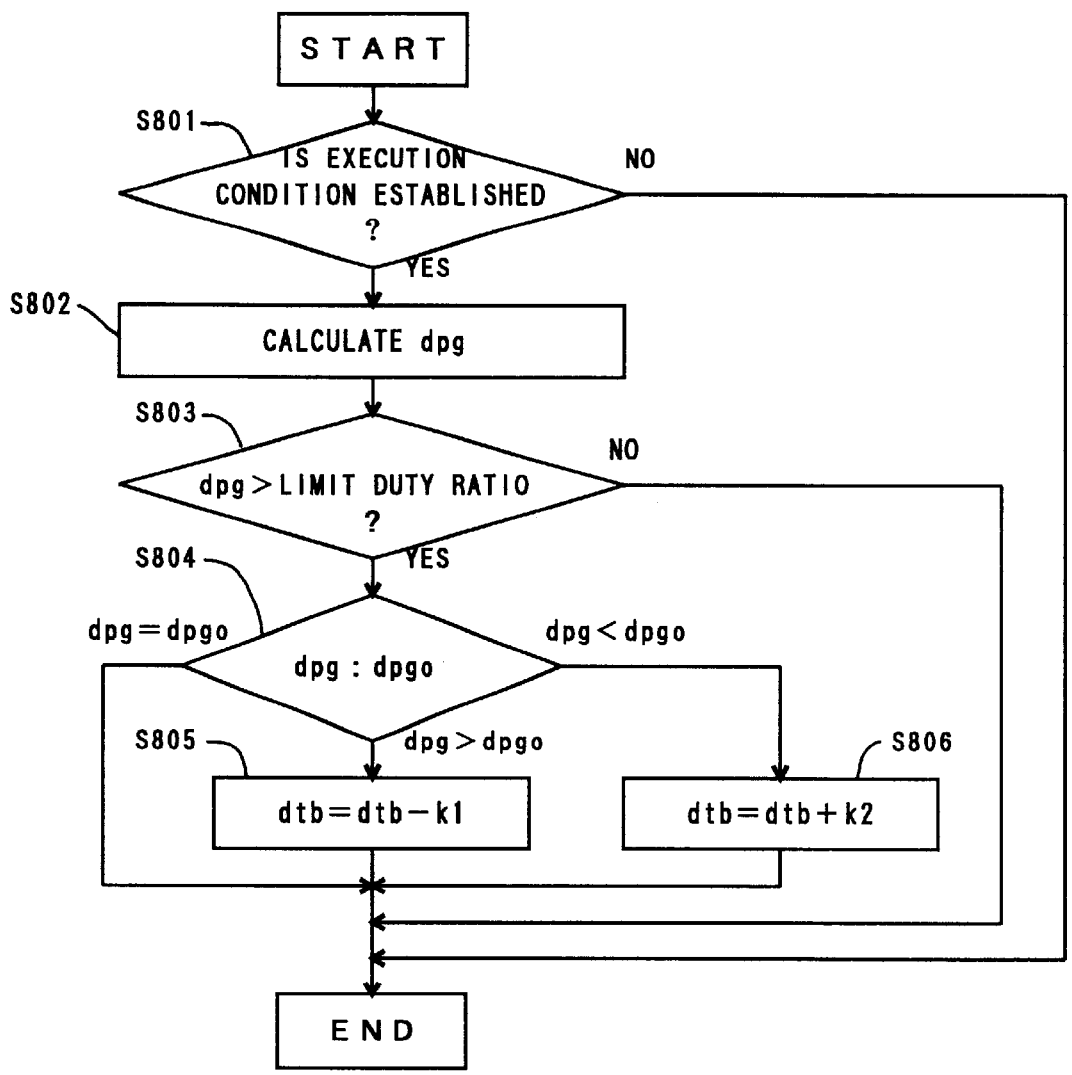
F I G. 8

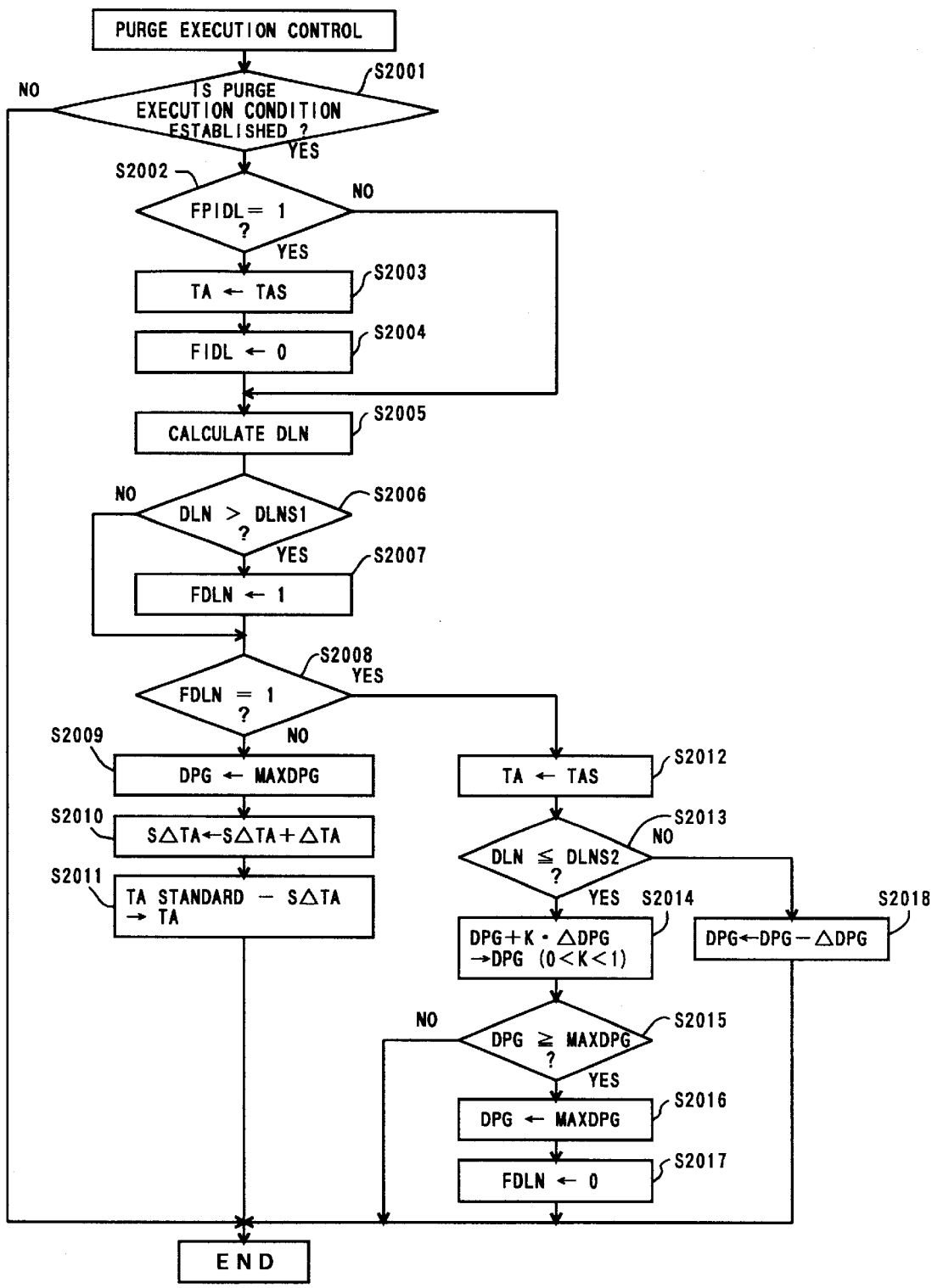
F I G. 2 0

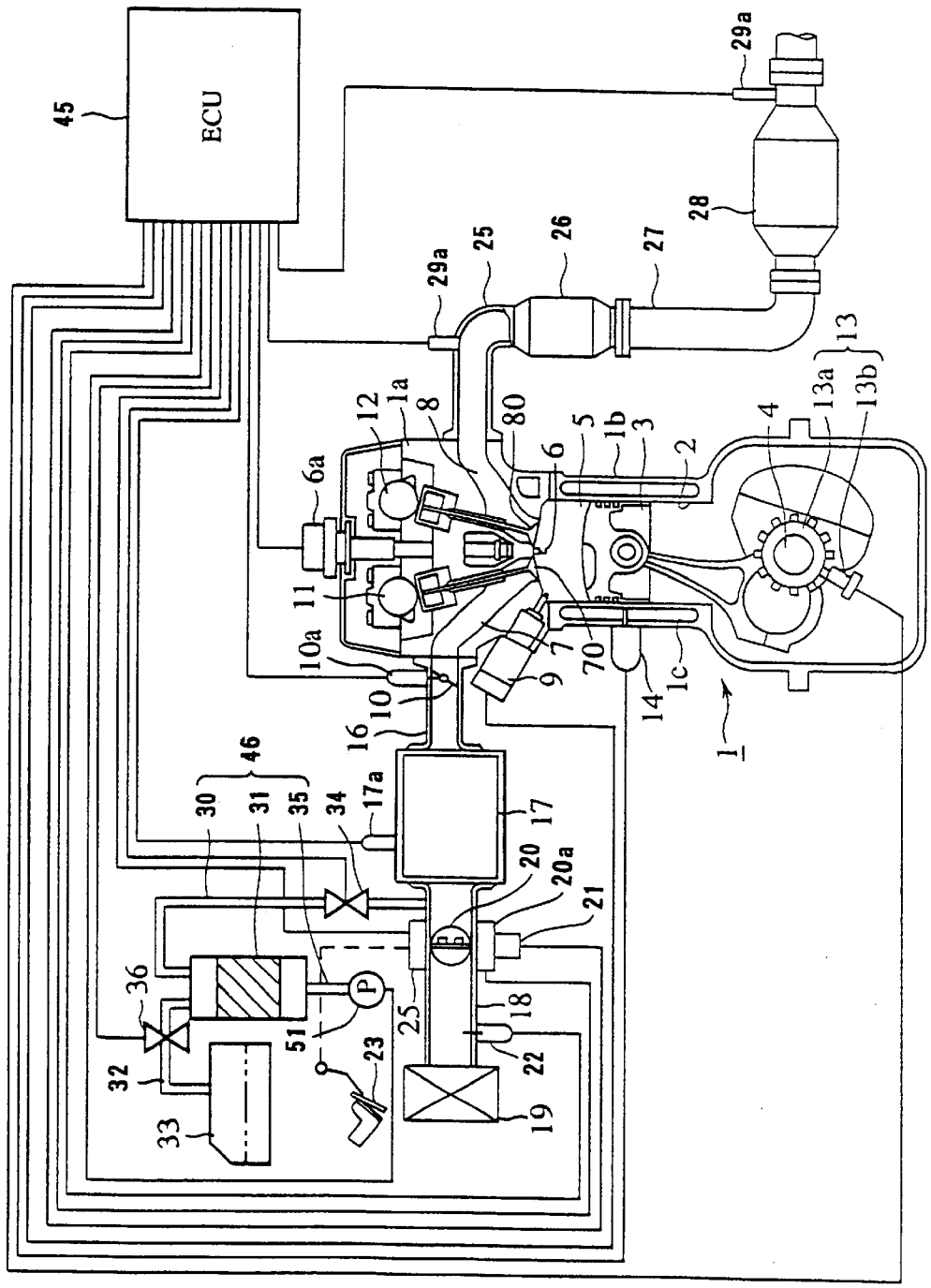
F I G. 21

EVAPORATIVE FUEL PROCESSING APPARATUS FOR LEAN-BURN INTERNAL COMBUSTION ENGINE

BACKGROUND TECHNIQUE

The present invention relates to a technology for processing an evaporative fuel generated in a fuel tank or the like provided in parallel to an internal combustion engine of an automobile or the like.

Concerning the internal combustion engine mounted in an automobile or the like, the development of a lean-burn internal combustion engine capable of burning a mixture having air/fuel ratio (excessive oxygen state) higher than a theoretical air/fuel ratio has been pursued for reducing a consumption amount of fuel. As such a lean-burn internal combustion engine, there is known an internal combustion engine of an in-cylinder injection type in which a fuel injection valve is mounted such that an injection hole faces a combustion chamber.

In the in-cylinder injection type internal combustion engine, in a low-load operating region, new air is introduced into the combustion chamber in an intake stroke, fuel is injected from the fuel injection valve in a subsequent compression stroke so that a combustible mixture is formed only in the vicinity of an ignition plug. That is, the mixture in the combustion chamber becomes a so-called stratified state which has a combustible mixture layer in the vicinity of the ignition plug, and an air layer in other region except in the vicinity of the ignition plug. In the case of the stratified mixture, the combustible mixture layer in the vicinity of the ignition plug is burned as an ignition source.

In the case of the in-cylinder injection type internal combustion engine, new air is introduced into the combustion chamber in the intake stroke in a medium-load operating region, and fuel is injected from the fuel injection valve at the same time. At that time, an amount of fuel injected from the fuel injection valve is an amount in which a ratio of an amount of new air to an amount of fuel is higher than the theoretical air/fuel ratio. In this case, lean mixture in which fuel and new air are uniformly mixed is formed substantially in the entire region in the combustion chamber.

In the case of the in-cylinder injection type internal combustion engine, new air is introduced into the combustion chamber in the intake stroke in a high-load operating region, and fuel is injected from the fuel injection valve at the same time. At that time, an amount of fuel injected from the fuel injection valve is an amount in which a ratio of an amount of new air to an amount of fuel is substantially equal to the theoretical air/fuel ratio. In this case, stoichiometric mixture in which fuel and new air are uniformly mixed is formed in the entire region in the combustion chamber.

In the case of the in-cylinder injection type internal combustion engine, since the lean-burn can be realized in the low-load and medium-load operating regions in this manner, a fuel consumption amount can largely be reduced.

On the other hand, an evaporative fuel processing apparatus is provided in an internal combustion engine for processing evaporative fuel generated in a fuel tank or the like. Such an evaporative fuel processing apparatus is composed of a charcoal canister for once storing evaporative fuel generated in the fuel tank, an atmosphere introducing passage for introducing atmosphere into the charcoal canister, a negative pressure introducing passage for introducing an intake pipe negative pressure generated in an intake passage downstream of a throttle valve into the charcoal canister, and a flow rate control valve for adjusting flow rate in the negative pressure introducing passage.

In the evaporative fuel processing apparatus structured as described above, the evaporative fuel generated in the fuel tank is adsorbed by an adsorbent such as active carbon incorporated in the charcoal canister while a flow rate control valve is closed. If the flow rate control valve is opened, an intake pipe negative pressure generated in the intake passage is applied to the charcoal canister through the negative pressure introducing passage, and the charcoal canister is evaporated into negative pressure. If the pressure in the charcoal canister becomes negative, the atmosphere is drawn from the atmosphere introducing passage into the charcoal canister, and the atmosphere drawn into the charcoal canister is drawn into the intake passage through the negative pressure introducing passage. That is, a flow of atmosphere flowing through the charcoal canister is generated.

The evaporative fuel adsorbed by the adsorbent in the charcoal canister is separated from the adsorbent due to the atmosphere flowing through the charcoal canister, and is introduced into the intake passage together with the atmosphere. The evaporative fuel introduced into the intake passage is introduced into the combustion chamber of the internal combustion engine while being mixed with new air from upstream the intake passage, and is burned and processed together with fuel injected from the fuel injection valve.

In the in-cylinder injection type internal combustion engine, the throttle valve is substantially fully opened in most of the operating regions except at the time of extremely low-load operating so as to reduce the driving loss due to a pumping function and therefore, the intake pipe negative pressure is not generated easily in the intake passage downstream the throttle valve. As a result, it is difficult to form a flow of atmosphere flowing through the charcoal canister, and it is difficult to introduce the evaporative fuel in the charcoal canister into the intake system and to process the same.

With respect to such a problem, there is known an evaporative fuel processing apparatus for an internal combustion engine described in Japanese Patent Application Laid-open No.5-71430. According to this evaporative fuel processing apparatus for an internal combustion engine, an atmosphere intake of the charcoal canister and an intake pipe negative pressure intake are opened in an engine intake passage which generates substantially the same static pressure, and an opening direction of the air intake is directed toward the upstream portion of the intake air flow, thereby introducing the evaporative fuel into the engine intake passage utilizing a difference in pressure between the dynamic pressure of the intake air flow acting on the air intake and the static pressure acting on the intake negative pressure intake.

However, in the case that the throttle valve is substantially fully opened, a difference between the static pressure and the dynamic pressure of the intake air flow is substantially constant over a wide operating region. Therefore, in the case that the amount of evaporative fuel is abruptly increased such when a temperature in the fuel tank rises, there is a problem that the evaporative fuel can not be introduced into the intake system so that all the evaporative fuel can not be processed.

Further, in the case that the evaporative fuel processing apparatus is applied to the in-cylinder injection type internal combustion engine, if the in-cylinder injection type internal combustion engine is in the stratified combustion operating state, since the evaporative fuel is supplied into the combustion chamber while being mixed with intake air, there is a problem that a stratified state is not established in the combustion chamber, and the combustion state becomes unstable.

With respect to such a problem, there is known an in-cylinder injection type internal combustion engine described in Japanese Patent Application Laid-open No. 4-194354. In this in-cylinder injection type internal combustion engine, evaporative fuel is supplied to an intake passage only when an engine load is equal to or greater than a predetermined authorized load. That is, the evaporative fuel is supplied to the intake passage only when the internal combustion engine is in a homogenous combustion operating state so that the evaporative fuel is processed without unstabilizing the combustion state.

However, in the in-cylinder injection type internal combustion engine, since the throttle valve is substantially fully opened even at the time of the homogenous combustion operating, it is difficult to generate the intake pipe negative pressure in the intake passage downstream the throttle valve. Therefore, in the case that the amount of evaporative fuel is abruptly increased, there is a problem that all the evaporative fuel can not be processed.

On the other hand, in the in-cylinder injection type internal combustion engine, a method for controlling the throttle valve toward the closing side so as to increase the intake pipe negative pressure might seem to be possible. However, since degree of negative pressure of the intake pipe negative pressure is abruptly increased, the amount of evaporative fuel to be supplied to the internal combustion engine is abruptly increased, and there is a problem that the combustion state of the internal combustion engine becomes unstable.

SUMMARY OF THE INVENTION

In an internal combustion engine in which a throttle valve is substantially fully opened in most of operating regions such as an in-cylinder injection type internal combustion engine, a first object of the present invention is to provide a technique capable of effectively processing an evaporative fuel even in the case that an amount of evaporative fuel is increased.

To achieve the first object, the present invention employs the following means. That is, an evaporative fuel processing apparatus for a lean-burn internal combustion engine of the present invention comprises: the lean-burn internal combustion engine capable of burning a mixture excessively containing oxygen;

a purge passage for introducing an evaporative fuel generated in a fuel tank provided in parallel to the lean-burn internal combustion engine into an intake system of the lean-burn internal combustion engine;

evaporative fuel amount calculating means for calculating a required evaporative fuel amount to be introduced into the intake system based on a state of the fuel tank and a state of the lean-burn internal combustion engine; and differential pressure changing means for changing a differential pressure between the upstream portion and the downstream portion of the purge passage in accordance with the required evaporative fuel amount.

In the evaporative fuel processing apparatus structured as described above, since the differential pressure between the upstream portion and the downstream portion of the purge passage is changed in accordance with the required evaporative fuel amount, for example, in the case that the required evaporative fuel amount is large, the flow rate of the purge passage is increased by increasing the differential pressure between the upstream portion and the downstream portion of the purge passage, and the required evaporative fuel amount is securely purged.

Therefore, according to the present invention, the flow rate of the purge passage can arbitrary be increased or reduced, and even when the required evaporative fuel amount is increased, the required evaporative fuel amount is securely purged.

The differential pressure changing means may be actuated when the required evaporative fuel amount exceeds a predetermined amount, and may change the differential pressure between the upstream portion and the downstream portion of the purge passage. That is, in the case that the required evaporative fuel amount can be purged with a differential pressure at a point of time when the evaporative fuel is purged, the differential pressure between the upstream portion and the downstream portion of the purge passage is not changed. In this case, it is possible to suppress, to the minimum, the change of the operating state of the internal combustion engine due to the purge.

However, if the differential pressure between the upstream portion and the downstream portion of the purge passage is abruptly changed, a pressure in the intake system is abruptly varied, and there is a problem that the operating state of the internal combustion engine is abruptly changed. Therefore, the differential pressure changing means may determine an amount of change of the differential pressure in accordance with the operating state.

Further, the differential pressure changing means may adjust an opening degree of a throttle valve provided in the intake system, and may change the differential pressure between the upstream portion and the downstream portion of the purge passage. This is based on the knowledge that in the case that one end of the purge passage is connected to the intake system downstream the throttle valve, if the opening degree of the throttle valve is changed, a pressure in the intake system downstream the throttle valve is also changed, as a result, the differential pressure between the upstream portion and the downstream portion of the purge passage is changed.

Further, in the case that a supercharger is mounted in the intake system of the internal combustion engine, the differential pressure changing means may control an operating state of a supercharger, and may change the differential pressure between the upstream portion and the downstream portion of the purge passage. For example, if the operating state of the supercharger is controlled to change the supercharging pressure, the pressure of the intake system is also changed and thus, it is possible to change the differential pressure between the upstream portion and the downstream portion of the purge passage by controlling the operating state of the supercharger so as to positively increase or reduce the supercharging pressure.

At that time, the differential pressure changing means may selectively control a throttle valve and an operating state of the supercharger, and may change the differential pressure between the upstream portion and the downstream portion of the purge passage.

Next, in an internal combustion engine in which a throttle valve is substantially fully opened in most of the operating regions such as the in-cylinder injection type internal combustion engine, a second object of the present invention is to provide a technique capable of increasing the purge amount of evaporative fuel while stabilizing the combustion state of the internal combustion engine.

To achieve the second object, the present invention employs the following means.

That is, an evaporative fuel processing apparatus for an internal combustion engine of the present invention, comprises: the lean-burn internal combustion engine capable of burning a mixture excessively containing oxygen;

- a purge passage for introducing an evaporative fuel generated in a fuel tank provided in parallel to the lean-burn internal combustion engine into an intake passage of the lean-burn internal combustion engine;
- a flow rate control valve for adjusting a flow rate of the purge passage;
- combustion state determining means for determining whether a combustion state of the lean-burn internal combustion engine is stable at a time when a purge of the evaporative fuel is executed;
- differential pressure changing means for changing a differential pressure between the upstream portion and the downstream portion of the purge passage; and
- purge control means for controlling at least the differential pressure changing means in accordance with the combustion state of the lean-burn internal combustion engine to adjust an amount of evaporative fuel to be introduced from the purge passage into the intake passage.

In the evaporative fuel processing apparatus structured as described above, if the flow rate control valve is opened, a so-called purge of the evaporative fuel is executed by which the evaporative fuel generated in the fuel tank is introduced into the intake passage through the purge passage. At that time, the purge control means controls at least the differential pressure changing means in accordance with the combustion state determined by the combustion state determining means to adjust the amount of evaporative fuel to be introduced from the purge passage into the intake passage.

In this case, the amount of evaporative fuel to be introduced from the purge passage into the intake passage is adjusted such that the combustion state of the lean-burn internal combustion engine does not become unstable and as a result, the purge amount of evaporative fuel is increased in a range in which the combustion state of the lean-burn internal combustion engine does not become unstable.

Therefore, according to the present invention, the purge amount of evaporative fuel can be increased in a range in which the combustion state of the lean-burn internal combustion engine does not become unstable, and it is possible both to stabilize the combustion state and to ensure the purge amount.

When the purge amount of evaporative fuel is adjusted, for example, as long as the combustion state is stable, the purge control means may control the differential pressure changing means so as to increase the differential pressure between the upstream portion and the downstream portion of the purge passage, and may increase the amount of evaporative fuel to be introduced from the purge passage into the intake passage.

The purge control means may control the differential pressure changing means so as to reduce the differential pressure between the upstream portion and the downstream portion of the purge passage, and may reduce the amount of evaporative fuel to be introduced from the purge passage into the intake passage when the combustion state determining means determines that the combustion state of the lean-burn internal combustion engine is unstable.

In this case, the purge amount of evaporative fuel is kept increasing as long as the combustion state of the lean-burn internal combustion engine is stable. When the combustion state of the lean-burn internal combustion engine becomes unstable, the purge amount is reduced to stabilize the combustion state of the lean-burn internal combustion engine. As a result, the purge amount of evaporative fuel becomes maximum within a rage in which the combustion state of the lean-burn internal combustion engine does not becomes unstable, and it is possible both to stabilize the combustion state of the lean-burn internal combustion engine and to ensure the purge amount of evaporative fuel at the same time.

Further, in order to purge the evaporative fuel as much as possible within a range in which the combustion state of the lean-burn internal combustion engine does not becomes unstable, it is preferable to finely adjust the purge amount in the vicinity or the limit region of the purge amount.

The purge control means may control the differential pressure changing means so as to maintain the current differential pressure between the upstream portion and the downstream portion of the purge passage, and may correct an opening degree of the flow rate control valve by a predetermined amount in its closing direction when the combustion state determining means determines that the combustion state is unstable at the time when the purge of the evaporative fuel is executed.

The purge control means may correct the opening degree of the flow rate control valve by the correction amount less than the predetermined amount in its opening direction when the combustion state determining means determines that the combustion state is stable after the opening degree of the flow rate control valve is corrected by the predetermined amount in its closing direction.

On the other hand, the purge control means may control the differential pressure changing means so as to reduce the differential pressure between the upstream portion and the downstream portion of the purge passage when the combustion state determining means determines that the combustion state is unstable after the opening degree of the flow rate control valve is corrected by the predetermined amount in its closing direction.

When the combustion state determining means determines that the combustion state is unstable at the time when the purge of the evaporative fuel is executed, the purge control means may control the differential pressure changing means so as to reduce the differential pressure between the upstream portion and the downstream portion of the purge passage, while controlling the flow rate control valve so as to maintain the current opening degree.

The purge control means may correct the opening degree of the flow rate control valve by a predetermined amount in its opening direction when the combustion state determining means determines that the combustion state is stable after the differential pressure between the upstream portion and the downstream portion of the purge passage is reduced.

On the other hand, the purge control means may control the differential pressure changing means so as to further reduce the differential pressure between the upstream portion and the downstream portion of the purge passage when the combustion state determining means determines that the combustion state is unstable after the differential pressure between the upstream portion and the downstream portion of the purge passage is reduced.

In short, it is preferable that the purge control means finely adjust the amount of evaporative fuel to be introduced from the purge passage into the intake passage by controlling the flow rate control valve, together with roughly adjusting the amount of evaporative fuel to be introduced from the purge passage into the intake passage by controlling the differential pressure changing means.

Further, the differential pressure changing means may be a throttle valve which maintains a first opening degree so as to be in substantially fully opened state in a normal operating region, and which is controlled so as to be a second opening degree closed narrower than the first opening degree when the purge is executed, or a positive pressure pump for pumping atmosphere having a desired pressure toward the downstream portion from the upstream portion of the purge passage.

Further, the purge control means may control the differential pressure changing means so as to return the differential pressure between the upstream portion and the downstream portion of the purge passage to a normal differential pressure when the operating state of the internal combustion engine is changed. This is based on the knowledge of the present inventors that in the case that the operating state of the internal combustion engine is shifted from non-idling state to idling state, or from homogenous combustion state to stratified combustion state when the purge is being executed, or in the case that the amount of evaporative fuel to be purged is reduced, the combustion state can be stabilized by returning the differential pressure between the upstream portion and the downstream portion of the purge passage to a normal differential pressure, and further can suppress the driving loss due to the pumping operation of intake air.

BRIEF DESCRIPTION OF THE DRAWINGS

FIG. 1 is a schematic configuration diagram of an internal combustion engine to which an evaporative fuel processing apparatus according to a first embodiment is applied;

FIG. 2 is a diagram showing an inside structure of an ECU 45;

FIG. 8 is a flowchart showing a purge execution control routine according to the third embodiment;

FIG. 20 is a flowchart showing a purge execution control routine according to the ninth embodiment;

FIG. 21 is a schematic configuration diagram of an internal combustion engine to which an evaporative fuel processing apparatus according to a tenth embodiment is applied;

DESCRIPTION OF PREFERRED EMBODIMENTS OF THE INVENTION

Figure 3:
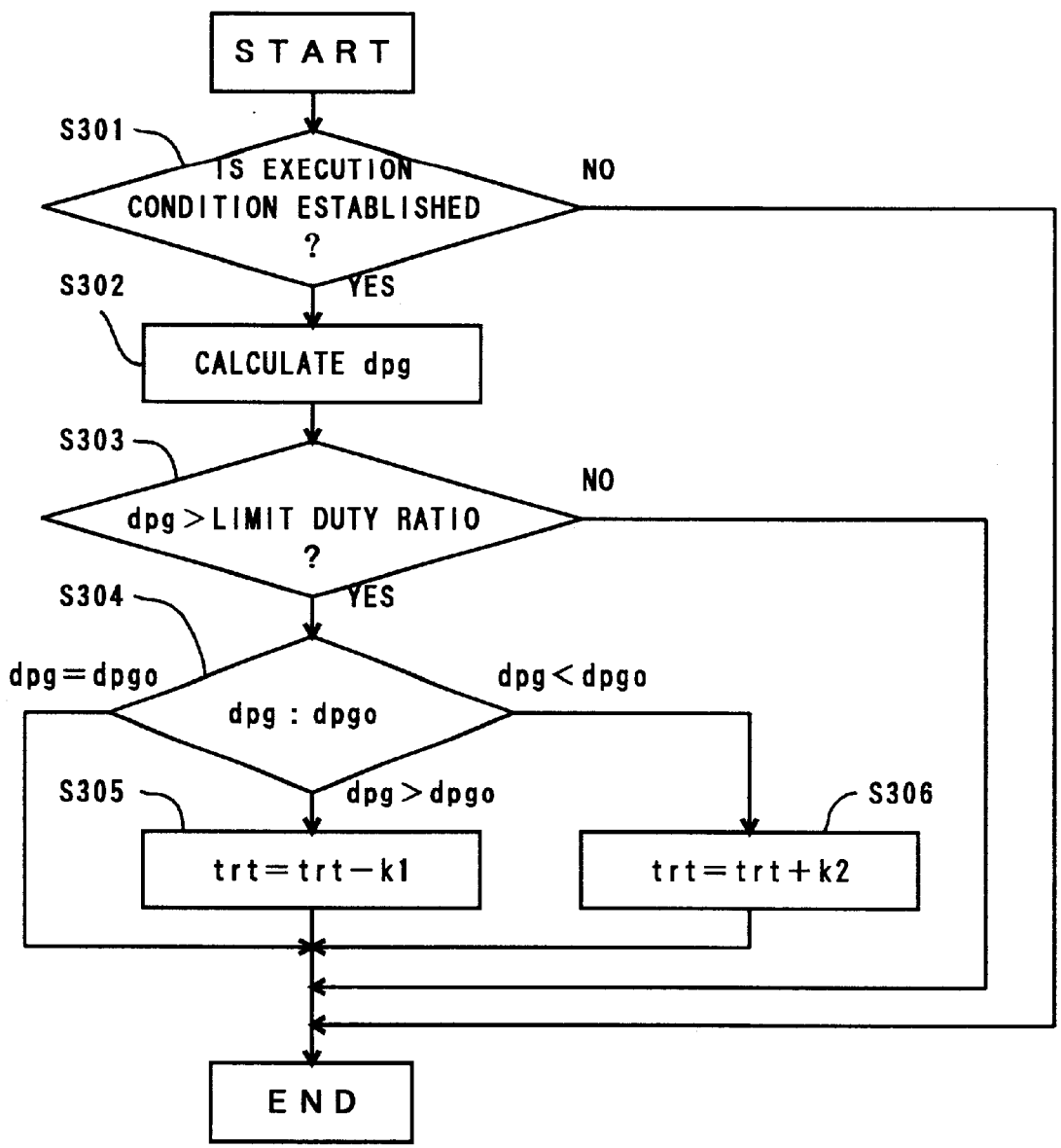
FIG. 3 is a flowchart (1) showing a concrete example of a purge execution control routine according to the first embodiment.

Embodiments of an evaporative fuel processing apparatus for a lean-burn internal combustion engine according to the present invention will be explained based on the drawings below.

FIRST EMBODIMENT

A first embodiment of the evaporative fuel processing apparatus according to the present invention will be explained based on FIGS. 1 to 4.

FIG. 1 is a schematic configuration diagram of an internal combustion engine to which an evaporative fuel processing apparatus for a lean-burn internal combustion engine is applied. An internal combustion engine 1 shown in FIG. 1 is a four-cycle in-cylinder injection type internal combustion engine comprising a plurality of cylinders 2 and a fuel injection valve 9 for injecting fuel directly into each cylinder 2.

The internal combustion engine 1 comprises a cylinder block 1b in which a plurality of cylinders 2 and a cooling water passage 1c are formed, and a cylinder head 1a fixed to an upper portion of the cylinder block 1b.

A crankshaft 4 which is an engine output shaft is rotatably supported by the cylinder block 1b, and is connected to a piston 3 which is slidably fitted in each cylinder 2.

A combustion chamber 5 surrounded by a top surface of the piston 3 and the cylinder head 1a is formed above the piston 3. An ignition plug 6 is mounted to the cylinder head 1a so as to face the combustion chamber 5, and an igniter 6a is mounted to the ignition plug 6 for applying a driving current to the ignition plug 6.

Opening ends of two intake ports 7 and two exhaust ports 8 are formed in the cylinder head 1a so as to face the combustion chamber 5, and a fuel injection valve 9 is mounted to the cylinder head 1a such that its injection hole faces the combustion chamber 5.

Each opening end of the intake and exhaust ports 7 and 8 is opened and closed respectively by intake valves 70 and exhaust valves 80 which are supported by the cylinder head 1a for advancing/retreating movement. The intake valve 70 and the exhaust valve 80 are driven for advancing/retreating movement respectively by an intake-side camshaft 11 and an exhaust-side camshaft 12 which are rotatably supported by the cylinder head 1a.

The intake-side camshaft 11 and the exhaust-side camshaft 12 are connected to the crankshaft 4 through a timing belt (not shown) so that the revolution force of the crankshaft 4 is transmitted to the intake-side camshaft 11 and the exhaust-side camshaft 12 through the timing belt.

One of the intake ports 7 which are communicated with each cylinder 2 is composed of a straight port having a flow passage which is straightly formed from one opening end formed in an outer wall of the cylinder head 1a toward the other opening end facing the combustion chamber 5. The other intake port 7 is composed of a helical port having a flow passage which is formed helically from one opening end formed in the outer wall of the cylinder head 1a toward the other opening end facing the combustion chamber 5.

Each intake port 7 is communicated with each branch in an intake branch pipe 16 mounted to the cylinder head 1a. The branch pipe which is communicated with a straight port in the two intake ports is provided with a swirl control valve 10 for adjusting the flow rate in the branch pipe. An actuator 10a comprising a step motor and the like for opening and closing the swirl control valve 10 in accordance with applied current is mounted to the swirl control valve 10.

The intake branch pipe 16 is connected to a surge tank 17 which is connected to an air cleaner box 19 through an intake pipe 18. A vacuums sensor 17a for outputting an electric signal corresponding to the pressure in the surge tank 17 is mounted to the surge tank 17.

A throttle valve 20 for adjusting the flow rate in the intake pipe 18 is mounted to the intake pipe 18. An actuator 21 comprising a step motor and the like for opening and closing the throttle valve 20 in accordance with applied current is mounted to the throttle valve 20.

A throttle position sensor 20a for outputting an electric signal corresponding to the opening degree of the throttle valve 20 is mounted to the throttle valve 20.

Further, the throttle valve 20 is provided with an accelerator lever (not shown) which rotates in cooperation with an accelerator pedal 23, and an accelerator position sensor 24 for outputting an electric signal corresponding to a revolution position of the accelerator lever (opening degree of the accelerator pedal 23) is mounted to the accelerator lever.

A air flowmeter 22 for outputting electric signal corresponding to mass of new air (intake air mass) flowing in the intake pipe 18 is mounted to the intake pipe 18 upstream the throttle valve 20.

On the other hand, each of the exhaust ports 8 is communicated with each branch pipe in an exhaust branch pipe 25 mounted to the cylinder head 1a, and the exhaust branch pipe 25 is connected to an exhaust pipe 27 through a first catalyst 26. The exhaust pipe 27 is connected with muffler (not shown) at the downstream portion.

A first air/fuel ratio sensor 29a for outputting an electric signal corresponding to an air/fuel ratio of exhaust gas flowing in the exhaust branch pipe 25 is mounted to the exhaust branch pipe 25 upstream the first catalyst 26.

A second catalyst 28 is provided to an intermediate portion of the exhaust pipe 27, and a second air/fuel sensor 29b for outputting an electric signal corresponding to an air/fuel ratio of exhaust gas flowing out from the second catalyst 28 is mounted to the exhaust pipe 27 downstream the second-catalyst 28.

The first catalyst 26 is a three-way catalyst having a volume smaller than that of the second catalyst 28, and the second catalyst 28 is a three-way catalyst, a nitrogen oxide occlusion reduced catalyst or the like.

The internal combustion engine 1 is provided with a fuel tank 33 and a charcoal canister 31 which once stores evaporative fuel generated in the fuel tank 33. The fuel tank 33 and the charcoal canister 31 are connected to each other through an evaporative fuel passage 32. A tank internal pressure control valve 36 is mounted to an intermediate portion of the evaporative fuel passage 32 for opening and closing a flow passage in the evaporative fuel passage 32 in accordance with a pressure in the fuel tank 33.

The tank internal pressure control valve 36 is constituted by combining a positive pressure valve and a negative pressure valve, and is structured such that the positive pressure valve is opened as the pressure in the fuel tank 33 is increased by increase of evaporative fuel, on the other hand, the negative pressure valve is opened as the pressure in the fuel tank 33 is reduced by reduction of fuel.

An atmosphere introducing passage 35 is connected to the charcoal canister 31, and the passage 35 is connected to the intake pipe 18 located between the air flowmeter 22 and the throttle valve 20.

Further, an evaporative fuel exhaust-passage 30 is connected to the charcoal canister 31, and is connected to the intake pipe 18 downstream the throttle valve 20. A solenoid valve 34 is mounted to an intermediate portion of the evaporative fuel exhaust passage 30 for adjusting the flow rate of evaporative fuel exhaust passage 30.

The atmosphere introducing passage 35 and the evaporative fuel exhaust passage 30 communicated with each other through the charcoal canister 31 realizes a purge passage of the present invention (the charcoal canister 31, the atmosphere introducing passage 35 and the evaporative fuel exhaust passage 30 are generally called "purge passage 46 " hereinafter).

Further, the internal combustion engine 1 is provided with an electronic control unit (ECU) 45 for controlling the engine. Connected to the ECU 45 through electric wires are various sensors such as the vacuum sensor 17a, the throttle position sensor 20a, the air flowmeter 22, the accelerator position sensor 24, the first air/fuel ratio sensor 29a, the second air/fuel ratio sensor 29b, a crank position sensor 13 comprising a timing rotor 13a mounted to an end portion of the crankshaft 4 and an electromagnetic pick-up 13b mounted to the cylinder block 1b in the vicinity of the timing rotor 13a, and a water temperature sensor 14 mounted to the cylinder block 1b for detecting the temperature of cooling water flowing in the cooling water passage 1c of the cylinder block 1b.

The igniter 6a, the fuel injection valve 9, the actuators 10a and 21, the solenoid valve 34 and the like are connected to the ECU 45 through electric wires.

The ECU 45 determines an operating state of the internal combustion engine 1, an evaporative fuel adsorbing state of the charcoal canister 31 and the like using output signals from the various sensors as parameters, and in accordance with the result, the ECU 45 controls the igniter 6a, the fuel injection valve 9, the actuators 10a and 21, the solenoid valve 34 and the like As shown in FIG. 2, the ECU 45 comprises a CPU 38, a ROM 39, a RAM 40, a backup RAM 41, an input port 43 and an output port 43 which are connected to each other through a bidirectional bus 37, in addition, the ECU 45 also comprises an A/D converter (A/D) 44 connected to the input port 42.

Signals from the crank position sensor 13, the throttle position sensor 20a and the accelerator position sensor 24 input to the input port 42, and the input port 42 sends the output signals to the CPU 38 or the RAM 40. Further, signals from the water temperature sensor 14, the vacuum sensor 17a, the air flowmeter 22, and the first and second air/fuel ratio sensors 29a and 29b are input to the input port 42 through the A/D converter 44, and the input port 42 send such signals to the CPU 38 or the RAM 40.

The output port 43 outputs a control signal output from the CPU 38 to the igniter 6a, the fuel injection valve 9, the actuator 10a, the actuator 21, the solenoid valve 34 and the like.

The ROM 39 stores therein application programs such as fuel injection amount control routine for determining the fuel injection amount, fuel injection timing control routine for determining the fuel injection timing, ignition timing control routine for determining the ignition timing, or purge execution control routine for executing the purge of the evaporative fuel gas, and various control maps.

The control map is, for example, a fuel injection amount control map showing the relationship between the operating state and the fuel injection amount of internal combustion engine, a fuel injection timing control map showing the relationship between the operating state and the fuel injection timing of the internal combustion engine, an ignition timing control map showing the relationship between the operating state and the ignition timing of the internal combustion engine, a required evaporative fuel gas mount control map showing the relationship between the amount of evaporative fuel to be purged (amount of required evaporative fuel gas) and a state of the internal combustion engine 1, the fuel tank 33 or the charcoal canister 31, a required duty ratio control map showing the relationship between the amount of required evaporative fuel gas and a required opening degree of the solenoid valve 34 (required duty ratio) which is required for purging the amount of required evaporative fuel gas, or the like.

The RAM 40 stores therein the output signals from the various sensors, the calculation results of the CPU 38 and the like. The calculation result is, for example, the number of engine revolutions calculated based on a time interval between signals output from the crank position sensor 13, and the like. The output signals from the various sensors, the calculation results and the like are renewed into the latest data whenever the crank position sensor 13 outputs a signal.

The backup RAM 41 is a nonvolatile memory which holds data even after the internal combustion engine 1 is stopped.

The CPU 38 operates in accordance with the application program stored in the ROM 39, determines the operating state of the internal combustion engine 1, the evaporative fuel adsorbing state of the charcoal canister 31 and the like by the output signals from the various sensors, and calculates the fuel injection amount, the fuel injection timing, the ignition timing, the duty ratio for controlling the solenoid valve 34 and the like from the determination results and the respective control maps. The CPU 38 controls the igniter 6a, the fuel injection valve 9, the actuators 10a and 21, the solenoid valve 34 and the like based on the calculation results.

For example, in the case that the CPU 38 determines that the operating state of the internal combustion engine 1 is in a low-load operating region lower than the output signals from the various sensors, in order to realize the stratified combustion, the CPU 38 sends a control signal to the actuator 10a to reduce the opening degree of the swirl control valve 10, sends a control signal to the actuator 21 to substantially fully open the throttle valve 20, and applies a driving current to the fuel injection valve 9 at the time of the compression stroke of each cylinder 2 to carry out the compression stroke injection. In this case, in the combustion chamber 5 of each the cylinder 2, a combustible mixture layer is formed only in the vicinity of the ignition plug 6, an air layer is formed in other regions, and the stratified combustion is realized.

In the case that the CPU 38 determines that the engine operating state is in a medium-load operating region, in order to realize the homogeneous combustion by lean mixture, the CPU 38 sends a control signal to the actuator 10a to reduce the opening degree of the swirl control valve 10, and further applies a driving current to the fuel injection valve 9 at the time of the intake stroke of each cylinder 2 to carry out the intake stroke injection. In this case, lean mixture in which air and fuel are uniformly mixed is formed in substantially the entire region in the combustion chamber 5 of each the cylinder 2, and the homogeneous combustion is realized.

In the case that the CPU 38 determines that the engine operating state is in a high-load operating region, in order to realize the homogeneous combustion by mixture in the vicinity of the theoretical air/fuel ratio, the CPU 38 sends a control signal to the actuator 10a to fully open the swirl control valve 10, sends a control signal to the actuator 21 such that the opening degree of the throttle valve 20 corresponds to the amount of depression of accelerator pedal 23 (output signal value of the accelerator position sensor 24), and further applies a driving current to the fuel injection valve 9 at the time of the intake stroke of each cylinder 2 to carry out the intake stroke injection. In this case, mixture having the theoretical air/fuel ration in which air and fuel are uniformly mixed is formed substantially in the entire region in the combustion chamber 5 of each cylinder 2, and the homogeneous combustion is realized.

When the control of the CPU 38 is shifted from the stratified combustion control to the homogenous combustion control, or from the homogeneous combustion control to the stratified combustion control, the CPU 38 applies the driving current to the fuel injection valve 9 in two installments at the time of compression stroke and at the time of intake stroke of each the cylinder 2 so as to prevent the torque of the internal combustion engine 1 from being varied. In this case, in the combustion chamber 5 of each cylinder 2, a combustible mixture layer is formed in the vicinity of the ignition plug 6, lean-mixture layer is formed in other regions, and a so-called weak stratified combustion is realized.

For executing the purge of the evaporative fuel, the CPU 38 normally controls to close the solenoid valve 34. As the evaporative fuel amount in the fuel tank 33 is increased in this state and the pressure in the tank exceeds a predetermined value, the tank internal pressure control valve 36 is opened, and the evaporative fuel passage 32 is brought into communication with the fuel tank 33. Then, the evaporative fuel in the fuel tank 33 is introduced into the charcoal canister 31 through the evaporative fuel passage 32, and is once adsorbed by the adsorbent such as active carbon incorporated in the charcoal canister 31.

Further, the CPU 38 determines whether a purge execution condition of the evaporative fuel is established every predetermined time. The purge execution condition is, for example, a condition that a warming-up of the internal combustion engine 1, the first or second catalysts 26 or 28 is completed, a condition that the injection amount from the fuel injection valve 9 is equal to or more than a predetermined amount, a condition that a predetermined time is elapsed after the internal combustion engine 1 is started, and the like.

In the case that the CPU 38 determines that the above-described purge execution condition is established, the CPU 38 determines a state of the internal combustion engine 1 (engine load, torque variation, the number of engine revolution), a state of the evaporative fuel gas (concentration of fuel estimated by the variation value of the exhaust air/fuel ratio by the execution of purge), a state of the fuel tank 33 (amount of evaporative fuel estimated by the pressure in the fuel tank 33), a state of charcoal canister 31 (amount of evaporative fuel adsorbed in the charcoal canister 31), or the like from, for example, an output signal value of the crank position sensor 13, an output signal value of the air flowmeter 22, an output signal value of the first or second air/fuel ratio sensor 29a or 29b, the pressure in the fuel tank 33, the concentration of fuel in the charcoal canister 31, or the like.

Then, the CPU 38 accesses to the required evaporative fuel gas amount control map in the ROM 39 to specify an amount of required evaporative-fuel gas corresponding to the state of the internal combustion engine 1, the fuel tank 33 or the charcoal canister 31. Then, the CPU 38 accessed to the required duty ratio control map in the ROM 39 to specify a required duty ratio corresponding to the amount of required evaporative fuel gas.

If the required duty ratio is specified, the CPU 38 applies a driving pulse signal corresponding to the specified required duty ratio to the solenoid valve 34 to bring the purge passage 46 into communicated state.

Here, although a pressure in the intake pipe 18 upstream the throttle valve 20 is atmospheric pressure, since an intake pipe negative pressure is generated in the intake pipe 18 downstream the throttle valve 20, a differential pressure is generated between the upstream portion and the downstream portion of the purge passage 46.

Due to the differential pressure, a portion of atmosphere flowing in the intake pipe 18 upstream the throttle valve 20 flows into the purge passage 46, and is introduced into the intake pipe 18 downstream the throttle valve 20. That is, a flow of atmosphere flowing through the charcoal canister 31 is generated in the purge passage 46.

As a result, the evaporative fuel adsorbed by the adsorbent in the charcoal canister 31 is separated from the adsorbent due to the flow of atmosphere, and is introduced into the intake pipe 18 downstream the throttle valve 20 together with atmosphere, and a so-called purge is realized. The atmosphere and the evaporative fuel (atmosphere containing the evaporative fuel is referred to as an evaporative fuel gas, hereinafter) purged into the intake pipe 18 is introduced into the combustion chamber 5 while being mixed with new air flowing in the intake pipe 18, and is burned and processed together with fuel injected from the fuel injection valve 9.

The maximum amount of evaporative fuel gas (amount of limit evaporative fuel gas) capable of being purged from the charcoal canister 31 to the intake pipe 18 when the solenoid valve 34 is fully opened is varied in accordance with a differential pressure between the upstream portion and the downstream portion of the purge passage 46, that is, between the upstream portion and the downstream portion of the throttle valve 20. However, in the case that the internal combustion engine 1 is in the stratified combustion operating state, since the throttle valve 20 is controlled so as to maintain the fully opened state, the differential pressure between the upstream portion and the downstream portion of the throttle valve 20 becomes substantially constant and as a result, the amount of limit evaporative fuel gas also becomes constant.

In such a case, if the amount of required evaporative fuel gas becomes greater than the amount of limit evaporative fuel gas, the amount of required evaporative fuel gas can not be purged.

In the present embodiment, the amount of limit evaporative fuel gas capable of being purged at a constant differential pressure at the time of the stratified combustion operating is previously obtained by experiment and the like, and the opening degree of the solenoid valve 34 (in this case, the duty ratio is 100%) corresponding to such a amount of limit evaporative fuel gas is stored in the ROM 39 or the like as the limit duty ratio. Then, if the required duty ratio becomes equal to or greater than the limit duty ratio at the time of the stratified combustion operating of the internal combustion engine 1, the CPU 38 corrects the opening degree of the throttle valve 20 into its closing direction so as to increase the differential pressure between the upstream portion and the downstream portion of the throttle valve 20.

However, in the case that the required duty ratio is equal to or greater than the limit duty ratio, and is smaller than the last time required duty ratio, that is, in the case that the opening degree of the throttle valve 20 has already been corrected into its closing direction and the amount of required evaporative fuel gas tends to be reduced, the CPU 38 corrects the opening of the throttle valve 20 into its opening-degree direction (that is, into a direction for returning to the normal opening degree).

When the opening degree of the throttle valve 20 is corrected, if the opening degree of the throttle valve 20 is abruptly varied, the purge amount of evaporative fuel gas or the intake air amount is varied, and the air/fuel ratio of the mixture supplied to the combustion chamber 5 is also varied and therefore, there is a problem that torque variation or fire is caused.

Whereas, in the present embodiment, the opening degree of the throttle valve 20 is gradually corrected by a predetermined value. The predetermined value may be a fixed value previously determined, or a variable value which is varied in accordance with the number of engine revolutions, the combustion state, the concentration of fuel in the evaporative fuel gas or the like.

Further, when the CPU 38 executes a purge control of the evaporative fuel gas, the CPU 38 may inhibit the stratified combustion control and conduct the homogeneous combustion control for the purpose of stabilizing the combustion in each cylinder 2.

By executing the application program in the ROM 39 in this manner, the CPU 38 realizes the evaporative fuel amount calculating means and the differential pressure changing means according to the present invention.

The operation and effect of the present embodiment will be described below.

In the case that the internal combustion engine 1 is in the stratified combustion operating state, the CPU 38 executes the purge execution control routine every predetermined time (e.g., every 100 ms) as shown in FIG. 3. In this purge execution control routine, the CPU 38 first determines whether the purge execution condition of the evaporative fuel gas is established in S301.

In the case that the CPU 38 determines that the purge execution condition of the evaporative fuel gas is not established in S301, the execution of the present routine is once terminated. On the other hand, in the case that the CPU 38 determines that the purge execution condition of the evaporative fuel gas is established, the processing is advanced to S302.

In S302, the CPU 38 specifies the amount of required evaporative fuel gas from the output signals from the various sensors and the control map stored in the ROM 39 and then, calculates the required duty ratio: dpg corresponding to the amount of required evaporative fuel gas. This required duty ratio is stored in a predetermined region in the RAM 40.

Sequentially, in S303, the CPU 38 reads out the limit duty ratio from the ROM 39, and compares the limit duty ratio with the required duty ratio: dpg calculated in S302. That is, the CPU 38 determines whether the required duty ratio: dpg is greater than the limit duty ratio.

In S303, in the case that it is determined that the required duty ratio: dpg is equal to or less than the limit duty ratio, the CPU 38 once terminates the execution of the present routine, and applies, to the solenoid valve 34, a driving pulse signal corresponding to the required duty ratio: dpg calculated in S302.

On the other hand, in S303, in the case that it is determined that the required duty ratio: dpg is greater than the limit duty ratio, the CPU 38 advances to S304 where the CPU 38 reads out the last required duty ratio: dpgo from the predetermined region in the RAM 40, and compares the current required duty ratio: dpg with the last time required duty ratio: dpgo.

In S304, in the case that it is determined that the current required duty ratio: dpg is equal to the last required duty ratio: dpgo, the CPU 38 terminates the execution of the present routine, and applies, to the solenoid valve 34, a driving pulse signal corresponding to the limit duty ratio.

In S304, in the case that it is determined that the current required duty ratio: dpg is greater than the last time required duty ratio: dpgo, the CPU 38 advances to S305, where the CPU 38 corrects the opening degree of the throttle valve 20 into its closing direction. More specifically, the CPU 38 subtracts a predetermined amount $k_1$ from a throttle opening degree: trt at that time to calculate a new throttle opening degree: trt.

The predetermined value: $k_1$ may be a fixed value previously determined, or a variable value which is calculated using, as parameters, the number of engine revolutions, the engine load of the internal combustion engine 1, and the like.

After the CPU 38 terminates the execution of the processing in S305, the CPU 38 terminates the execution of the present routine, applies a driving pulse signal corresponding to the limit duty ratio to the solenoid valve 34, and applies, to the actuator 21, a driving electric power corresponding the throttle opening degree: trt calculated in S305.

In this case, since the throttle valve 20 is driven in its closing direction by the predetermined value $k_1$, the intake amount flowing into the intake pipe 18 downstream the throttle valve 20 is reduced, and the intake pipe pressure in the intake pipe 18 downstream the throttle valve 20 is lowered (degree of negative pressure becomes high). As a result, the differential pressure between the upstream portion and the downstream portion of the purge passage 46 is increased, 6the flow rate of the purge passage 46 is increased, and it is possible to securely purge the amount of required evaporative fuel gas.

In S304, in the case that it is determined that the current required duty ratio: dpg is smaller than the last time required duty ratio: dpgo in S304, the CPU 38 determines that the opening degree of the throttle valve 20 has already been corrected to its closing direction and that the required duty ratio tends to be reduced, the processing is advanced to S306.

In S306, the CPU 38 corrects the opening degree of the throttle valve 20 in its opening direction. More specifically, the CPU 38 adds a predetermined amount: $k_2$ to the throttle opening: trt at that time to calculate a new throttle opening degree: trt.

The predetermined value: k2 may be a fixed value previously determined, or a variable value which is calculated using, as parameters, the number of engine revolutions, the engine load of the internal combustion engine 1, and the like.

After the CPU 38 terminates the execution of the processing in S306, the CPU 38 terminates the execution of the present routine, applies a driving pulse signal corresponding to the limit duty ratio to the solenoid valve 34, and applies, to the actuator 21, a driving electric power corresponding the throttle opening degree: trt calculated in S306.

In this case, since the throttle valve 20 is driven in its opening direction by the predetermined value $k_2$, the intake amount flowing into the intake pipe 18 downstream the throttle valve 20 is increased, and the intake pipe pressure in the intake pipe 18 downstream the throttle valve 20 is increased (degree of negative pressure becomes low). As a result, the differential pressure between the upstream portion and the downstream portion of the purge passage 46 is reduced as compared with that at the last time. However, since the amount of required evaporative fuel gas is reduced as compared with the last time, the amount of required evaporative fuel gas can sufficiently be purged even with the small differential pressure.

According to the above-described embodiment, in the case that a purge is required with respect to the evaporative fuel gas greater than the evaporative fuel gas amount (amount of limit evaporative fuel gas) which can be purged with a differential pressure between a pressure in the intake pipe 18 upstream the throttle valve 20 and a pressure in the intake pipe 18 downstream the throttle valve 20, that is, a differential pressure between the upstream portion and the downstream portion of the purge passage 46, the differential pressure between the upstream portion and the downstream portion of the purge passage 46 can be increased by correcting the opening degree of the throttle valve 20 in its closing direction, thereby increasing the amount of evaporative fuel gas capable of being purged. As a result, even if the amount of required evaporative fuel gas exceeds the amount of limit evaporative fuel gas, it is possible to securely purge the required amount of evaporative fuel gas.

At that time, as long as the amount of required evaporative fuel gas is less than the amount of limit evaporative fuel gas, since the opening degree of the throttle valve 20 is not corrected, it is possible to restrain the variation of the operating state of engine due to the purge of the evaporative fuel gas.

If the opening degree of the throttle valve 20 is corrected to its closing direction, the differential pressure between the upstream portion and the downstream portion of the purge passage 46 is increased, and the evaporative fuel gas capable of being purged is increased. However, if the opening degree of the throttle valve 20 is excessively corrected, since the fuel consumption is deteriorated, a lower limit guard of the opening degree of the throttle valve 20 may be provided. In this case, the CPU 38 executes, for example, a purge execution control routine as shown in FIG. 4.

Figure 4:
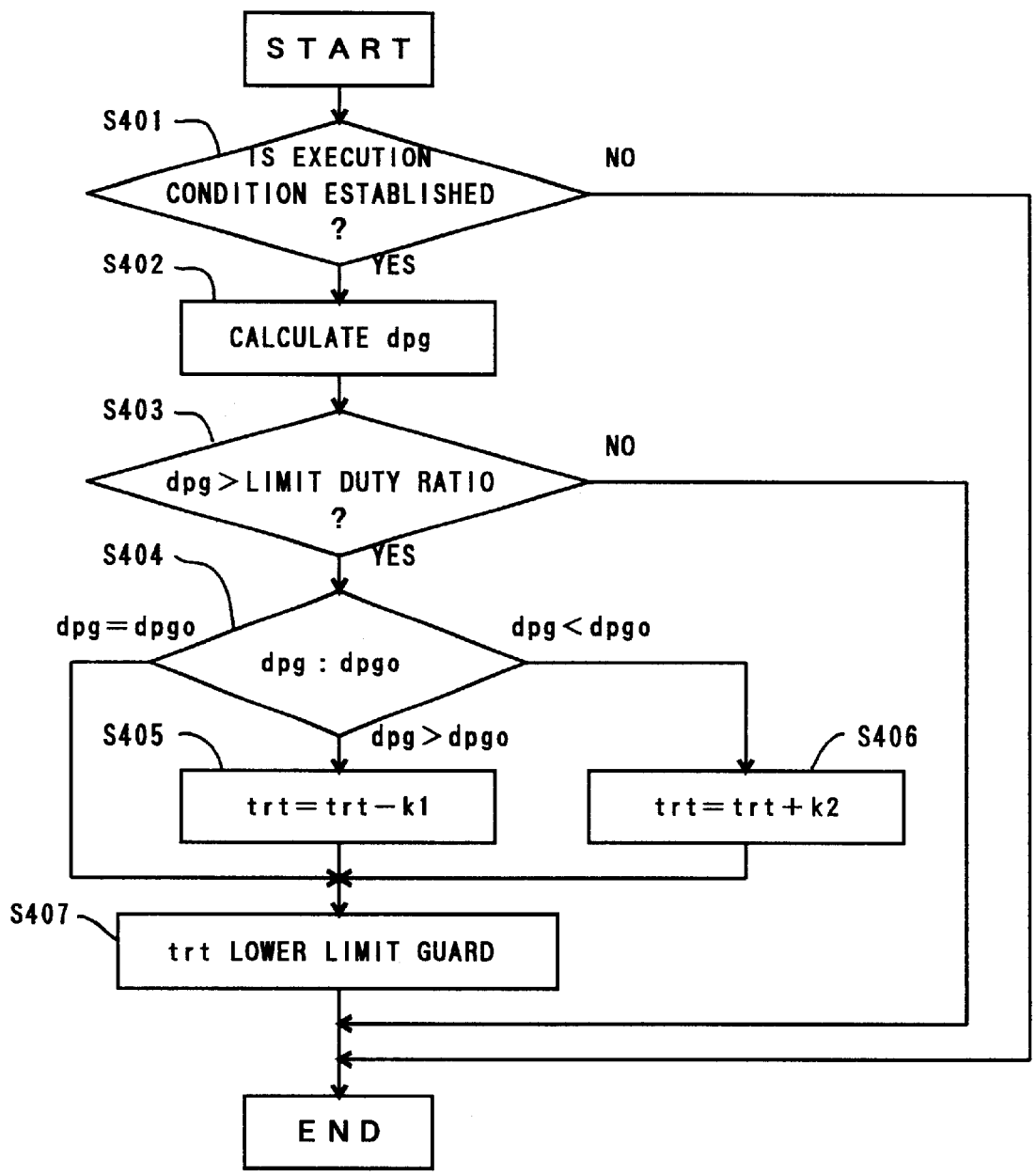
FIG. 4 is a flowchart (2) showing a concrete example of a purge execution control routine according to the first embodiment.

In the purge execution control routine shown in FIG. 4, Processings of S401 to S406 are the same as those of S301 to S306 in the purge execution control routine shown in FIG. 3. The CPU 38 executes, in S407, a lower limit guard processing of the opening degree of throttle valve 20 corrected in S405 or S406 to prevent the excessive correction of the throttle valve 20. In this case, an excessive increase in the differential pressure between the upstream portion and the downstream portion of the purge passage 46 is prevented and as a result, the excessive increase in the purge amount of evaporative fuel gas is suppressed, and the fuel consumption is prevented from being deteriorated.

As another method for preventing the excessive correction of the throttle valve 20, the lower limit value may be set, and in the case that the opening degree of the throttle valve 20 after it is corrected becomes lower than the lower limit value, the throttle valve 20 may be controlled such that its opening degree is regarded as the lower limit value.

Further, in the present embodiment, it has been described that the opening degree of the throttle valve 20 is not corrected as long as the amount of required evaporative fuel gas can be purged only by controlling the solenoid valve 34. Alternatively, the opening degree of the throttle valve 20 may be positively corrected regardless of whether the amount of required evaporative fuel gas can be purged only by controlling the solenoid valve 34, so that the purge of the evaporative fuel gas is terminated within a short time.

SECOND EMBODIMENT

A second embodiment of the evaporative fuel processing apparatus according to the present invention will be explained based on FIG. 5. Here, a structure different from the above-described first embodiment will be explained, and a description of the same structure will be omitted.

In the first embodiment, an example in which the opening degree of the throttle valve 20 is corrected using the required duty ratio: dpg as the parameter is described, in the present embodiment, an example in which the opening degree of the throttle valve 20 is corrected using, as a parameter, a pressure in the intake pipe 18 downstream the throttle valve 20, that is, an intake pipe negative pressure: pm will be explained.

That is, the amount of limit evaporative fuel gas is determined by a differential pressure between a pressure in the intake pipe 18 upstream the throttle valve 20 and a pressure in the intake pipe 18 downstream the throttle valve 20, however, since the pressure in the intake pipe 18 upstream the throttle valve 20 is atmospheric pressure which is substantially constant, the amount of limit evaporative fuel gas is determined by the pressure in the intake pipe 18 downstream the throttle valve 20 (intake pipe negative pressure: pm).

In the present embodiment, relationship between the intake pipe negative pressure: pm and the amount of limit evaporative fuel gas, and relationship between the opening degree (duty ratio) of the solenoid valve 34 and the evaporative fuel gas amount are previously obtained by experiment and the like, and from these relationship, an intake pipe negative pressure control map showing the relationship between the intake pipe negative pressure: pm and the opening degree (duty ratio) of the solenoid valve 34 is previously prepare.

When the purge control of evaporative fuel gas is executed, the CPU 38 calculates a required opening degree (required duty ratio) of the solenoid valve 34 in the same procedure as that in the first embodiment, accesses to the intake pipe negative pressure control map in the ROM 39, and calculates the intake pipe negative pressure: pm corresponding to the required duty ratio (this intake pipe negative pressure: kpm is referred to as a target intake pipe negative pressure: pm, hereinafter).

Subsequently, the CPU 38 applies a driving pulse signal corresponding to the required duty ratio to the solenoid valve 34 and then, inputs an output signal value (actual intake pipe negative pressure, hereinafter, it is referred to as an actual intake pipe negative pressure ): pm of the vacuums sensor 17a. Then, the CPU 38 compares the actual intake pipe negative pressure: pm with the target intake pipe negative pressure: kpm.

At that time, in the case that the actual intake pipe negative pressure: pm is higher than the target intake pipe negative pressure: kpm, that is, in the case that the degree of negative pressure of the actual intake pipe negative pressure: pm is lower than that of the target intake pipe negative pressure: kpm, the CPU 38 corrects the opening degree of throttle valve 20 to the closing direction so as to increase the degree of negative pressure of the actual intake pipe negative pressure (to coincide the actual intake pipe negative pressure with the target intake pipe negative pressure: kpm).

Further, in the case that the degree of negative pressure of the actual intake pipe negative pressure: pm is higher than that of the target intake pipe negative pressure: kpm, the CPU 38 determines that the opening degree of the throttle valve 20 has already been corrected to its closing direction and that the amount of required evaporative fuel gas tends to be reduced, the CPU 38 corrects the opening degree of the throttle valve 20 to the opening direction so as to reduce the degree of negative pressure of the actual intake pipe negative pressure (to coincide the actual intake pipe negative pressure with the target intake pipe negative pressure: kpm).

In the case that the actual intake pipe negative pressure: pm is equal to the target intake pipe negative pressure: kpm, the CPU 38 does not correct the opening degree of throttle valve 20.

Other structure is the same as that of the first embodiment.

Operations and effects of the present embodiment will be explained below.

Figure 5:
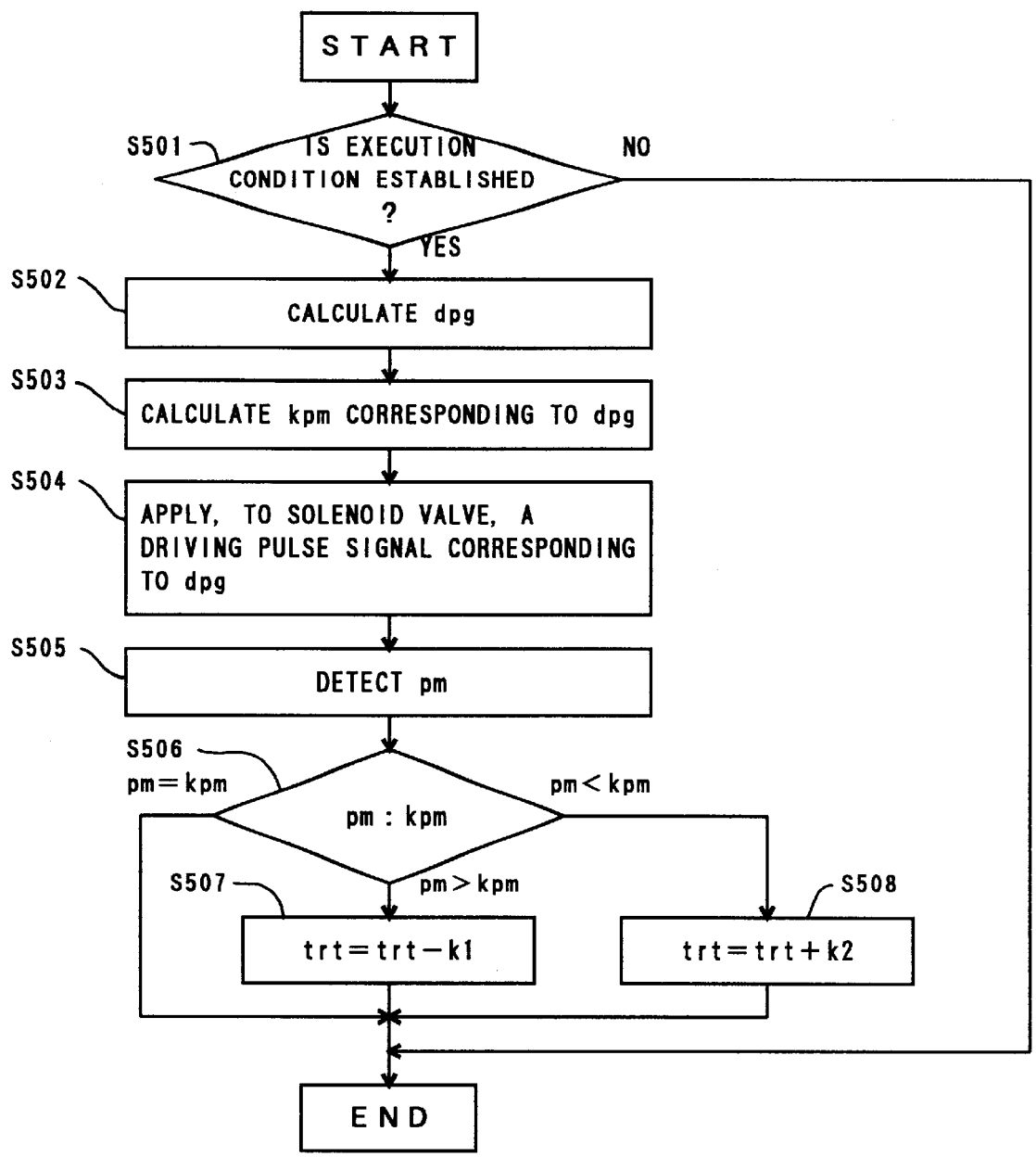
FIG. 5 is a flowchart showing a purge execution control routine according to a second embodiment.

In the case that the internal combustion engine 1 is in the stratified combustion operating state, the CPU 38 executes the purge execution control routing as shown in FIG. 5 every predetermined time (e.g., 100 ms). In the purge execution control routine, the CPU 38 first determines in S501 whether the purge execution condition of the evaporative fuel gas is established.

In the case that it is determined in S501 that the purge execution condition of the evaporative fuel gas is not established, the CPU 38 once terminates the execution of the present routine, on the other hand, in the case that it is determined that the purge execution condition of the evaporative fuel gas is established, the CPU 38 advances to S502.

In S502, the CPU 38 specifies the amount of required evaporative fuel gas from output signals from the various sensors and the control map store in the ROM 39, and then, calculates the required duty ratio: dpg corresponding to the amount of required evaporative fuel gas. This required duty ratio is stored in a predetermined region in the RAM 40.

Subsequently, in S503, the CPU 38 accesses to the intake pipe negative pressure control map in the ROM 39 to calculate the target intake pipe negative pressure: kpm corresponding to the required duty ratio: dpg calculated in S502.

In S504, the CPU 38 applies, to the solenoid valve 34, a driving pulse signal corresponding to the required duty ratio: dpg calculated in S502. Thereafter, the CPU 38 advances to S505, where the CPU 38 inputs the output signal value (actual intake pipe negative pressure: pm) of the vacuum sensor 17a, and advances to S506.

In S506, the CPU 38 compares the target intake pipe negative pressure: kpm calculated in S503 with the actual intake pipe negative pressure: pm input in S505.

In S506, in the case that it is determined that the actual intake pipe negative pressure: pm is equal to the target intake pipe negative pressure: kpm, the CPU 38 does not correct the opening degree of the throttle valve 20, and terminates the execution of the present routine.

In S506, in the case that it is determined that the actual intake pipe negative pressure: pm is higher than the target intake pipe negative pressure: kpm (in the case that it is determined that the degree of negative pressure of the actual intake pipe negative pressure: pm is lower than that of the target intake pipe negative pressure: kpm), the CPU 38 advances to S507, where the CPU 38 corrects the opening degree of the throttle valve 20 to the closing direction to reduce the actual intake pipe negative pressure: pm (to increase the degree of negative pressure of the actual intake pipe negative pressure). At that time, the CPU 38 subtracts the predetermined amount $k_1$ from the throttle opening degree: trt at that time to calculate a new throttle opening degree: trt.

The predetermined value: $k_1$ may be a fixed value previously determined, or a variable value which is calculated using, as parameters, the number of engine revolutions, the engine load of the internal combustion engine 1, and the like.

After the CPU 38 terminates the execution of the processing in S507, the CPU 38 terminates the execution of the present routine, and applies, to the actuator 21, a driving electric power corresponding the throttle opening degree: trt calculated in S507.

In this case, since the throttle valve 20 is driven in its closing direction by the predetermined amount $k_1$, the intake amount flowing into the intake pipe 18 downstream the throttle valve 20 is reduced, and the actual intake pipe negative pressure: pm in the intake pipe 18 downstream the throttle valve 20 is reduced (degree of negative pressure becomes high). As a result, the differential pressure between the upstream portion and the downstream portion of the purge passage 46 is increased, and the flow rate in the purge passage 46 is increased so that the amount of required evaporative fuel gas can securely be purged.

In S506, in the case that it is determined that the actual intake pipe negative pressure: pm is lower than the target intake pipe negative pressure: kpm (in the case that it is determined that the degree of negative pressure of the actual intake pipe negative pressure: pm is higher than that of the target intake pipe negative pressure: kpm), the CPU 38 determines that the opening degree of the throttle valve 20 has already been corrected to the closing direction and that the required duty ratio tends to be reduced, the CPU 38 advanced to S508.

In S508, the CPU 38 corrects the opening degree of the throttle valve 20 to the opening direction. At that time, the CPU 38 adds the predetermined value $k_2$ to the throttle opening degree: trt at that time to calculate a new throttle opening degree: trt.

The predetermined value: $k_2$ may be a fixed value previously determined, or a variable value which is calculated using, as parameters, the number of engine revolutions, the engine load of the internal combustion engine 1, and the like.

After the CPU 38 terminates the execution of the processing in S508, the CPU 38 terminates the execution of the present routine, and applies, to the actuator 21, a driving electric power corresponding the throttle opening degree: trt of the throttle valve 20 calculated in S508.

In this case, since the throttle valve 20 is driven in its opening direction by the predetermined value $k_2$, the intake amount flowing into the intake pipe 18 downstream the throttle valve 20 is increased, and the actual intake pipe negative pressure: pm in the intake pipe 18 downstream the throttle valve 20 is increased (degree of negative pressure becomes low). As a result, the differential pressure between the upstream portion and the downstream portion of the purge passage 46 is reduced, however, since the amount of required evaporative fuel gas becomes smaller as compared with the last time, it is possible to sufficiently purge the amount of required evaporative fuel gas even with a small differential pressure.

According to the above-described embodiment, it is possible to obtain the same effect as that of the first embodiment.

An example in which the opening degree of the throttle valve 20 is corrected to change the differential pressure between the upstream portion and the downstream portion of the purge passage 46 is explained in the first and second embodiments, the evaporative fuel exhaust passage 30 may be connected to the intake branch pipe 16 downstream the swirl control valve 10, and the opening degree of the swirl control valve 10 may be corrected to change the differential pressure between the upstream portion and the downstream portion of the purge passage 46.

THIRD EMBODIMENT

A third embodiment of the evaporative fuel processing apparatus according to the present invention will be explained based on FIGS. 6 to 8. Here, a structure different from the above-described first embodiment will be explained, and a description of the same structure will be omitted.

Figure 6:
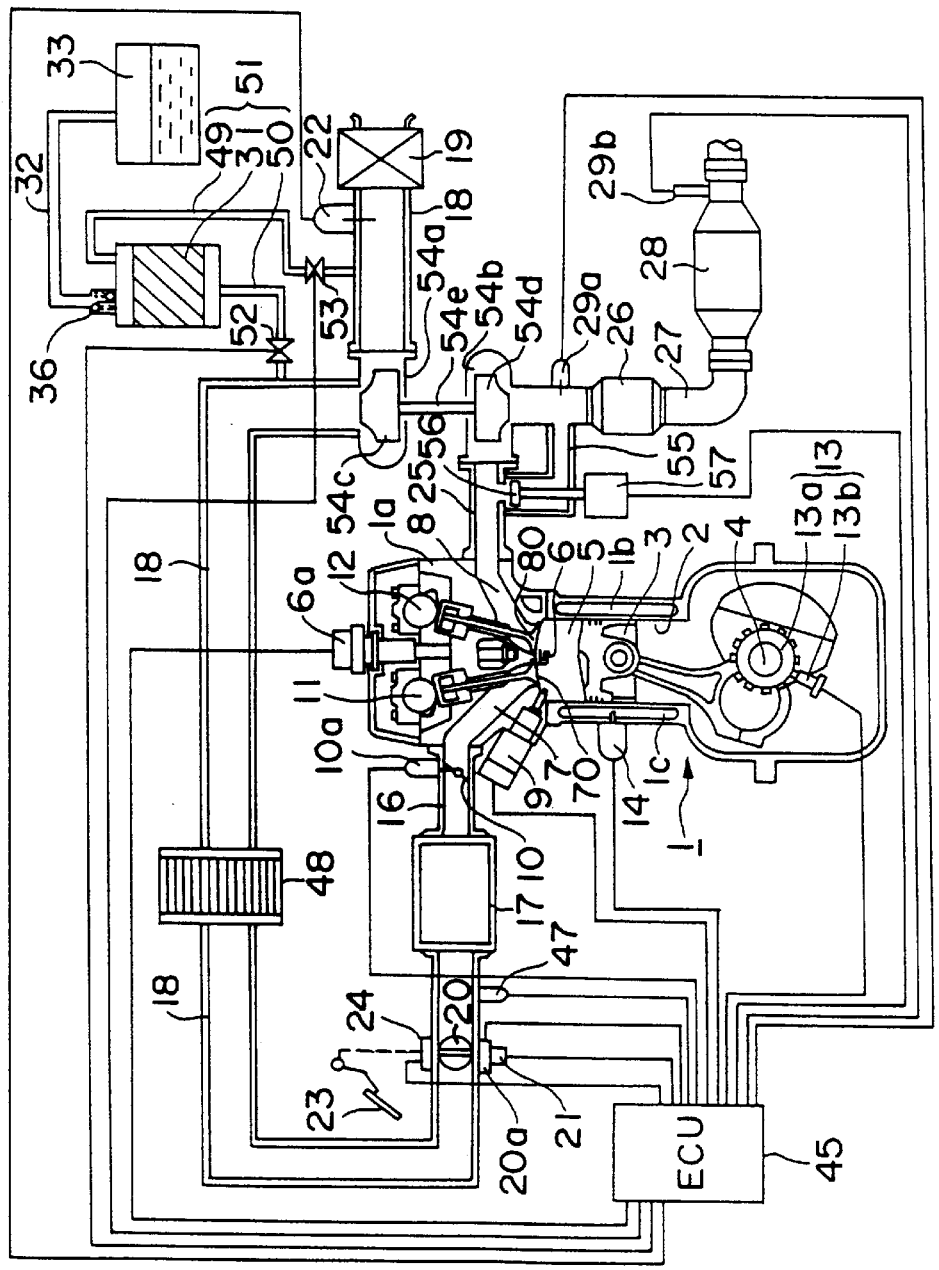
FIG. 6 is a schematic configuration diagram of an internal combustion engine to which an evaporative fuel processing apparatus according to a third embodiment is applied.
Figure 7:
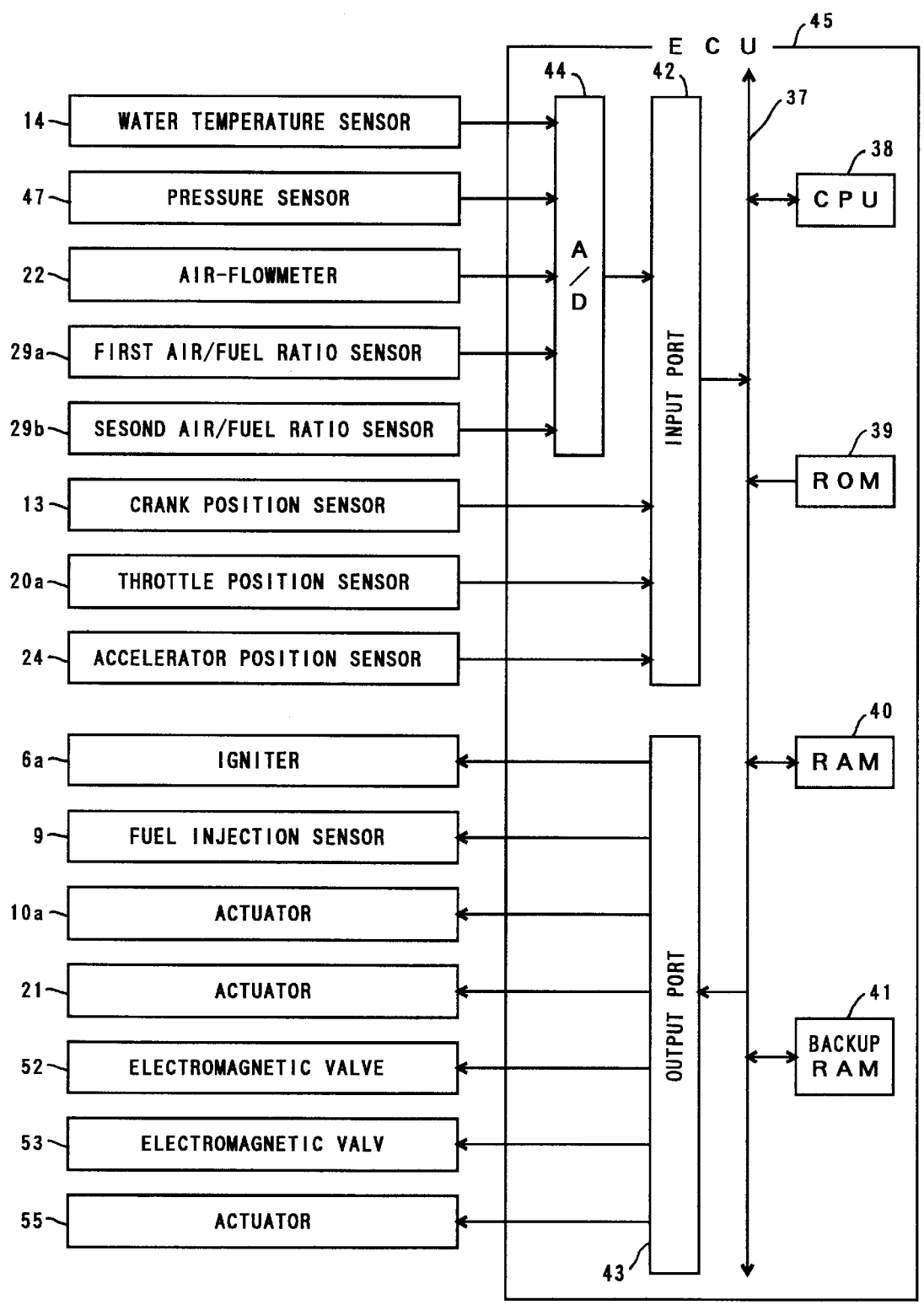
FIG. 7 is a block diagram showing an inside structure of the ECU 45 according to the third embodiment.

FIG. 6 is a diagram showing a schematic configuration of an internal combustion engine to which an evaporative fuel processing apparatus according to the present embodiment is applied. Constituent elements similar to those of the internal combustion engine 1 according to the first embodiment are designated by the same reference numerals.

An internal combustion engine shown in FIG. 6 is a lean-burn internal combustion engine 1 comprising an intake system including a supercharger which is a centrifugal supercharger 54 for supercharging the intake air utilizing the exhaust energy.

The centrifugal supercharger 54 is structured such that a turbine housing 54b interposed between the exhaust branch pipe 25 and the exhaust pipe 27 is connected to a compressor housing 54a mounted to an intermediate portion of the intake pipe 18, a turbine wheel 54d rotatably supported in the turbine housing 54b is connected to a compressor wheel 54c rotatably supported in the compressor housing 54a through a rotor shaft 54e.

In the centrifugal supercharger 54 structured as described above, after the exhaust gas flowing into the turbine housing 54b rotates the turbine wheel 54d, the exhaust gas flows out from the turbine housing 54b to the exhaust pipe 27. On the other hand, the revolution force of the turbine wheel 54d is transmitted to the compressor wheel 54c through the rotor shaft 54e, and rotates the compressor wheel 54c.

When the compressor wheel 54c is rotated, new air upstream the compressor housing 54a is drawn into the compressor housing 54a by a plurality of blades formed on the compressor wheel 54c, and is sent toward downstream the compressor housing 54 under pressure.

The compressed air sent from the compressor housing 54a is cooled by an intercooler 48 mounted to an intermediate portion of the intake pipe 18 downstream the compressor housing 54a and then, is supplied to the internal combustion engine 1.

As a result, more new air is supplied to the internal combustion engine 1 as compared with an internal combustion engine having no centrifugal supercharger, and more fuel can be burned to increased the engine output.

On the other hand, the exhaust branch pipe 25 and the exhaust pipe 27 are communicated with each other through a bypass passage 55, and a waist gate valve 56 is mounted to the bypass passage 55 for opening and closing an opening end at the side of the exhaust branch pipe 25.

The waist gate valve 56 is connected to an actuator 57 comprising a solenoid switch, an electric motor and the like, and is driven for opening and closing by the actuator 57.

Connected to the charcoal canister 31 are an atmosphere introducing passage 50 for introducing the atmosphere into the charcoal canister 31, and an evaporative fuel exhaust passage 49 for discharging the evaporative fuel in the charcoal canister 31.

The atmosphere introducing passage 50 is connected to the intake pipe 18 downstream the compressor housing 54a, and the evaporative fuel exhaust passage 49 is connected to the intake pipe 18 between the compressor housing 54a and the air flowmeter 22.

A solenoid valve 52 is mounted to an intermediate portion of the atmosphere introducing passage 50 for adjusting the flow rate in the atmosphere introducing passage 50, and a solenoid valve 53 is connected to an intermediate portion of the evaporative fuel exhaust passage 49 for adjusting the flow rate in the evaporative fuel exhaust passage 49.

The solenoid valve 53 is duty-controlled similarly to the solenoid valve 34 in the first embodiment, and can adjust the opening degree in accordance with the applied driving pulse signal.

The evaporative fuel exhaust passage 49 and the atmosphere introducing passage 50 which are communicated with each other through the charcoal canister 31 realizes a purge passage of the present invention (the charcoal canister 31, the evaporative fuel exhaust passage 49 and the atmosphere introducing passage 50 are generally referred to as a purge passage 51).

A pressure sensor 47 for outputting an electric signal in accordance with a pressure of compressed air in the intake pipe 18, that is, a supercharged pressure is mounted to the intake pipe 18 downstream the throttle valve 20. The pressure sensor 47, the solenoid valves 52 and 53, and the actuator 57 are connected to the ECU 45 through electric wires as shown in FIG. 7.

The CPU 38 of the ECU 45 monitors the output signal value (supercharging pressure) of the pressure sensor 47, and applies a driving current to the actuator 57 to open the waist gate valve 56 when the supercharging pressure reaches a predetermined value.

In this case, since a part of the exhaust gas flowing in the exhaust branch pipe 25 flows into the exhaust pipe 27 bypassing the turbine housing 54b, the exhaust gas amount flowing into the turbine housing 54b is reduced, the turbine wheel 54d and the compressor wheel 54c are prevented from excessively rotating, and the supercharging pressure is kept at a predetermined value, and as a result, new air drawn into the internal combustion engine 1 is prevented from excessively increasing.

When the evaporative fuel gas is purged, the CPU 38 normally controls the solenoid valves 52 and 53 to close. Sequentially, the CPU 38 determines whether the purge execution condition of the evaporative fuel gas is established every predetermined time.

In the case that it is determined that the purge execution condition is established, the CPU 38 determines an operating state of the internal combustion engine 1, a state of the fuel tank 33, a state of the charcoal canister 31 and the like.

Then, the CPU 38 accesses to an amount of required evaporative fuel gas control map in the ROM 39 to specify the amount of required evaporative fuel gas corresponding to the state of the internal combustion engine 1, the fuel tank 33 or the charcoal canister 31.

Here, a map showing the relationship between the amount of required evaporative fuel gas and the duty ratio corresponding to the opening degree of the solenoid valve 53 is stored in the ROM 39, and the CPU 38 accesses to this map to specify the duty ratio (it is referred to as a required duty ratio, hereinafter) corresponding to the amount of required evaporative fuel gas.

When the required duty ratio is specified, the CPU 38 opens the solenoid valve 52, and applies, to the solenoid valve 53, a driving pulse signal corresponding to the specified required duty ratio to bring the purge passage 51 into a conductive state.

Since a pressure in the intake pipe 18 upstream the compressor housing 54a becomes substantially atmospheric pressure, and a pressure in the intake pipe 18 downstream the compressor housing 54a becomes higher than the atmospheric pressure due to compressed new air, a differential pressure is generated between the upstream portion and the downstream portion of the purge passage 51.

Therefore, a part of the compressed air flowing in the intake pipe 18 downstream the compressor housing 54a flows into the purge passage 51, and is introduced into the intake pipe 18 upstream the compressor housing 54a. That is, a flow of atmosphere flowing through the charcoal canister 31 is generated in the purge passage 51.

As a result, the evaporative fuel adsorbed by the adsorbent in the charcoal canister 31 is separated from the adsorbent due to the flow of atmosphere, and is introduced into the intake pipe 18 upstream the compressor housing 54a together with the atmosphere.

If the opening degree of the throttle valve 20 is varied even when the supercharging pressure is kept at the predetermined value since the waist gate valve 56 is opened, a pressure (pressure upstream the purge passage 51) in the intake pipe 18 upstream the throttle valve 20 and a pressure (supercharging pressure) in the intake pipe 18 downstream the throttle valve 20 are varied, however, in the case that the internal combustion engine 1 is in the stratified combustion operating state, since the throttle valve 20 keeps the opening degree substantially constantly (substantially fully opened state), the pressure (pressure upstream the purge passage 51) in the intake pipe 18 upstream the throttle valve 20 and the pressure (supercharging pressure) in the intake pipe 18 downstream the throttle valve 20 become substantially constant and as a result, the differential pressure between the upstream portion and the downstream portion of the purge passage 51 becomes constant.

When the solenoid valve 53 is in the fully opened state, the maximum amount (amount of limit evaporative fuel gas) of evaporative fuel gas capable of being purged from the charcoal canister 31 to the intake pipe 18 is varied in accordance with the differential pressure between the upstream portion and the downstream portion of the purge passage 51, however, in the case that the differential pressure is constant as described above, the amount of limit evaporative fuel gas is constant, and the amount of required evaporative fuel gas greater than the amount of limit evaporative fuel gas can not be purged.

In the present embodiment, the amount of limit evaporative fuel gas when the internal combustion engine 1 is in the stratified combustion state and when the supercharging pressure is kept at the predetermined value because the waist gate valve 56 is opened is previously obtained by experiment and the like, and the opening degree of the solenoid valve 53 corresponding to the amount of limit evaporative fuel gas (in this case, the duty ratio=100%) is stored in the ROM 39 or the like as the limit duty ratio. If the required duty ratio exceeds the limit duty ratio when the supercharging pressure is at the predetermined value, the CPU 38 corrects the opening degree of the waist gate valve 56 to the closing direction to enhance the supercharging pressure so that the differential pressure between the upstream portion and the downstream portion of the purge passage 51 is increased.

However, in the case that the required duty ratio is equal to or greater than the limit duty ratio and smaller than the last time required duty ratio, that is, in the case that the opening degree of the waist gate valve 56 has already been corrected to the closing direction and the amount of required evaporative fuel gas tends to be reduced, the CPU 38 corrects the opening degree of the waist gate valve 56 to the opening direction (that is, in a direction returning to the normal direction).

By controlling the operating state of the centrifugal supercharger 54 as described above, the CPU 38 realizes the differential pressure changing means according to the present invention.

Operations and effects of the present embodiment will be explained below.

At the time of stratified combustion operating of the internal combustion engine 1, the CPU 38 executes a purge execution control routine as shown in FIG. 8 every predetermined time (e.g., 100 ms). In this purge execution control routine, the CPU 38 first determines whether the purge execution condition of the evaporative fuel gas is established in S801.

In the case that it is determined that the purge execution condition of the evaporative fuel gas is not established in S801, the CPU 38 once terminates the execution of the present routine, and in the case that it is determined that the purge execution condition of the evaporative fuel gas is established, the CPU 38 advances to S802.

In S802, the CPU 38 specifies the amount of required evaporative fuel gas from output signals from the various sensors and the control map stored in the ROM 39 and then, calculates the required duty ratio: dpg corresponding to the amount of required evaporative fuel gas. This required duty ratio is stored in a predetermined region in the RAM 40.

Subsequently, in S803, the CPU 38 reads out the limit duty ratio from the ROM 39, and determines that the required duty ratio: dpg calculated in S802 is greater than the limit duty ratio.

In the case that it is determined in S803 that the required duty ratio: dpg is equal to or smaller than the limit duty ratio, the CPU 38 once terminates the execution of the present routine, and applies, to the solenoid valve 53, a driving pulse signal corresponding to the required duty ratio: dpg calculated in S802.

On the other hand, in the case that it is determined in S803 that the required duty ratio: dpg is greater than the limit duty ratio, the CPU 38 advances to S804, where the last required duty ratio: dpgo is read from the predetermined region in the RAM 40, and compares the current required duty ratio: dpg with the last required duty ratio: dpgo.

In the case that it is determined in S804 that the current required duty ratio: dpg is equal to the last required duty ratio: dpg, the CPU 38 terminates the execution of the present routine, and applies, to the solenoid valve t3, a driving pulse signal corresponding to the limit duty ratio.

In the case that it is determined in S804 that the current required duty ratio: dpg is greater than the last required duty ratio: dpgo, the CPU 38 determines that the amount of required evaporative fuel gas tends to be reduced, and advances to S805.

In S805, the CPU 38 subtracts the predetermined amount: $k_1$ from the opening degree: dtb of the waist gate valve 56 at that time to calculate a new opening degree: dtb of the waist gate valve 56.

The predetermined value: $k_1$ may be a fixed value previously determined, or a variable value which is calculated using, as parameters, the number of engine revolutions, the engine load of the internal combustion engine 1, and the like.

After the CPU 38 terminates the execution of the processing in S805, the CPU 38 terminates the execution of the present routine, and applies, to the solenoid valve 53, a driving pulse signal corresponding the limit duty ratio, and applies, to the actuator 57, a driving electric power corresponding to the opening degree: dpt of the waist gate valve 56 calculated in S805.

In this case, since the waist gate valve 56 is driven in its closing direction by the predetermined value $k_1$, the amount of exhaust gas bypassing the turbine housing 54b (flow rate of the bypass passage 55) is reduced, and the amount of exhaust gas flowing into the turbine housing 54b is increased correspondingly. Therefore, the number of revolutions of the turbine wheel 54d is increased, and the number of revolutions of the compressor wheel 54c is also increased, the compressing ratio by the compressor housing 54a is increased and as a result, the supercharging pressure is increased.

When the supercharging pressure is increased as described, since the differential pressure between the upstream portion and the downstream portion of the purge passage 51 is increased and the amount of limit evaporative fuel gas is increased, it is possible to securely purge the amount of required evaporative fuel gas.

On the other hand, in the case that it is determined in S804 that the current required duty ratio: dpg is smaller than the last required duty ratio: dpgo, the CPU 38 determines that the opening degree of the waist gate valve 56 has already been corrected to the closing direction and the required duty ratio tends to be reduced, and advances to S806.

In S806, the CPU 38 adds the predetermined amount: $k_2$ to the opening degree: dpt of the waist gate valve 56 at that time to calculate a new opening degree: dpt of the waist gate valve 56.

The predetermined value: $k_2$ may be a fixed value previously determined, or a variable value which is calculated using, as parameters, the number of engine revolutions, the engine load of the internal combustion engine 1, and the like.

After the CPU 38 terminates the execution of the processing in S806, the CPU 38 terminates the execution of the present routine, and applies, to the solenoid valve 53, a driving pulse signal corresponding to the limit duty ratio, and applies, to the actuator 57, a driving electric power corresponding to the opening degree: dpt of the waist gate valve 56 calculated in S806.

In this case, since the waist gate valve 56 is driven in its opening direction by the predetermined value $k_2$, the amount of exhaust gas bypassing the turbine housing 54b (flow rate of the bypass passage 55) is increased, and the amount of exhaust gas flowing into the turbine housing 54b is reduced correspondingly. Therefore, as the number of revolutions of the turbine wheel 54d is reduced, and the number of revolutions of the compressor wheel 54c is also reduced, the compressing ratio by the compressor housing 54a is reduced and as a result, the supercharging pressure is reduced.

When the supercharging pressure is reducedas described above, the differential pressure between the upstream portion and the downstream portion of the purge passage 51 is reduced as compared with that at the time, however, since the amount of required evaporative fuel is reduces as compared with the last time, it is possible to sufficiently purge the amount of required evaporative fuel gas even with the small differential pressure.

According to the present embodiment described above, by controlling the opening degree of the waist gate valve 56, it is possible to change the differential pressure between the pressure in the intake pipe 18 upstream the turbine housing 54b and the pressure in the intake pipe 18 downstream the turbine housing 54b, that is, the differential pressure between the upstream portion and the downstream portion of the purge passage 51 in accordance with an amount of required evaporative fuel gas, and it is possible to securely purge the amount of required evaporative fuel gas.

At that time, since the opening degree of the waist gate valve 56 is not connected as long as the amount of required evaporative fuel gas is smaller than the amount of limit evaporative fuel gas, it is possible to suppress the variation of the engine operating state due to the purge of the evaporative fuel gas.

FOURTH EMBODIMENT

A fourth embodiment of the evaporative fuel processing apparatus according to the present invention will be explained based on FIG. 9. Here, a structure different from the above-described third embodiment will be explained, and a description of the same structure will be omitted.

In the third embodiment, an example in which the required duty ratio: dpg is used as parameter to correct the opening degree of the waist gate valve 56 is explained, however, in the present embodiment, an example in which a pressure in the intake pipe 18 downstream the throttle valve 20, that is, a supercharging pressure is used as a parameter to correct the opening degree of the waist gate valve 56 will be explained In this case, the relationship between the supercharging pressure and the amount of limit evaporative fuel gas when the throttle valve 20 is held in a substantially fully opened state, and the relationship between the opening degree (duty ratio) of the solenoid valve 53 and the evaporative fuel gas amount are previously obtained by experiment and the like, and a supercharging pressure control map showing the relationship between the supercharging pressure and the opening degree (duty ratio) of the solenoid valve 53 is prepared from these relationship, and the supercharging pressure control map is stored in the ROM 39.

When the purge control of the evaporative fuel gas is executed, the CPU 38 calculates the required opening degree (required duty ratio) of the solenoid valve 53 in the same procedure as that in the third embodiment, and then the supercharging pressure corresponding to the required duty ratio (the supercharging pressure is referred to as a target supercharging pressure: kvp, hereinafter) is read out from the supercharging pressure control map.

Next, the CPU 38 applies, to the solenoid valve 53, a driving pulse signal corresponding to the required duty ratio and then, inputs an output signal value (actual supercharging pressure: vp) from the pressure sensor 47. Then, the CPU 38 compares the actual supercharging pressure: vp with the target supercharging pressure: kvp.

At that time, if the actual supercharging pressure: vp is lower than the target supercharging pressure: kvp, the CPU 38 corrects the opening degree of the waist gate valve 56 to its closing direction so as to enhance the actual supercharging pressure to the target supercharging pressure: kvp.

Further, if the actual supercharging pressure: vp is higher than the target supercharging pressure: kvp, the CPU 38 determines that the waist gate valve 56 has already been corrected to the closing direction and the amount of required evaporative fuel gas tends to be reduced, the CPU 38 corrects the opening degree of the waist gate valve 56 to its opening direction.

In the case that the actual supercharging pressure: vp is equal to the target supercharging pressure: kvp, the CPU 38 does not correct the opening degree of the waist gate valve 56.

Other structure is the same as that of the third embodiment described above.

Operations and effects of the present embodiment will be explained below.

Figure 9:
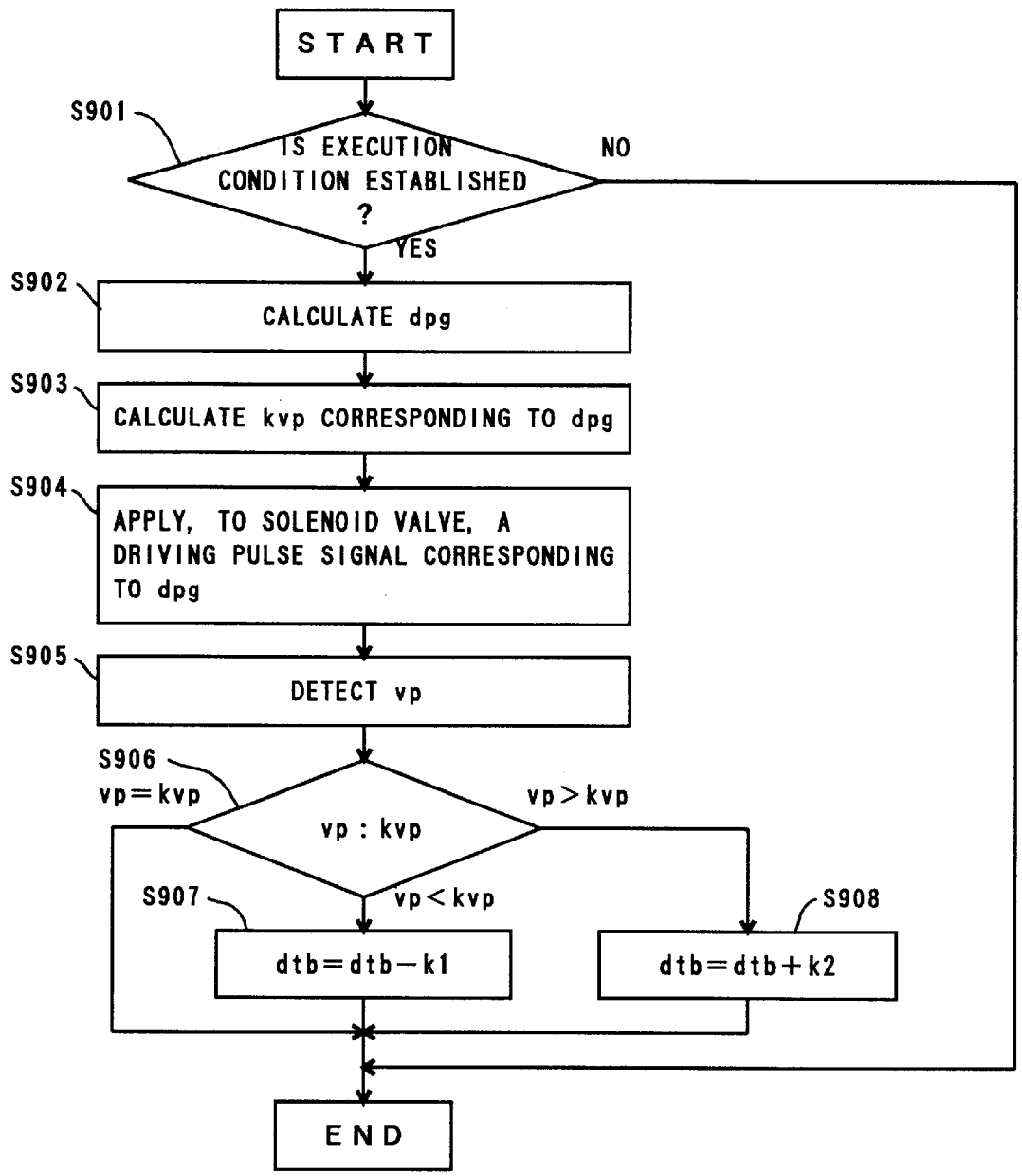
FIG. 9 is a flowchart showing a purge execution control routine according to a fourth embodiment.

In the case that the internal combustion engine 1 is in a stratified combustion operating state, the CPU 38 executes a purge execution control routine as shown in FIG. 9 every predetermined time (e.g., 100 ms). In this purge execution control routine, the CPU 38 first determines whether the purge execution condition of the evaporative fuel gas is established in S901.

In the case that it is determined that the purge execution condition of the evaporative fuel gas is not established in S901, the CPU 38 once terminates the execution of the present routine, and in the case that it is determined that the purge execution condition of the evaporative fuel gas is established, the CPU 38 advances to S902.

In S902, the CPU 38 specifies the amount of required evaporative fuel gas from output signals from the various sensors and the control map stored in the ROM 39 and then, calculates the required duty ratio: dpg corresponding to the amount of required evaporative fuel gas. This required duty ratio is stored in a predetermined region in the RAM 40.

Then, the CPU 38 advances to S903 where the CPU 38 accesses to a supercharging pressure control map in the ROM 39, and calculates the target supercharging pressure: kvp corresponding to the required duty ratio: dpg calculated in S902.

In S904, the CPU 38 applies, to the solenoid valve 53, a driving pulse signal corresponding to the required duty ratio: dpg calculated in S902. Thereafter, the CPU 38 advances to S905, where the CPU 38 inputs the output signal value (actual supercharging pressure: vp) from the pressure sensor 47, and advances to S906.

In S906, the CPU 38 compares the target supercharging pressure: kvp calculated in S903 with the actual supercharging pressure: vp calculated in S905.

In the case that it is determined in S906 that the actual supercharging pressure: vp is equal to the target supercharging pressure: kvp, the CPU 38 does not correct the opening degree of the waist gate valve 56, and terminates the execution of the present routine.

In the case that it is determined in S906 that the actual supercharging pressure: vp is lower than the target supercharging pressure: kvp, the CPU 38 determines that the amount of required evaporative fuel gas tends to be increased, and advances to S907.

In S907, the CPU 38 subtracts the predetermined amount: $k_1$ from the opening degree of the waist gate valve 56 at that time to calculate a new opening degree of the waist gate valve 56.

After the CPU 38 terminated the execution of the processing in S907, the CPU 38 terminates the execution of the present routine, and applies, to the actuator 57, a driving electric power corresponding to the opening degree: dpt of the waist gate valve 56 calculated in S907.

In this case, since the waist gate valve 56 is driven in its closing direction by the predetermined value $k_1$, the amount of exhaust gas bypassing the turbine housing 54b (the bypass passage 55) is reduced, and the amount of exhaust gas flowing into the turbine housing 54b is increased correspondingly. Therefore, as the number of revolutions of the turbine wheel 54d is increased, and the number of revolutions of the compressor wheel 54c is also increased, the compressing ratio by the compressor housing 54a is increased and as a result, the supercharging pressure is increased.

When the supercharging pressure is increased as described above, since the differential pressure between the upstream portion and the downstream portion of the purge passage 51 is increased and the amount of limit evaporative fuel gas is increased, it is possible to securely purge the amount of required evaporative fuel gas.

On the other hand, in the case that it is determined in S906 that the actual supercharging pressure: vp is higher than the target supercharging pressure: kvp, the CPU 38 determines that the waist gate valve 56 has already been corrected to the closing direction and the amount of required evaporative fuel gas tends to be reduced, and advances to S908.

In S908, the CPU 38 adds the predetermined amount: k2 to the opening degree: dpt of the waist gate valve 56 at that time to calculate a new opening degree: dpt of the waist gate valve 56.

After the CPU 38 terminated the execution of the processing in S908, the CPU 38 terminates the execution of the present routine, and applies, to the actuator 57, a driving electric power corresponding to the opening degree: dpt of the waist gate valve 56 calculated in S908.

In this case, since the waist gate valve 56 is driven in its opening direction by the predetermined value $k_2$, the amount of exhaust gas bypassing the turbine housing 54b (flow rate of the bypass passage 55) is increased, and the amount of exhaust gas flowing into the turbine housing 54b is reduced correspondingly. Therefore, the number of revolutions of the turbine wheel 54d is reduced, and the number of revolutions of the compressor wheel 54c is also reduced, the compressing ratio by the compressor housing 54a is reduced and as a result, the supercharging pressure is reduced.

When the supercharging pressure is reduced as described above, the differential pressure between the upstream portion and the downstream portion of the purge passage 51 is reduced as described above, however, since the required evaporative fuel amount is reduces as compared with the last time, it is possible to sufficiently purge the amount of required evaporative fuel gas even with the small differential pressure.

According to the present embodiment as described above, the same effects as those of the third embodiment can be obtained.

FIFTH EMBODIMENT

A fifth embodiment of the evaporative fuel processing apparatus according to the present invention will be explained based on FIGS. 10 and 11. Here, a structure different from the above-described third embodiment will be explained, and a description of the same structure will be omitted.

Figure 10:
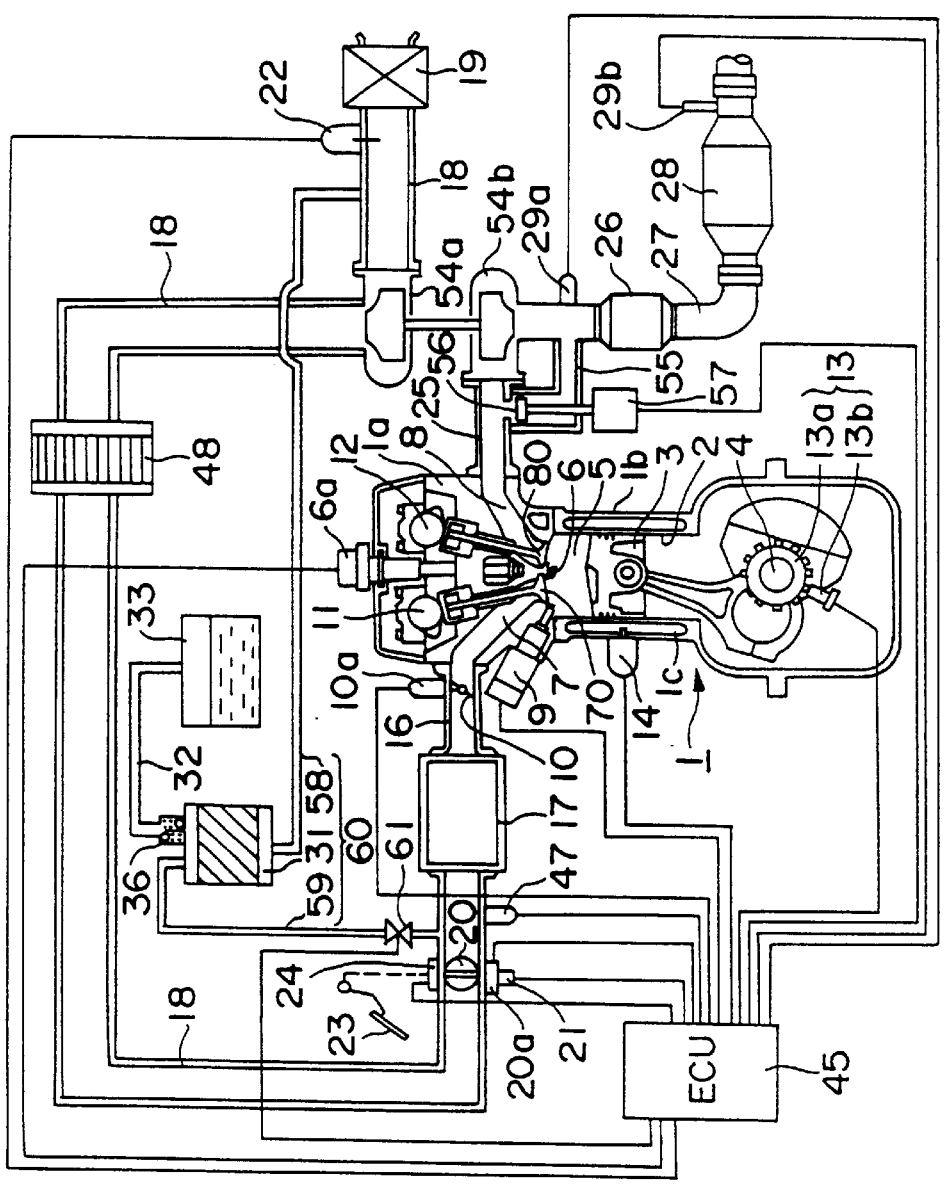
FIG. 10 is a schematic configuration diagram of an internal combustion engine to which an evaporative fuel processing apparatus according to a fifth embodiment is applied.

FIG. 10 is a diagram showing a schematic configuration of an internal combustion engine to which an evaporative fuel processing apparatus according to the present embodiment is applied. As shown in FIG. 10, an atmosphere introducing passage 58 for introducing the atmosphere to the charcoal canister 31 is connected to the intake pipe 18 upstream the compressor housing 54a, and an evaporative fuel exhaust passage 59 for discharging the evaporative fuel gas from the charcoal canister 31 is connected to the intake pipe 18 downstream the throttle valve 20. A solenoid valve 61 which is duty-controlled is mounted to an intermediate portion of the evaporative fuel exhaust passage 59.

The charcoal canister 31, the atmosphere introducing passage 58 and the evaporative fuel exhaust passage 59 realize a purge passage of the present invention (the charcoal canister 31, the atmosphere introducing passage 58 and the evaporative fuel exhaust passage 59 will be generally referred to as a "purge passage 60", hereinafter).

In this case, when the evaporative fuel adsorbed in the charcoal canister 31 is purged, the CPU 38 calculates the evaporative fuel gas amount from an operating state of the internal combustion engine 1, a state of the fuel tank 33, a state of the charcoal canister 31 and the like and then, calculates the opening degree (required duty ratio) of the solenoid valve 61 corresponding to the amount of required evaporative fuel gas.

Sequentially, the CPU 38 applies a driving pulse signal corresponding to the required duty ratio to the solenoid valve 61 to bring the purge passage 60 into a conductive state.

In this case, a pressure in the intake pipe 18 upstream the throttle valve 20 becomes atmospheric pressure, an intake pipe negative pressure is generated in the intake pipe 18 downstream the throttle valve 20 and therefore, a differential pressure is generated between the upstream portion and the downstream portion of the purge passage 60. Due to this differential pressure, a part of the atmosphere flowing in the intake pipe 18 upstream the throttle valve 20 flows into the purge passage 60, and is introduced into the intake pipe 18 downstream the throttle valve 20. That is, a flow of the atmosphere flowing through the charcoal canister 31 is generated in the purge passage 60.

As a result, the evaporative fuel adsorbed by the adsorbent in the charcoal canister 31 is separated from the adsorbent due to the flow of atmosphere, and is introduced into the intake pipe 18 downstream the throttle valve 20 together with the atmosphere.

When the solenoid valve 61 is in a fully opened state, the maximum amount (amount of limit evaporative fuel gas) of evaporative fuel gas capable of being purged from the charcoal canister 31 to the intake pipe 18 is varied in accordance with the differential pressure between the upstream portion and the downstream portion of the purge passage 60, that is, in accordance with the differential pressure between the atmospheric pressure and the intake pipe negative pressure. However, in the case that the internal combustion engine 1 is in the stratified combustion operating state, since the throttle valve 20 is controlled to substantially maintain the fully opened state, if the air compressed in the compressor housing 54a flows into downstream the throttle valve 20, the differential pressure between the intake pipe negative pressure and the atmospheric pressure becomes small, and the amount of limit evaporative fuel gas is reduced.

Thereupon, in the present embodiment, a map showing the relationship between the intake pipe negative pressure (supercharging pressure) and the amount of limit evaporative fuel gas at the time of the stratified combustion operating is previously stored in the ROM 39.

Then, the CPU 38 detects the intake pipe negative pressure (supercharging pressure) at the time when the internal combustion engine 1 is in the stratified combustion operating state, and calculates the amount of limit evaporative fuel gas from the detected value and the map in the ROM 39. Subsequently, the CPU 38 determines whether the amount of required evaporative fuel gas is greater than the amount of limit evaporative fuel gas. In the case that it is determined that the amount of required evaporative fuel gas is greater than the amount of limit evaporative fuel gas, the CPU 38 corrects the opening degree of the waist gate valve 56 to the opening direction to lower the supercharging pressure, and to increase the difference between the intake pipe negative pressure of downstream the throttle valve 20 and the atmospheric pressure.

By controlling the operating state of the centrifugal supercharger 54, the CPU 38 realizes a differential pressure changing means according to the present invention.

Operations and effects of the present embodiment will be explained below.

Figure 11:
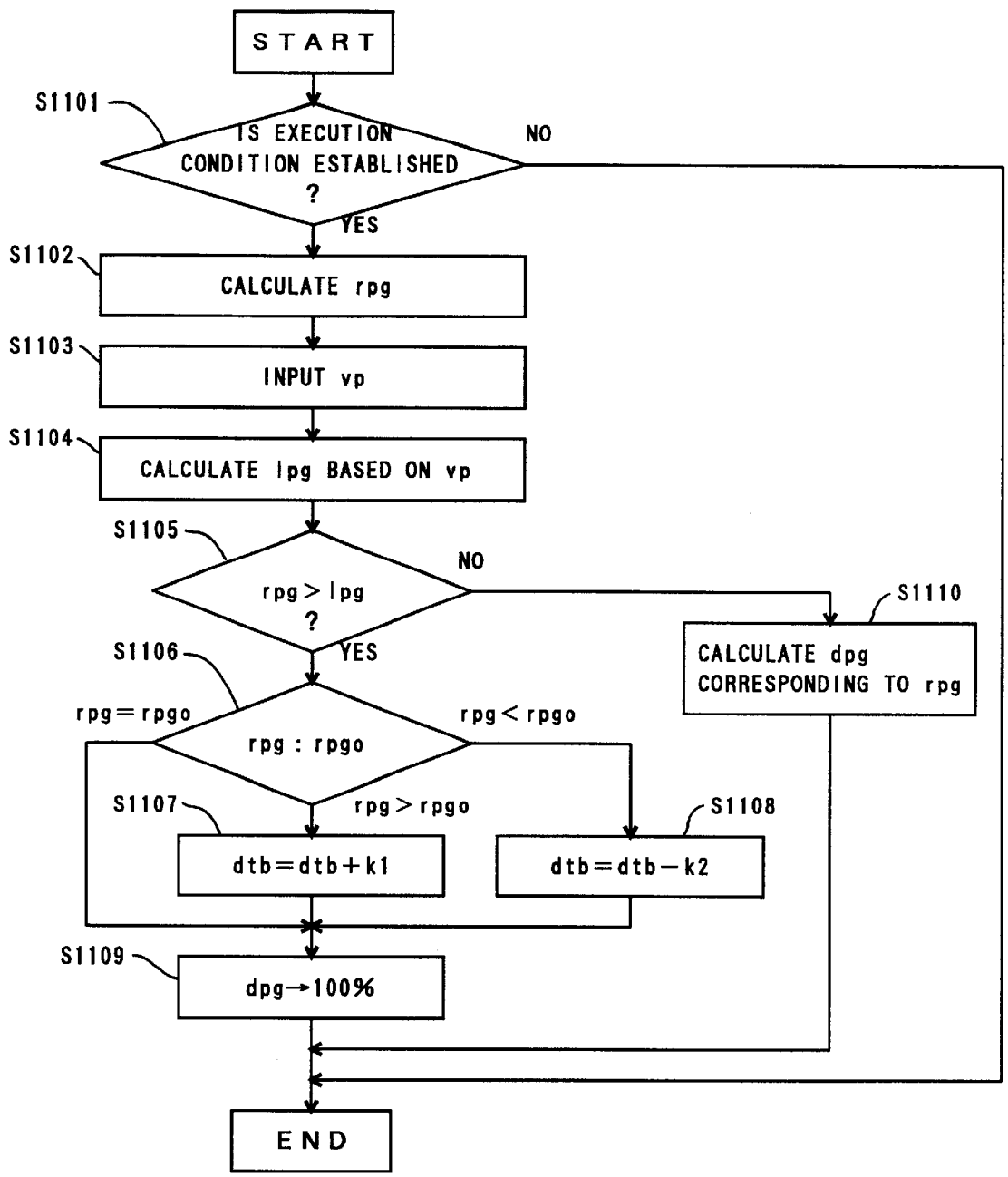
FIG. 11 is a flowchart showing a purge execution control routine according to the fifth embodiment.

At the time when the internal combustion engine is in a stratified combustion operating state, the CPU 38 executes a purge execution control routine as shown in FIG. 11 every predetermined time (e.g., 100 ms). In this purge execution control routine, the CPU 38 first determines whether the purge execution condition of the evaporative fuel gas is established in S1101.

In the case that it is determined that the purge execution condition of the evaporative fuel gas is not established in S1101, the CPU 38 once terminates the execution of the present routine, and in the case that it is determined that the purge execution condition of the evaporative fuel gas is established, the CPU 38 advances to S1102.

In S1102, the CPU 38 calculates the amount of required evaporative fuel gas: rpg from output signals from the various sensors and the control map stored in the ROM 39, and stores in a predetermined region in the RAM 40.

In S1103, the CPU 38 inputs the output signal value (supercharging pressure): vp of the pressure sensor 47, calculates the differential pressure between the supercharging pressure: vp and the atmospheric pressure in S1104, and calculates the amount of limit evaporative fuel gas: lpg capable of being purged with the differential pressure.

Subsequently, the CPU 38 advances to S1105 where the CPU 38 determines whether the amount of required evaporative fuel gas: rpg calculated in S1102 is greater than the amount of limit evaporative fuel gas: lpg calculated in S1104.

In the case that it is determined in S1105 that the amount of required evaporative fuel gas: rpg is equal to or smaller than the amount of limit evaporative fuel gas: lpg, the CPU 38 advances to S1110 where the opening degree (required duty ratio): dpg of the solenoid valve 61 corresponding to the amount of required evaporative fuel gas is calculated. Then, the CPU 38 once terminates the execution of the present routine, and applies, to the solenoid valve 61, a driving pulse signal corresponding to the required duty ratio calculated in S1110.

On the other hand, in the case that it is determined in S1105 that the amount of required evaporative fuel gas: rpg is greater than the amount of limit evaporative fuel gas: lpg, the CPU 38 advances to S1106, where the amount of required evaporative fuel gas: rpgo calculated at the last time is read out from the RAM 40, and the amount of required evaporative fuel gas: rpgo and the amount of required evaporative fuel gas: rpg which is calculated this time are compared with each other.

In S1106, in the case that it is determined that the amount of required evaporative fuel gas: rpgo at the last time is equal to the amount of required evaporative fuel gas: rpg at this time, the CPU 38 advances to S1109 where the CPU 38 sets the opening degree of the solenoid valve 61 to a fully opened state (dpg=100%). The CPU 38 once terminates the execution of the present routine, and applies, to the solenoid valve 61, a driving pulse signal corresponding to the duty ratio of 100%.

In the case that it is determined in S1106 that the amount of required evaporative fuel gas: rpg at this time is greater than the amount of required evaporative fuel gas: rpgo at the last time, the CPU 38 advances to S1107 where the CPU 38 adds the predetermined value: $k_1$ to the opening degree: dtb of the waist gate valve 56 at that time to calculate a new opening degree: dtb of the waist gate valve 56.

Subsequently, the CPU 38 advances to S1109, where the CPU 38 sets the opening degree: dpg of the solenoid valve 61 to a fully opened state (dpg=100%) to terminate the execution of the present routine once. Then, the CPU 38 applies, to the actuator 57, a driving electric power corresponding to the opening degree: dtb of the waist gate valve 56 calculated in S1107, and applies, to the solenoid valve 61, a driving pulse signal corresponding to the opening degree: dpg (=100%) of the solenoid valve 61 set in S1109.

In this case, since the waist gate valve 56 is driven in its opening direction by the predetermined value $k_1$, the amount of exhaust gas bypassing the turbine housing 54b (flow rate of the bypass passage 55) is increased, and the amount of exhaust gas flowing into the turbine housing 54b is reduced correspondingly. Therefore, the number of revolutions of the turbine wheel 54d is reduced, and the number of revolutions of the compressor wheel 54c is also reduced, the compressing ratio by the compressor housing 54a is reduced and as a result, the supercharging pressure is reduced.

When the supercharging pressure is reduced in this manner, the degree of the negative pressure in the intake pipe 18 downstream the throttle valve 20 is increased, a difference between a pressure in the intake pipe 18 downstream the throttle valve 20 and a pressure in the intake pipe 18 upstream compressor housing 54a, that is, the differential pressure between the upstream portion and the downstream portion of the purge passage 60 is increased and therefore, it is possible to securely purge the amount of required evaporative fuel gas.

In the case that it is determined that the amount of required evaporative fuel gas: rpg at that time is smaller than the amount of required evaporative fuel gas: rpgo of last time, the CPU 38 determines that the waist gate valve 56 has already been corrected to the opening direction and that the amount of required evaporative fuel gas tends to be reduceed, and the CPU 38 advances to S1108.

In S1108, the CPU 38 subtract the predetermined value: $k_2$ from the opening degree: dtb of the waist gate valve 56 at that time to calculate a new opening degree of the waist gate valve 56.

Subsequently, the CPU 38 advances to S1109, where the CPU 38 sets the opening degree of the solenoid valve 61: dpg to a fully opened state (dpg=100%) to terminate the present routine once. Then, the CPU 38 appllies, to the actuator 57, a driving electric power corresponding to the opening degree: dtb of the waist gate valve 56 calculated in S1108, and applies, to the solenoid valve 61, a driving pulse signal corresponding to the opening degree: dpg (=100%) of the solenoid valve 61 set in S1109.

In this case, since the waist gate valve 56 is driven to the closing direction by the predetermined value $k_2$, the amount of exhaust gas bypassing the turbine housing 54b (flow rate of the bypass passage 55) is reduced, and the amount of exhaust gas flowing into the turbine housing 54b is increased correspondingly. Therefore, as the number of revolutions of the turbine wheel 54d is increased, the number of revolutions of the compressor wheel 54c is also increased, the compressing ratio by the compressor housing 54a is increased and as a result, the supercharging pressure is increased.

When the supercharging pressure is increased in this manner, the degree of the negative pressure in the intake pipe 18 downstream the throttle valve 20 is lowered, and the differential pressure between the upstream portion and the downstream portion of the purge passage 60 becomes smaller as compared with that at the last time, however, since the amount of required evaporative fuel gas is reduced as compared with that at the last time, it is possible to sufficiently purge the amount of required evaporative fuel gas even with the small differential pressure.

According to the embodiment described above, it is possible to increase the differential pressure between the upstream portion and the downstream portion of the purge passage 60 by positively lowering the supercharging pressure, and it is possible to securely purge the amount of required evaporative fuel gas.

SIXTH EMBODIMENT

A sixth embodiment of the evaporative fuel processing apparatus of the invention will be explained based on FIG. 12. Here, a structure different from the above-described fifth embodiment will be explained, and a description of the same structure will be omitted.

In the above-described fifth embodiment, an example in which the differential pressure between the upstream portion and the downstream portion of the purge passage 60 is changed by controlling the waist gate valve 56 is described. In the present embodiment, an example in which the differential pressure between the upstream portion and the downstream portion of the purge passage 60 is changed by selectively controlling the waist gate valve 56 and the throttle valve 20 will be explained.

Examples of method for selectively controlling the waist gate valve 56 and the throttle valve 20 are: (1) a method in which in the case that the amount of required evaporative fuel gas is equal to or lower than a predetermined amount, the differential pressure is changed only by controlling the waist gate valve 56, and in the case that the amount of required evaporative fuel gas exceeds the predetermined amount (in the case that a desired differential pressure can not be obtained only by controlling the waist gate valve 56), not only the waist gate valve 56, but also the throttle valve 20 is controlled to change the differential pressure; (2) a method in which in the case that the amount of required evaporative fuel gas is equal to or less than the predetermined amount, the differential pressure is changed only by controlling the throttle valve 20, and in the case that the amount of required evaporative fuel gas exceeds the predetermined amount (in the case that a desired differential pressure can not be obtained only by controlling the throttle valve 20), not only the throttle valve 20, but also the waist gate valve 56 is controlled to change the differential pressure; and (3) a method in which at least one of the waist gate valve 56 and the throttle valve 20 is controlled in accordance with the operating state of the internal combustion engine 1 to change the differential pressure.

Here, the method (2) will be explained as an example. In this case, maps showing the relationship between the intake pipe negative pressure (supercharging pressure) at the time of the stratified combustion operating and the amount of limit evaporative fuel gas (this amount of limit evaporative fuel gas is referred to as a "first amount of limit evaporative fuel gas", hereinafter), and the relationship among the opening degree of the waist gate valve 56, the intake pipe negative pressure (supercharging pressure), and the amount of limit evaporative fuel gas (this amount of limit evaporative fuel gas is referred to as a "second amount of limit evaporative fuel gas", hereinafter) when the waist gate valve 56 is fully opened are stored in the ROM 39.

The CPU 38 calculates the first amount of limit evaporative fuel gas from the output signal from the pressure sensor 47 and the map in the ROM 39 to judge whether the amount of required evaporative fuel gas is greater than the first amount of limit evaporative fuel gas.

In the case that it is determined that the amount of required evaporative fuel gas is greater than the first amount of limit evaporative fuel gas, the CPU 38 detects the opening degree of the waist gate valve 56, and calculates the second amount of limit evaporative fuel gas from this detected value, the intake pipe negative pressure (supercharging pressure) and the map in ROM 39.

Subsequently, the CPU 38 determines whether the amount of required evaporative fuel gas is equal to or smaller than the second amount of limit evaporative fuel gas. In the case that it is determined that the amount of required evaporative fuel gas is equal to or smaller than the second amount of limit evaporative fuel gas, the CPU 38 determines that the amount of required evaporative fuel gas can be purged only by controlling the waist gate valve 56, and corrects the opening degree of the waist gate valve 56 to increase the differential pressure between the upstream portion and the downstream portion of the purge passage 60.

On the other hand, in the case that it is determined that the amount of required evaporative fuel gas is greater than the second amount of limit evaporative fuel gas, the CPU 38 determines that the amount of required evaporative fuel gas can not be purged only by controlling the waist gate valve 56, and corrects the opening degree of the throttle valve 20 in addition to the opening degree of the waist gate valve 56 so as to further increase the differential pressure between the upstream portion and the downstream portion of the purge passage 60.

By selectively controlling the waist gate valve 56 and the throttle valve 20, the CPU 38 realizes a differential pressure changing means of the present invention.

Operations and effects of the present embodiment will be explained below.

Figure 12:
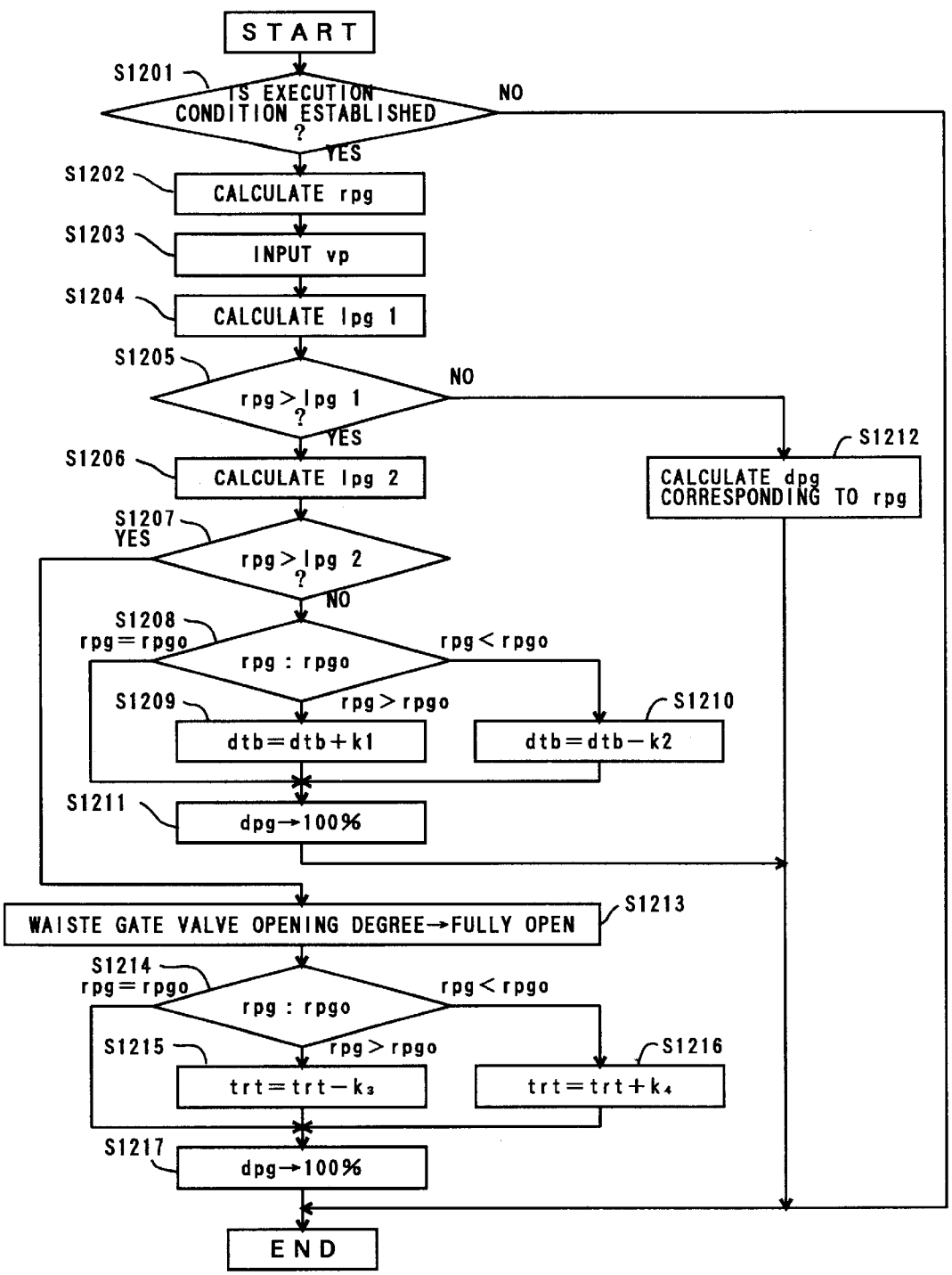
FIG. 12 is a flowchart showing a purge execution control routine according to a sixth embodiment.

At the time of stratified combustion operating of the internal combustion engine 1, the CPU 38 executes a purge execution control routine as shown in FIG. 12 every predetermined time (e.g., 100 ms). In this purge execution control routine, the CPU 38 first determines whether the purge execution condition of the evaporative fuel gas is established in S1201.

In the case that it is determined that the purge execution condition of the evaporative fuel gas is not established in S1201, the CPU 38 once terminates the execution of the present routine, and in the case that it is determined that the purge execution condition of the evaporative fuel gas is established, the CPU 38 advances to S1202.

In S1202, the CPU 38 calculates the amount of required evaporative fuel gas: rpg from output signals from the various sensors and the control map stored in the ROM 39, and stores in a predetermined region in the RAM 40.

In S1203, the CPU 38 inputs the output signal value (supercharging pressure): vp of the pressure sensor 47 and then, calculates the first evaporative fuel gas amount: lpg1 from the supercharging pressure: vp and the map in the ROM 39 in S1204.

Subsequently, the CPU 38 advances to S1205, where the CPU 38 determines whether the amount of required evaporative fuel gas: rpg calculated in S1202 is greater than the first amount of limit evaporative fuel gas: lpg1 calculated in S1204.

In the case that it is determined in S1205 that the amount of required evaporative fuel gas: rpg is equal to or smaller than the first amount of limit evaporative fuel gas: lpg1, the CPU 38 advances to S1212 where the opening degree (required duty ratio) of the solenoid valve 61 corresponding to the amount of required evaporative fuel gas is calculated. Then, the CPU 38 terminates the execution of the present routine, and applies, to the solenoid valve 61, a driving pulse signal corresponding to the required duty ratio calculated in S1210.

On the other hand, in the case that it is determined in S1205 that the amount of required evaporative fuel gas: rpg is greater than the first amount of limit evaporative fuel gas: lpg1, the CPU 38 advances to S1206, where the second amount of required evaporative fuel gas: lpg2 from the opening degree: dtb of the waist gate valve 56 at that time, the supercharging pressure: vp and the map in the ROM 39.

Subsequently, the CPU 38 advances to S1207, where the CPU 38 determines whether the amount of required evaporative fuel gas: rpg calculated in S1202 is greater than the second amount of limit evaporative fuel gas: lpg2.

In the case that it is determined in S1207 that the amount of required evaporative fuel gas: rpg is equal to or smaller than the second amount of limit evaporative fuel gas: lpg2, the CPU 38 advances to S1208, where the amount of required evaporative fuel gas: rpgo which is calculated last time is read out from the RAM 40, and the amount of required evaporative fuel gas: rpgo is compared with the amount of required evaporative fuel gas: rpg calculated at this time.

In the case that it is determined in S1208 that the amount of required evaporative fuel gas: rpgo at the last time is equal to the amount of required evaporative fuel gas: rpg at that time, the CPU 38 advances to S1211 where the CPU 38 sets the opening degree of the solenoid valve 61 to a fully opened state (dpg=100%). Then, the CPU 38 once terminates the execution of the present routine, and applies, to the solenoid valve 61, a driving pulse signal corresponding to the duty ratio of 100%.

In the case that it is determined in S1208 that the amount of required evaporative fuel gas: rpg at that time is greater than the amount of required evaporative fuel gas: rpgo at the last time, the CPU 38 advances to S1209, where the CPU 38 adds the predetermined value: $k_1$ to the opening degree: dtb of the waist gate valve 56 at that time to calculate a new opening degree: dtb of the waist gate valve 56.

Subsequently, the CPU 38 advances to S1211, where the CPU 38 sets the opening degree of the solenoid valve 61 to a fully opened state (dpg=100%) to terminate the execution of the present routine. Then, the CPU 38 applies, to the actuator 57, a driving electric power corresponding to the opening degree: dtb of the waist gate valve 56 calculated in S1209, and applies, to the solenoid valve 61, a driving pulse signal corresponding to the opening degree: dpg (=100%) of the solenoid valve 61 set in S1211.

In this case, since the waist gate valve 56 is driven to the opening direction by the predetermined value $k_1$, the amount of exhaust gas bypassing the turbine housing 54b (flow rate of the bypass passage 55) is increased, and the amount of exhaust gas flowing into the turbine housing 54b is reduced correspondingly. Therefore, the number of revolutions of the turbine wheel 54d is reduced, and the number of revolutions of the compressor wheel 54c is also reduced, the compressing ratio by the compressor housing 54a is reduced and as a result, the supercharging pressure is reduced.

When the supercharging pressure is reduced in this manner, the degree of the negative pressure in the intake pipe 18 downstream the throttle valve 20 is increased, the a difference between a pressure in the intake pipe 18 downstream the throttle valve 20 and a pressure in the intake-pipe 18 upstream the compressor housing 54a, that is, the differential pressure between the upstream portion and the downstream portion of the purge passage 60 is increased and therefore, it is possible to securely purge the amount of required evaporative fuel gas.

In the case that it is determined in S1208 that the current amount of required evaporative fuel gas: rpg at that time is smaller than the amount of required evaporative fuel gas: rpgo at the last time, the CPU 38 determines that the waist gate valve 56 has already been corrected ton the opening direction and that the amount of required evaporative fuel gas tends to be reduced, and the CPU 38 advances to S1210.

In S1210, the CPU 38 subtract the predetermined value: $k_2$ from the opening degree: dtb of the waist gate 56 at that time to calculate a new opening degree of the waist gate valve 56.

Subsequently, the CPU 38 advances to S1211, where the CPU 38 sets the opening degree: dpg of the solenoid valve 61 to a fully opened state (dpg=100%) to terminate the present routine. Then, the CPU 38 applies, to the actuator 57, a driving electric power corresponding to the opening degree: dtb of the waist gate valve 56 calculated in S1210, and applies, to the solenoid valve 61, a driving pulse signal corresponding to the opening degree: dpg (=100%) of the solenoid valve 61 set in S1211.

In this case, since the waist gate valve 56 is driven to the closing direction by the predetermined value $k_2$, the amount of exhaust gas bypassing the turbine housing 54b (flow rate of the bypass passage 55) is reduced, and the amount of exhaust gas flowing into the turbine housing 54b is increased correspondingly. Therefore, the number of revolutions of the turbine wheel 54d is increased, and the number of revolutions of the compressor wheel 54c is also increased, the compressing ratio by the compressor housing 54a is increased and as a result, the supercharging pressure is increased.

When the supercharging pressure is increased in this manner, the degree of the negative pressure in the intake pipe 18 downstream the throttle valve 20 is lowered, and the differential pressure between the upstream portion and the downstream portion of the purge passage 60 becomes smaller as compared with that at the last time, however, since the amount of required evaporative fuel gas is reduced as compared with that at the last time, it is possible to sufficiently purge the amount of required evaporative fuel gas even with the small differential pressure.

In the case that it is determined in S1207 that the amount of required evaporative fuel gas: rpg is greater than the second amount of limit evaporative fuel gas: lpg2, the CPU 38 advances to S1213, where the CPU 38 sets the opening degree of the waist gate valve 56 to the fully opened state.

Subsequently, the CPU 38 advances S1214, where the amount of required evaporative fuel gas: rpgo calculated last time is read out from the RAM 40, and the amount of required evaporative fuel gas: rpgo is compared with the amount of required evaporative fuel gas calculated at this time (amount of required evaporative fuel gas: rpg calculated in S1202).

In the case that it is determined that the amount of required evaporative fuel gas: rpg at that time is equal to the amount of required evaporative fuel gas: rpgo at the last time, the CPU 38 advances to S1217 where the opening degree (duty ratio) of the solenoid valve 61 is set to 100% and terminate the execution of the present routine. Then, the CPU 38 applies, to the solenoid valve 61, a driving pulse signal corresponding to the duty ratio of 100%.

In the case that it is determined that the amount of required evaporative fuel gas: rpg at that time is greater than the amount of required evaporative fuel gas: rpgo at the last time, the CPU 38 advances to S1215, where the CPU 38 subtracts a predetermined value $k_3$ from the opening degree: trt of the throttle valve 20 at that time to calculate a new opening degree: trt of the throttle valve 20.

The predetermined value: $k_3$ may be a fixed value previously determined, or a variable value which is calculated using, as parameters, the number of engine revolutions, the engine load of the internal combustion engine 1, and the like.

After the CPU 38 terminated the execution of the processing in S1215, the CPU 38 advances to S1217, where the CPU 387 sets the opening degree of the solenoid valve 61 to the fully opened state (dpg=100%), and once terminates the execution of the present routine. Then, the CPU 38 applies, to the solenoid valve 61, a driving pulse signal corresponding to the duty ratio of 100% to fully open the waist gate valve 56, and applies, to the actuator 21, a driving electric power corresponding to the throttle opening degree: trt calculated in S1215.

In this case, the waist gate valve 56 is fully opened, the amount of exhaust gas bypassing the compressor housing 54a is increased and therefore, the amount of compressed air to be supplied to the downstream portion of the throttle valve 20 is reduced, and the intake pipe negative pressure (supercharging pressure) in the intake pipe 18 downstream the throttle valve 20 is reduced (the degree of the negative pressure in the intake pipe 18 is increased). Further, since the throttle valve 20 is driven to the closing direction by the predetermined amount: $k_3$, the amount of intake air flowing to the intake pipe 18 downstream the throttle valve 20 is reduced, and the intake pipe negative pressure in the intake pipe 18 downstream the throttle valve 20 is further reduced (the degree of the negative pressure in the intake pipe 18 is further increased), the differential pressure between the upstream portion and the downstream portion of the purge passage 60 is increased and therefore, it is possible to securely purge the amount of required evaporative fuel gas.

In the case that it is determined in S1214 that the amount of required evaporative fuel gas: rpg at that time is smaller than the amount of required evaporative fuel gas: rpgo at the last time, the CPU 38 determines that the opening degree of the throttle valve 20 has already been corrected to the closing direction and that the amount of required evaporative fuel gas tends to be reduced, and advances to S1216.

In S1216, the CPU 38 adds a predetermined value: $k_4$ to the opening degree: trt of the throttle valve 20 at that time to calculate a new opening degree: trt of the throttle valve 20. The predetermined value: $k_4$ may be a fixed value previously determined, or a variable value which is calculated using, as parameters, the number of engine revolutions, the engine load of the internal combustion engine 1, and the like.

After the CPU 38 terminates the execution of the processing in S1216, the CPU 38 advances to S1217, where the CPU 38 sets the opening degree of the solenoid valve 61 to the fully opened state (dpg=100%), and once terminates the execution of the present routine. Then, the CPU 38 applies, to the solenoid valve 61, a driving pulse signal corresponding to the duty ratio of 100% to fully open the waist gate valve 56, and applies, to the actuator 21, a driving electric power corresponding to the throttle opening degree: trt calculated in S1216.

In this case, the waist gate valve 56 is fully opened, the amount of exhaust gas bypassing the compressor housing 54a is increased and therefore, the amount of compressed air to be supplied to the downstream portion of the throttle valve 20 is reduced, and the intake pipe negative pressure (supercharging pressure) in the intake pipe 18 downstream the throttle valve 20 is reduced (the degree of the negative pressure in the intake pipe 18 is increased). On the other hand, since the throttle valve 20 is driven to the opening direction by the predetermined amount: $k_4$, the amount of intake air flowing into the intake pipe 18 downstream the throttle valve 20 is increased, and the differential pressure between the upstream portion and the downstream portion of the purge passage 60 is reduced as compared with that at the last time, however, since the amount of required evaporative fuel gas is reduced as compared with that at the last time, it is possible to securely purge the amount of required evaporative fuel gas even with the small pressure differebce.

According to the embodiment described above, it is possible to effectively change the differential pressure between the upstream portion and the downstream portion of the purge passage 60 by selectively controlling the throttle valve 20 and the waist gate valve 56 in accordance with the amount of required evaporative fuel gas, and it is possible to effectively purge the evaporative fuel gas.

SEVENTH EMBODIMENT

A seventh embodiment of the evaporative fuel processing apparatus according to the present invention will be explained based on FIGS. 13 to 16. Here, a structure different from the above-described first embodiment will be explained, and a description of the same structure will be omitted.

In the first embodiment, an example in which the required evaporative fuel amount is purged by adjusting the opening degree of the throttle valve 20 is explained. In the present embodiment, an example in which the purge amount of evaporative fuel is corrected in accordance with a combustion state of the internal combustion engine 1 at the time of the execution of the purge of the evaporative fuel.

In this case, first and second reference value control maps are stored in the ROM 39 of the ECU 45. The first reference value control map indicates relationship between a first reference value (the upper limit value within allowable range) for determining a state of combustion variation of the internal combustion engine 1 and the number of revolutions of the internal combustion engine 1. The second reference value control map indicates the relationship between a second reference value for determining a state of combustion variation of the internal combustion engine 1 and the number of revolutions of the internal combustion engine 1.

There is set in the RAM 40 of the ECU 45 is a region for storing a combustion state identification flag (FDLN) which is set when the combustion state of the internal combustion engine 1 is unstable ("1" is stored), and is reset when the combustion state of the internal combustion engine 1 is stable ("0" is stored).

Further, an idle determining flag (FIDL) storing region and a purge idle determining flag (FPIDL) storing region are set in the RAM 40. These idle determining flag (FIDL) storing region and purge idle determining flag (FPIDL) storing region are set when the internal combustion engine 1 is in an idling state ("1" is stored), and are reset when the internal combustion engine 1 is in a non-idling state ("0" is stored).

When the evaporative fuel is purged, the CPU 38 of the ECU 45 controls the actuator 21 such that the opening degree of the throttle valve 20 becomes smaller than usual. At that time, since an amount of new air flowing into the intake pipe 18 downstream the throttle valve 20 is reduced, the intake pipe negative pressure is increased and the differential pressure between the upstream portion and the downstream portion of the purge passage 46 is increased. The throttle valve 20 and the actuator 21 realize the differential pressure changing means of the present invention as described above.

However, if the differential pressure between the upstream portion and the downstream portion of the purge passage 46 is only increased by correcting the opening degree of the throttle valve 20, a state of mixture in the combustion chamber 5 is varied due to variation in purge amount of evaporative fuel and an amount of intake air, and the combustion state of the internal combustion engine 1 becomes unstable. Therefore, the CPU 38 corrects the opening degree of the throttle valve 20 in accordance with the variation in combustion of the internal combustion engine 1.

Further, in order to purge the evaporative fuel as much as possible within a range in which the combustion state of the internal combustion engine 1 does not become unstable, it is necessary to finely adjust the purge amount in the vicinity of the limit region of the purge amount. However, if the differential pressure between the upstream portion and the downstream portion of the purge passage 46 is changed by correcting the opening degree of the throttle valve 20, the purge amount is varied relatively largely and therefore, it is difficult to finely adjust the purge amount.

To cope with this problem, according to the present embodiment, the purge amount is roughly adjusted by correcting the opening degree of the throttle valve 20 and then, the purge amount is finely adjusted by correcting the opening degree of the solenoid valve 34. By controlling the throttle valve 20 (actuator 21) and the solenoid valve 34 by the CPU 38 in this manner, the purge control means according to the present invention is realized.

Here, concrete processings according to the purge execution control will be explained with reference to a timing chart in FIG. 13.

When the purge execution condition is established, the CPU 38 first determines the combustion state of the internal combustion engine 1. Examples of the parameter for determining the combustion state of the internal combustion engine 1 are a variation in the number of engine revolutions, an output signal value of the combustion pressure sensor, an output signal value of the combustion light sensor, an ion current value generated at the time of combustion, and the like. In the present embodiment, the description will be made while taking the case of the variation in the number of engine revolutions.

The number of engine revolutions variation is a variation amount of engine revolution number per unit time, and the CPU 38 calculates, as an engine revolution number variation: DLN, a difference between the number of engine revolutions (first number of engine revolutions) at a certain time point and the number of engine revolutions (second number of engine revolutions) after a predetermined time has been elapsed from the certain time point.

Next, the CPU 38 determines whether the number of engine revolutions variation: KLN is within an allowable range. More specifically, the CPU 38 accesses to a first reference value control map in the ROM 39, and calculates a first reference value: DLNS1 corresponding to the number of engine revolutions at that time. Then, the CPU 38 compares the engine revolution number variation: DLN with the first reference value: DLNS1.

At that time, if the engine revolution number variation: DLN is equal to or smaller than the first reference value: DLNS1, the CPU 38 determines that the combustion state of the internal combustion engine 1 is stable, and if the engine revolution number variation: DLN is greater than the first reference value: DLNS1, the CPU 38 determines that the combustion state of the internal combustion engine 1 is unstable. In this manner, the CPU 38 realizes combustion state determining means according to the present invention.

Figure 13:
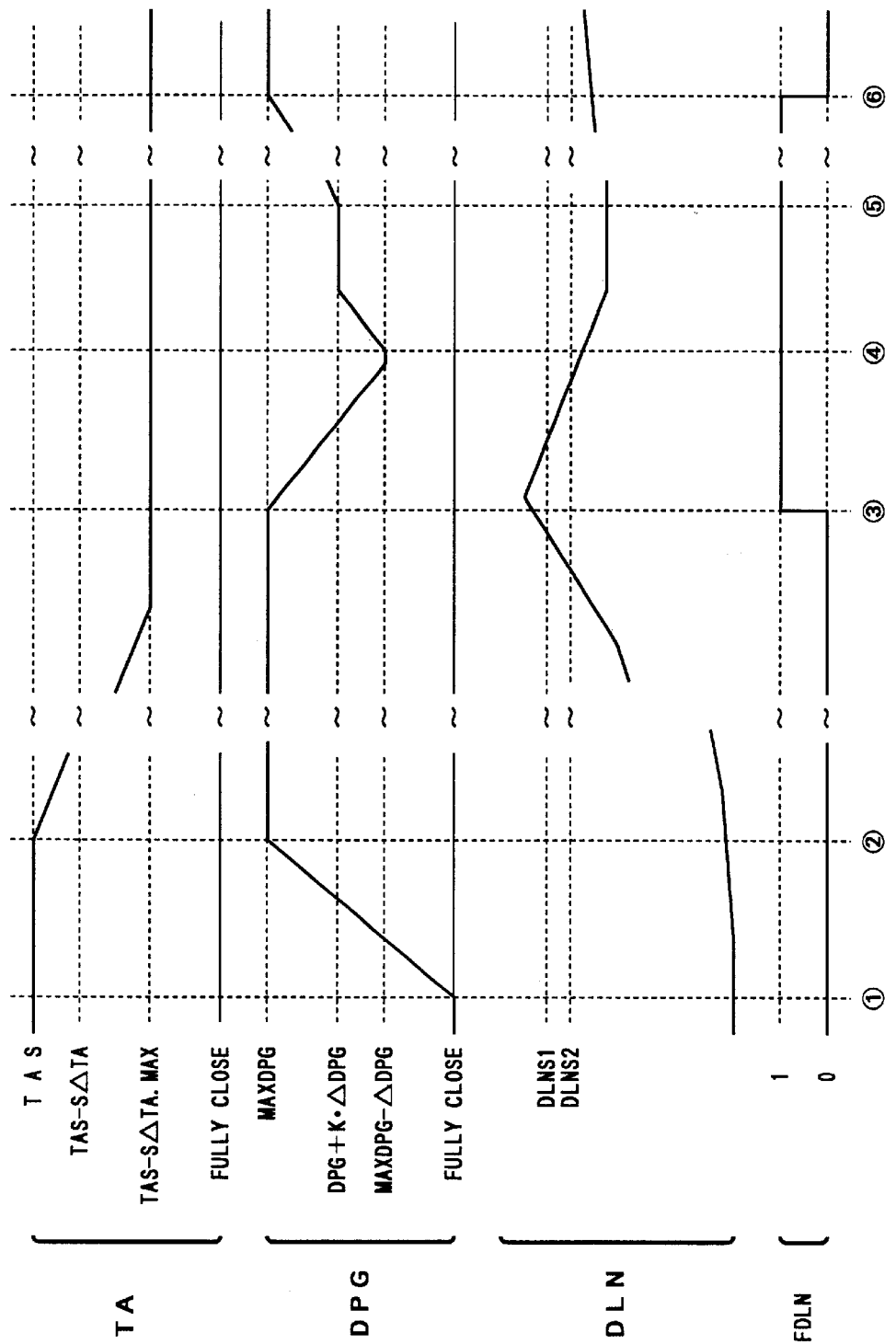
FIG. 13 is a timing chart (1) showing a purge execution control routine according to a seventh embodiment.

In the example in FIG. 13, since the engine revolution number variation before starting the purge (left side of (1) in FIG. 13) is smaller than the first reference value: DLNS1, the CPU 38 determines that the combustion state of the internal combustion engine 1 is stable, and drives the solenoid valve 34 suvh that the opening degree thereof becomes the maximum opening degree: MAXDP ((1) in FIG. 13).

At that time, since the purge passage 46 is brought into a conductive state, a flow of atmosphere flowing through the charcoal canister 31 is generated by a differential pressure between the upstream portion and the downstream portion of the purge passage 46. By this flow of atmosphere, the evaporative fuel adsorbed by the adsorbent in the charcoal canister 31 is separated from the adsorbent and introduced into the intake pipe 18.

Sequentially, in order to increase the intake pipe negative pressure downstream the throttle valve 20, the CPU 38 changes the opening degree of the throttle valve 20 to an opening degree (TAS−SΔTA) which is obtained by closing a normal opening degree (which will be referred to as "standard opening degree: TAS", hereinafter) at the time when the purge is not executed, by a predetermined opening degree: SΔTA ((2) in FIG. 13).

The predetermined opening degree: SΔTA is a value which is updated whenever the opening degree of the throttle valve 20 is corrected to the closing direction, and is calculated by adding a predetermined value: ΔTA to the last value SΔTA. In the case that the initial value of the predetermined opening degree: SΔTA is calculated, a predetermined opening degree: SΔTA calculated at the last time is regarded as "0".

The upper limit value: SΔTAMAX is previously set in the predetermined opening degree: SΔTA, and in the case that the predetermined opening degree: SΔTA calculated at the time of updateing becomes greater than the upper limit value: SΔTAMAX, the upper limit value: SΔTAMAX is used as the predetermined opening degree: SΔTA.

When the opening degree of the throttle valve 20 is corrected to the closing direction by the predetermined opening degree: SΔTA, since the amount of new air flowing into the intake pipe 18 downstream the throttle valve 20 is reduced, the degree of negative pressure of the intake pipe negative pressure is increased and the differential pressure between the upstream portion and the downstream portion of the purge passage 46 is increased. As a result, the flow rate of atmosphere flowing through the charcoal canister 31 is increased, and the amount of evaporative fuel introduced from the charcoal canister 31 into the intake pipe 18 is also increased.

On the other hand, in the case that the amount of evaporative fuel introduced into the intake pipe 18 is increased, a state of mixture to be supplied to the combustion chamber 5 is changed, and the engine revolution number variation: DLN is increased before the purge is executed and therefore, the CPU 38 again calculates the engine revolution number variation: DLN after a predetermined time is elapsed from a time point when the opening degree of the throttle valve 20 is corrected to the closing direction, and compares the calculated engine revolution number variation: DLN with the first reference value: DLNS1.

At that time, if the engine revolution number variation: DLN is equal to or smaller than the first reference value: DLNS1, the CPU 38 updates the predetermined opening degree: SΔTA, and subtracts the predetermined opening degree: SΔTA after updateing from the standard opening degree: TAS to calculate a new opening degree: TA. Then, the CPU 38 controls the actuator 21 such that the opening degree of the throttle valve 20 becomes the new opening degree: TA. In this case, the throttle valve 20 is further driven into the closing direction by ΔTA. Such a correction of the opening degree of the throttle valve 20 into the closing direction is repeated as long as the engine revolution number variation: DLN is equal to or smaller than the first reference value: DLN.

When the engine revolution number variation: DLN becomes greater than the first reference value: DLN by repeating the correction of the opening degree of the throttle valve 20 into the closing direction ((3) in FIG. 13), the CPU 38 determines that the combustion state of the internal combustion engine 1 becomes unstable, and writes "1" in a combustion state identification flag (FDLN) storing region in RAM 40.

Further, the CPU 38 stops the correction of the opening degree of the throttle valve 20 into the closing direction, and controls the actuator 21 such that the opening degree: TA of the throttle valve 20 at that time(TA=TAS−SΔTAMAX in the example in FIG. 13) is maintained.

Then, the CPU 38 executes the following processing for suppressing the engine revolution number variation: DLN.

First, in order to slightly reduce the purge amount of evaporative fuel, the CPU 38 corrects the opening degree of the solenoid valve 34 to the closing direction by a predetermined amount: ΔDPG. In this case, since the flow path of the purge passage 46 is narrowed, the amount of evaporative fuel introduced into the internal combustion engine 1 is reduced, and the engine revolution number variation: DLN is reduced.

After the opening degree of the solenoid valve 34 is corrected into the closing direction, the CPU 38 determines whether the combustion state of the internal combustion engine 1 is stabilized. More specifically, the CPU 38 calculated the engine revolution number variation: DLN after the opening degree of the solenoid valve 34 is corrected, and accesses to the second reference value control map in the ROM 39 to calculate the second reference value: DLNS2 corresponding to the current engine revolution number. Then, the CPU 38 compares the engine revolution number variation: DLN with the second reference value: DLNS2 ((4) in FIG. 13).

Here, since the second reference value: DLNS2 is a value obtained by adding a sufficient margin to the first reference value: DLNS, and is set smaller than the first reference value: DLNS1, if the engine revolution number variation: DLN is equal to or smaller than the second reference value: DLNS2, the CPU 38 can judge that the combustion state of the internal combustion engine 1 is stabilized.

In the example of FIG. 13, since the engine revolution number variation: DLN becomes smaller than the second reference value: DLNS2 at the time point (4) in FIG. 13, the CPU 38 determines that the combustion state of the internal combustion engine 1 is sufficiently stabilized, and slightly corrects the opening degree of the solenoid valve 34 to the opening direction so as to again increase the purge amount of evaporative fuel. In this case, the correction amount is a value (=·ΔDPG) obtained by multiplying a predetermined amount: ΔDPG by a positive number: K which is smaller than "1", and is smaller than the predetermined value: ΔDPG.

Such a correction of the opening degree of the solenoid valve 34 into the opening direction is repeated as long as the engine revolution number variation: DLN is equal to or smaller than the second reference value: DLNS2 ((5) to (6) in FIG. 13).

If the opening degree of the solenoid valve 34 reaches the maximum opening degree: MAXDPG by repeating the correction of the opening degree of the solenoid valve 34 into the opening direction, the CPU 38 terminates the correction of the opening degree of the solenoid valve 34 to the opening direction, and accesses to the combustion state identification flag (FDLN) storing region in the RAM 40 to write "0" ((6) in FIG. 13). Then, the CPU 38 again starts correcting the opening degree of the throttle valve 20 to the closing direction.

On the other hand, if the engine revolution number variation: DLN does not becomes smaller than the second reference value: DLNS2 at the time point (4) in FIG. 13, that is, if the combustion state of the internal combustion engine 1 is not stabilized by the correction of the opening degree of the solenoid valve 34 to closing direction, the CPU 38 further corrects the opening degree of the solenoid valve 34 to the closing direction by the predetermined amount: ΔDPG as shown in a timing chart of FIG. 14.

Figure 14:
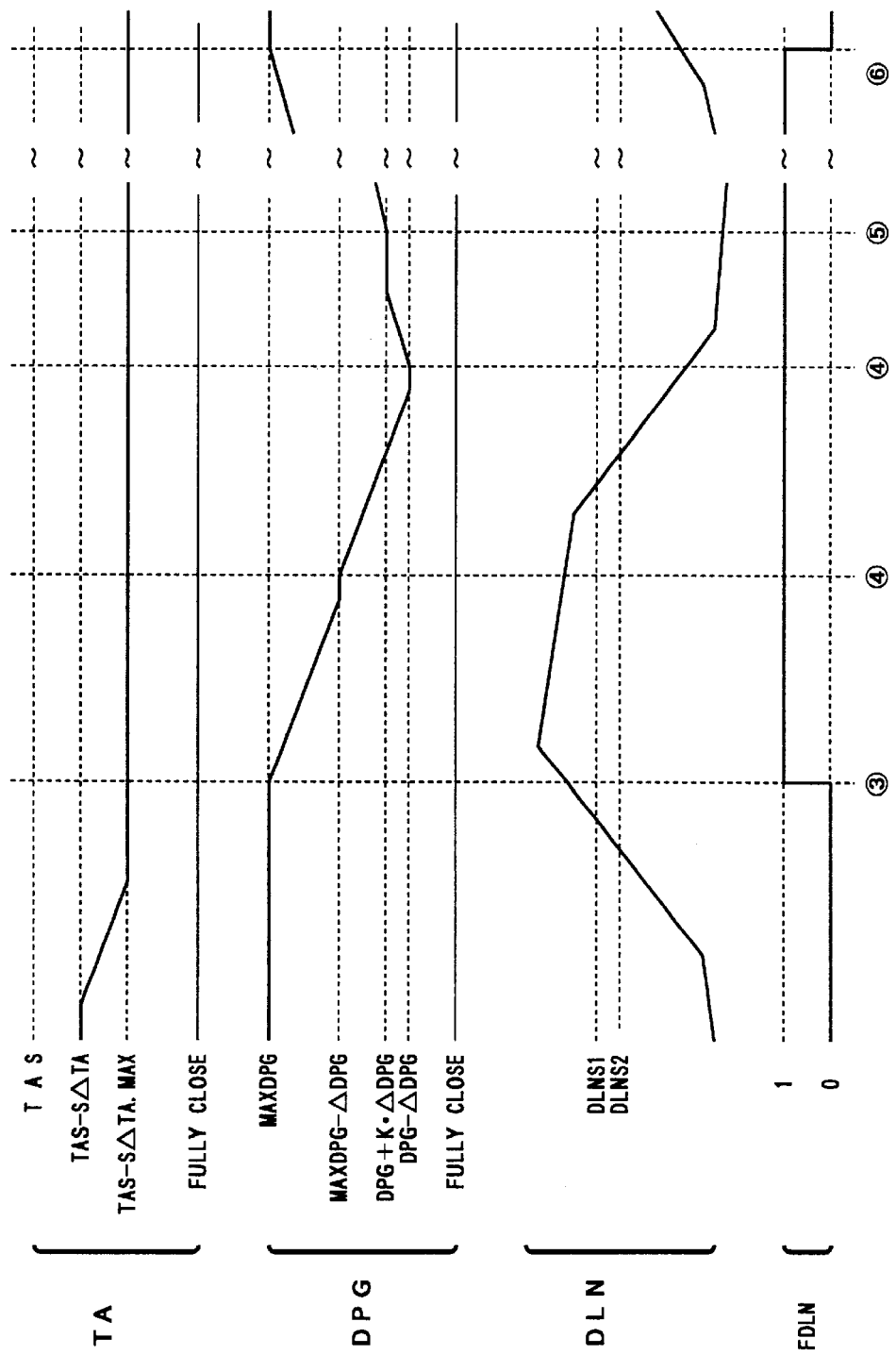
FIG. 14 is a timing chart (2) showing a purge execution control routine according to the seventh embodiment.

When a predetermined time elapsed after the time point when the opening degree of the solenoid valve 34 is corrected by the predetermined amount: ΔDPG ((4)' in FIG. 14), the CPU 38 calculates the engine revolution number variation: DLN, and again compares the calculated engine revolution number variation: DLN with the second reference value: DLNS2.

At that time, if the calculated engine revolution number variation: DLN is greater than the second reference value: DLNS2, the CPU 38 further corrects the opening degree of the solenoid valve 34 to the closing direction by the predetermined amount: ΔDPG. However, at the time point of (4)' in FIG. 14, since the engine revolution number variation: DLN is smaller than the second reference value: DLNS2, the CPU 38 determines that the combustion state of the internal combustion engine 1 is sufficiently stabilized, and step-wisely corrects the opening degree of the solenoid valve 34 to the opening direction by predetermined amount: K·ΔDPG each.

By adjusting the purge amount of evaporative fuel in accordance with the combustion state of the internal combustion engine 1 in this manner, it is possible to increase the purge amount within a range in which the combustion state is not unstabilized.

In the case that the state of the internal combustion engine 1 is shifted from non-idling state to idling state during the purge, from the homogenous combustion state to the stratified combustion state, the CPU 38 returns the opening degree: TA of the throttle valve 20 to the standard opening degree: TAS so as to stabilize the combustion state and to suppress the driving loss due to the pumping operation of intake air.

Alternatively, when the mount of evaporative fuel to be purged is reduced, the CPU 38 may immediately return the opening degree: TA of the throttle valve 20 to the standard opening degree: TAS, and may stop the control of the normal purging or execution of the purge. An example of the case in which the amount of evaporative fuel is reduced as mentioned above is a case in which it is detected that the amount of evaporative fuel adsorbed in the charcoal canister 31 is reduced lower than a predetermined amount when it is detected that the concentration of the evaporative fuel is lowered less than a predetermined concentration.

Operations and effects of the present embodiment will be explained below.

Figure 15:
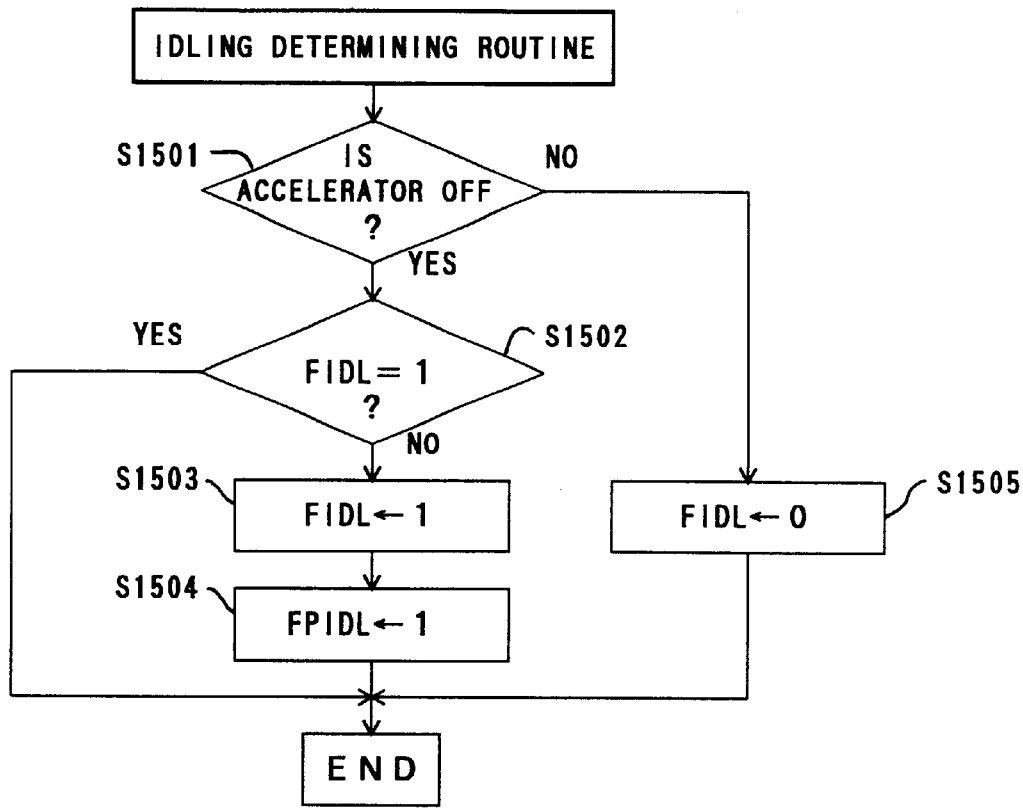
FIG. 15 is a flowchart showing an idling judgment routine.
Figure 16:
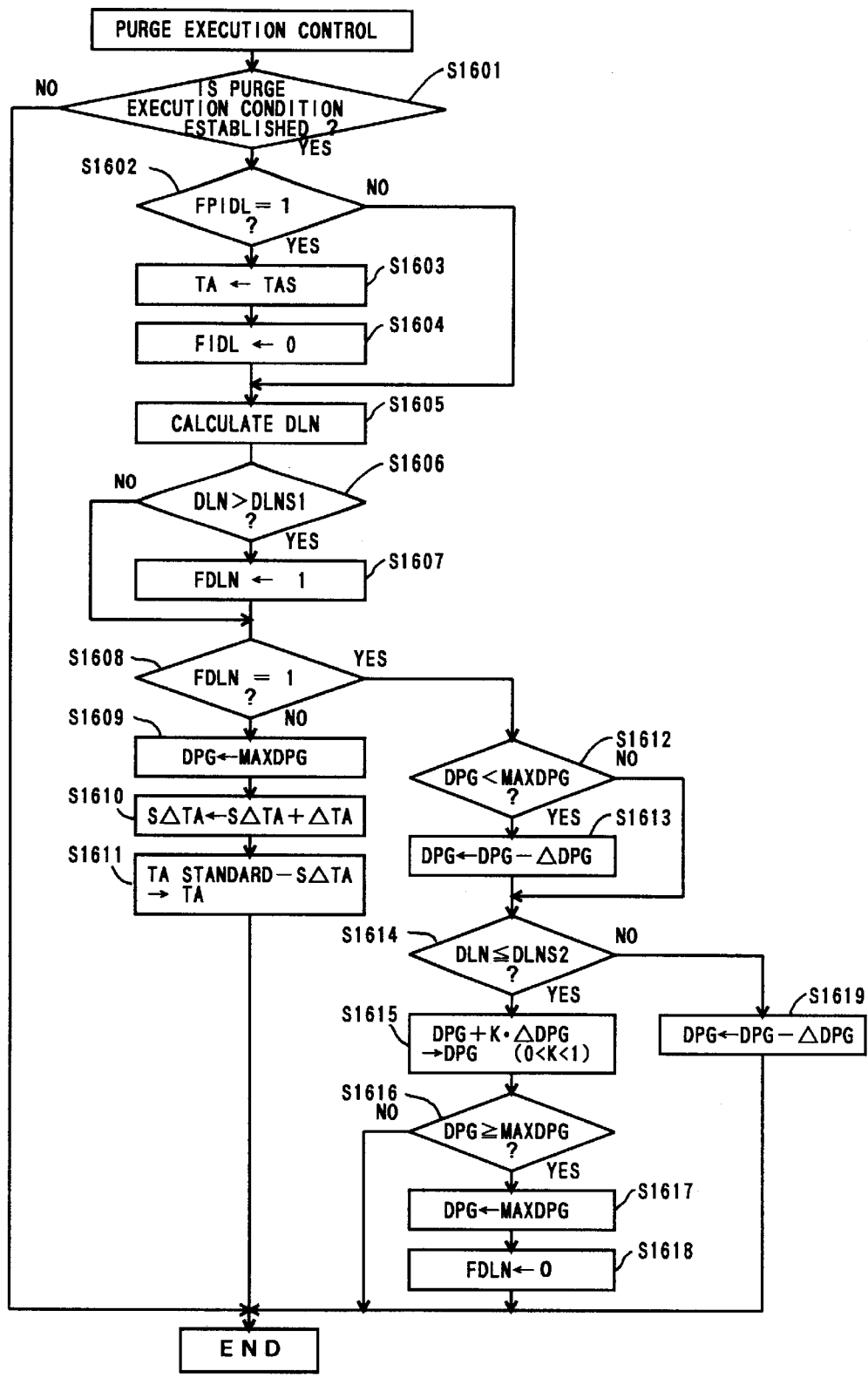
FIG. 16 is a flowchart showing a purge execution control routine according to the seventh embodiment.

The CPU 38 executes an idling determination routine shown in FIG. 15 and a purge execution control routine shown in FIG. 16 every predetermined time.

First, in the idling determination routine, in S1501, the CPU 38 inputs the output signal of the accelerator position sensor 24, and determines whether the amount of depression of accelerator pedal 23 is "0", that is, whether the accelerator is in OFF state.

In the case that it is determined in S1501 that the depression amount of accelerator pedal 23 is "0", the CPU 38 determines that the internal combustion engine 1 is in the idling state, and advances to S1502.

In S1502, the CPU 38 accesses to the idling determination flag (FIDL) storing region in the RAM 40 to judge whether "1" is stored therein.

In the case that it is determined in S1502 that "1" has been already stored in the idling determination flag (FIDL) storing region in the RAM 40, the CPU 38 once terminates the execution of the present routine.

On the other hand, in the case that it is determined in S1502 that "0" is stored in the idling determination flag (FIDL) storing region in the RAM 40, the CPU 38 advances to S1503 where the CPU 38 writes "1" in the idling determination flag (FIDL) storing region.

Sequentially, the CPU 38 advances to S1504 where the CPU 38 writes "1" in a purge idling determination flag (FPIDL) storing region in the RAM 40. The processing in S1504 is completed, the CPU 38 once terminates the execution of the present routine.

In the case that it is determined in S1501 that the amount of depression of depression of the accelerator pedal 23 is not "0", the CPU 38 determines that the internal combustion engine 1 is in the non-idling state, and advances to S1505 where the CPU 38 writes "0" in the idling determination flag (FIDL) storing region in the RAM 40 and then, once terminates the execution of the present routine.

Next, in the purge execution control routine, in S1601, the CPU 38 determines whether the purge execution condition is established, and if the purge execution condition is not established, the CPU 38 once terminates the execution of the present routine.

On the other hand, if it is determined in S1601 that the purge execution condition is established, the CPU 38 advances to S1602 where the CPU 38-determines whether "1" is stored in the purge idling determination flag (FPIDL) storing region in the RAM 40.

If it is determined in S1602 that "0" is stored in the purge idling determination flag (FPIDL) storing region, the CPU 38 determines that the internal combustion engine 1 is in the non-idling state, and advances to S1605. In S1605, the CPU 38 calculates the current engine revolution number variation: DLN.

Subsequently, the CPU 38 advances to S1606 where the CPU 38 accesses to the first reference value control map in the ROM 39 to calculate the first reference value: DLNS1 corresponding to the current number of engine revolutions. Then, the CPU 38 compares the engine revolution number variation: DLN calculated in S1605 with the first reference value: DLNS1.

In the case that it is determined in S1606 that the engine revolution number variation: DLN is equal to or smaller than the first reference value: DLNS1, the CPU 38 determines that the combustion state of the internal combustion engine 1 is stable, and advances to S1608.

In the case that it is determined in S1606 that the engine revolution number variation: DLN is greater than the first reference value: DLNS1, the CPU 38 determines that the combustion state of the internal combustion engine 1 is unstable, and advances to S1607. In S1607, the CPU 38 accesses to the combustion determining flag (FDLN) in the RAM 40 to write "1" therein.

In the case that the CPU 38 determines in S1606 that the engine revolution number variation: DLN is equal to or smaller than the first reference value: DLNS1, or the CPU 38 terminates the processing in S1606, the CPU 38 advances to S1608 where the CPU 38 accesses to the combustion state identification flag (FDLN) storing region in the RAM 40 to judge whether "1" is stored therein.

In the case that it is determined in S1608 that "0" is stored in the combustion state identification flag (FDLN) storing region, the CPU 38 advances to S1609 where the CPU 38 sets the opening degree: DPG of the solenoid valve 34 to the maximum opening degree: MAXDPG, and applies, to the solenoid valve 34, a driving pulse signal corresponding to the maximum opening degree: MAXDPG.

At that time, since the purge passage 46 is brought into the conductive state, a flow of atmosphere flowing through the charcoal canister 31 is generated due to the differential pressure between the upstream portion (the intake pipe 18 upstream the throttle valve 20) and the downstream portion (the intake pipe 18 downstream the throttle valve 20) of the purge passage 46. By this flow of atmosphere, the evaporative fuel adsorbed in the charcoal canister 31 is separated and introduced together with the atmosphere into the intake pipe 18 downstream the throttle valve 20, and the purge of the evaporative fuel is started.

Next, the CPU 38 advances to S1610 where the predetermined opening degree: S$\Delta$TA calculated at the last time (if the opening degree of the throttle valve 20 is corrected to the opening direction for the first time after the purge is started, S$\Delta$TA=0) is loaded from the predetermined region in the RAM 40, and adds a predetermined value: $\Delta$TA to the predetermined opening degree: S$\Delta$TA to calculate a new predetermined opening degree: S$\Delta$TA (=S$\Delta$TA+$\Delta$TA).

Subsequently, the CPU 38 advances to S1611 where the CPU 38 subtracts the predetermined opening degree: S$\alpha$TA calculated in S1610 from the standard opening degree: TAS to calculate a new opening degree: TA (=TAS–S$\alpha$TA) of the throttle valve 20. Then, the CPU 38 controls the actuator 21 such that the actual opening degree of the throttle valve 20 coincides with the new opening degree: TA, and once terminates the execution of the present routine.

In this case, since the throttle valve 20 is driven to the closing direction and an amount of new air flowing into the intake pipe 18 downstream the throttle valve 20 is reduced, the degree of the negative pressure of the intake pipe negative pressure is increased. Therefore, the differential pressure between the upstream portion and the downstream portion of the purge passage 46 is increased, and the flow rate of atmosphere flowing through the charcoal canister 31 is increased and thus, the amount of evaporative fuel to be purged from the charcoal canister 31 to the intake pipe 18 is increased On the other hand, in the case that it is determined in S1608 that "1" is stored in the combustion state identification flag (FDLN) storing region, the CPU 38 determines that the purge of the evaporative fuel has already been executed and thus the combustion state of the internal combustion engine 1 is unstabilized, and advances to S1612.

In S1612, the CPU 38 determines whether the opening degree: DPG of the solenoid valve 34 at that time is smaller than the maximum opening degree: MAXDPG, that is, whether the opening degree of the solenoid valve 34 has already been corrected to the closing direction so as to stabilize the combustion state of the internal combustion engine 1.

In the case that it is determined in S1612 that the opening degree: DPG of the solenoid valve 34 is not smaller than the maximum opening degree: MAXDPG (DPG=MAZDPG), the CPU 38 advances to S1613 where the CPU 38 subtracts a predetermined amount: $\Delta$DPG from the opening degree: DPG of the solenoid valve 34 at that time to calculate a new opening degree: DPG, and applies, to the solenoid valve 34, a driving pulse signal corresponding to the new opening degree: DPG.

In this case, since the solenoid valve 34 is closed by the predetermined amount: $\Delta$DPG, the flow path of the purge passage 46 is narrowed, and the amount of evaporative fuel introduced from the charcoal canister 31 into the intake pipe 18 is reduced. As a result, the amount of evaporative fuel to be supplied to the internal combustion engine 1 is reduced, and the engine revolution number variation of the internal combustion engine 1 is reduced.

In S1614, the CPU 38 calculates the engine revolution number variation: DLN after the opening degree of the solenoid valve 34 is corrected to the closing direction, and accesses to the second reference value control map in the ROM 39 to calculate the second reference value: DLNS2 corresponding to the current number of engine revolutions. Then, the CPU 38 determines whether the engine revolution number variation: DLN is equal to or smaller than the second reference value: DLNS2, that is, whether the combustion state of the internal combustion engine 1 is stabilized by correcting the opening degree of the solenoid valve 34 to the closing direction.

In S1614, in the case that it is determined that the engine revolution number variation: DLN is equal to or smaller than the second reference value: DLNS2, the CPU 38 determines that the combustion state of the internal combustion engine 1 is stabilized, and advanced to S1615.

In S1615, the CPU 38 adds the predetermined amount: K·$\Delta$DPG to the opening degree: DPG of the solenoid valve 34 at that time to calculate a new opening degree: DPG (=DPG+K·$\Delta$DPG). Then, the CPU 38 determines whether the new opening degree: DPG (=DPG+K·$\Delta$DPG) calculated in S1615 is equal to or greater than the maximum opening degree: MAXDPG.

If it is determined in S1616 that the opening degree: DPG (=DPG+K·$\Delta$DPG) calculated in S1615 is smaller than the maximum opening degree: MAXDPG, the CPU 38 applies, to the solenoid valve 34, a driving pulse signal corresponding to the opening degree: DPG calculated in S1615 and then, terminates the execution of the present routine.

In this case, since the solenoid valve 34 is opened through the predetermined amount: K·$\Delta$DPG, the flow path of the purge passage 46 is slightly enlarged, and the amount of evaporative fuel introduced from the charcoal canister 31 into the intake pipe 18 is slightly increased.

In the case that it is determined in S1616 that the opening degree: DPG (=DPG+K·$\Delta$DPG) calculated in S1615 is equal to or greater than the maximum opening degree: MAXDPG, the CPU 38 advances to S1617, where the CPU 38 determines that the maximum opening degree: MAXDPG is the new opening degree: DPG, and applies, to the solenoid valve 34, a driving pulse signal corresponding to the maximum opening degree: MAXDPG.

Subsequently, in S1618, the CPU 38 writes "0" in the combustion state identification flag (FDLN) storing region in the RAM 40, and terminates the execution of the present routine.

Thereafter, when the present routine is executed again, if the engine revolution number variation: DLN is equal to or smaller than the reference value: DLNS1 in S1606, that is, if the combustion state is stable even after the opening degree of the solenoid valve 34 is changed to the maximum opening degree: MAXDPG, the CPU 38 determines that the combustion state identification flag (FDLN) is "0" in S1608. Then, the CPU 38 again starts correcting the opening degree of the throttle valve 20 to the closing direction in S1609 to S1611.

In the case that it is determined in S1614 that the engine revolution number variation: DLN is greater than the second reference value: DLNS2, the CPU 38 advances to S1619 where the CPU 38 further corrects the opening degree of the solenoid valve 34 to the closing direction by the predetermined amount: $\Delta$DPG, applies, to the evaporative fuel 34, a driving pulse signal corresponding to the opening degree: DPG (=DPG−$\Delta$DPG) after correction, and terminates the execution of the present routine.

Thereafter, in the case that the present routine is again executed, the CPU 38 determines that "1" is stored in the combustion state identification flag (FDLN) in S1608, and determines in S1612 that the opening degree: DPG of the solenoid valve 34 is smaller than the maximum opening degree: MAXDPG.

Then, in S1614, the CPU 38 again compares the engine revolution number variation: DLN with the second reference value: DLNS2, and if the engine revolution number variation: DLN is greater than the second reference value: DLNS2, the CPU 38 further corrects the opening degree of the solenoid valve 34 by the predetermined amount: $\Delta$DPG in S1619, and if the engine revolution number variation: DLN is equal to or smaller than the second reference value: DLNS2, the CPU corrects the opening degree of the solenoid valve 34 to the opening direction in S1616 to S1618.

When the state of the internal combustion engine 1 is shifted from the non-idling state to the idling state during the execution of the purge, the CPU 38 determines in S1602 that the "1" is stored in the purge idling determination flag (FPIDL) storing region. In this case, the CPU 38 controls the actuator 21 in S1603 such that the opening degree of the throttle valve 20 is returned to the standard opening degree: TAS and then, in S1604, the CPU 38 writes "0" in the purge idling determination flag (FPIDL) storing region in the RAM 40, and executes the processing S1605 and subsequent processing.

That is, when the state of the internal combustion engine 1 is shifted from the non-idling state to the idling state during the execution of the purge, the CPU 38 once returns the opening degree of the throttle valve 20 to the standard opening degree and then, controls the execution of the purge.

By repeatedly executing the purge execution control routine by the CPU 38 in this manner, the purge amount of evaporative fuel becomes the maximum amount within a range in which the combustion state of the internal combustion engine is not unstabilized. Therefore, according to the present embodiment, it is possible to stabilize the combustion state and to secure the maximum purging amount at high level.

EIGHT EMBODIMENT

An eighth embodiment of the evaporative fuel processing apparatus of the present invention will be explained based on FIGS. 17 and 18. Here, a structure different from the above-described seventh embodiment will be explained, and a description of the same structure will be omitted.

In the seventh embodiment, it is described an example in which in the case that the combustion state of the internal combustion engine 1 is unstabilized by the purge of the evaporative fuel, the combustion state is stabilized only by correcting the opening degree of the solenoid valve 34. In the present embodiment, the combustion state is stabilized by correcting both the opening degrees of the solenoid valve 34 and the throttle valve 20.

In this case, when the combustion state of the internal combustion engine 1 is unstabilized, the CPU 38 first corrects the opening degree of the solenoid valve 34 to the closing direction by a predetermined amount. In the case that the combustion state is stabilized by this operation, the CPU 38 controls such that the opening degree of the solenoid valve 34 is gradually opened as in the seventh embodiment. On the other hand, in the case that the combustion state is not stabilized only by closing the solenoid valve 34, the CPU 38 corrects the opening degree of the throttle valve 20 to the opening direction to stabilize the combustion state.

Figure 17:
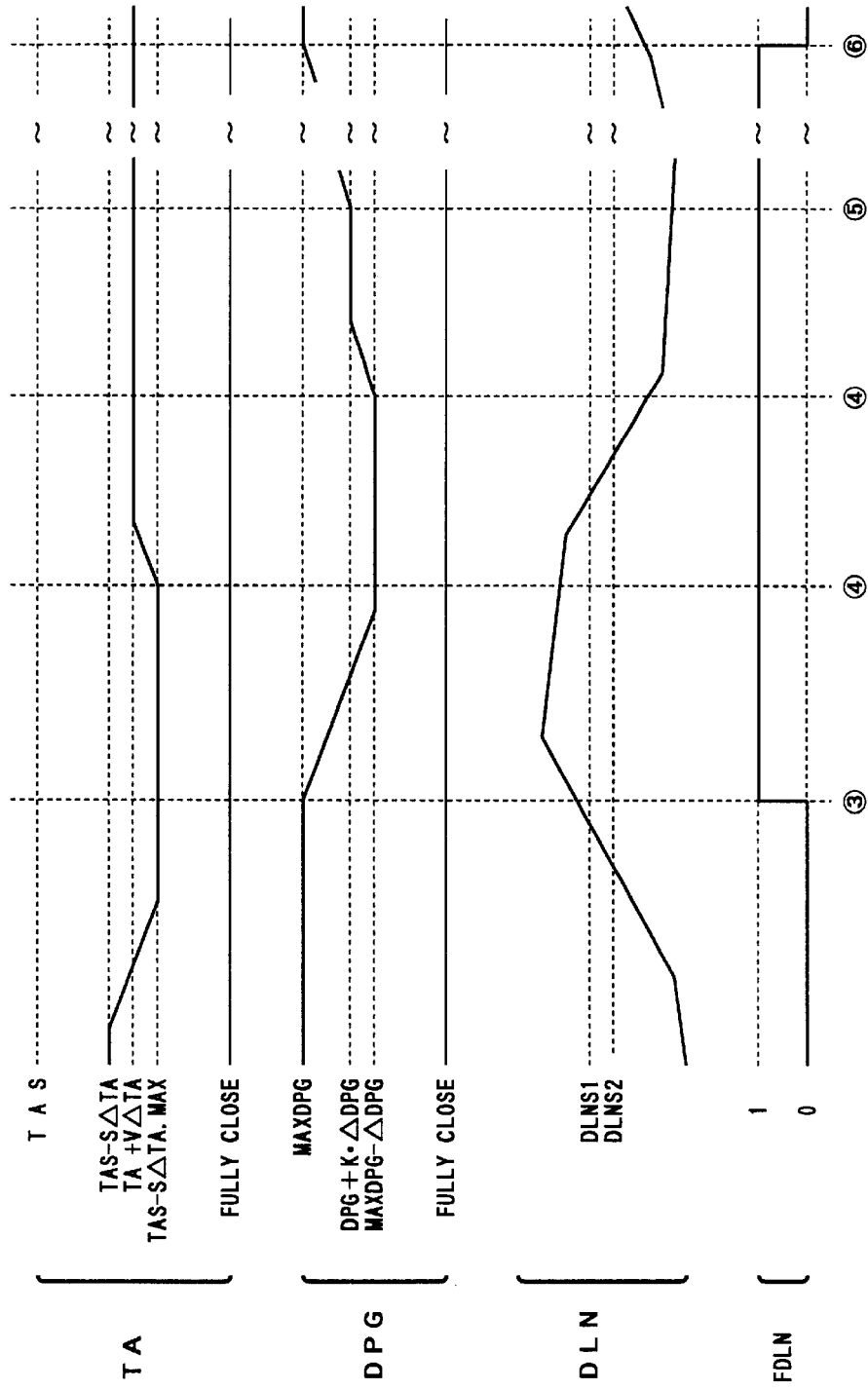
FIG. 17 is a timing chart showing a purge execution control routine according to an eighth embodiment.

More specifically, the CPU 38 repeats the correction of the opening degree of the throttle valve 20 to the closing direction as shown in FIG. 17 ((3) in FIG. 17) and then, in the case that the engine revolution number variation: DLN becomes greater than the first reference value: DLNS1, the CPU 38 writes "1" in the combustion state identification flag (FDLN) storing region in the RAM 40, and corrects the opening degree of the solenoid valve 34 to the closing direction by the predetermined amount: $\Delta$DPG.

After the opening degree of the solenoid valve 34 is corrected to the closing direction ((4) in FIG. 17), the CPU 38 compares the engine revolution number variation: DLN with the second reference value: DLNS2.

If the engine revolution number variation: DLN is equal to or smaller than the second reference value: DLNS2, the CPU 38 corrects the opening degree of the solenoid valve 34 to the opening direction stepwise by the predetermined amount: K·$\Delta$DPG in the same manner as in the seventh embodiment, however, if the engine revolution number variation: DLN is greater than the second reference value: DLNS2, the CPU 38 adds a predetermined value: V$\Delta$TA to the opening degree: TA of the throttle valve 20 at that time to calculate a new opening degree: TA of the throttle valve 20. Then, the CPU 38 drives the actuator 21 such that the actual opening degree of the throttle valve 20 coincides with the new opening degree: TA of the throttle valve 20.

In this case, since the opening degree of the throttle valve 20 is changed to the opening direction by the predetermined amount: V$\Delta$TA, the amount of new air flowing to the intake pipe 18 downstream the throttle valve 20 to increased, and the degree of negative pressure of the intake pipe negative pressure is lowered. As a result, the differential pressure between the upstream portion and the downstream portion of the purge passage 46 is reduced, the amount of evaporative fuel to be purged from the charcoal canister 31 to the intake pipe 18 is reduced, and the engine revolution number variation is reduced.

After a predetermined time is elapsed from the time point when the opening degree of the throttle valve 20 is corrected to the opening direction, the CPU 38 again compares the engine revolution number variation: DLN with the second reference value: DLNS2 ((4)' in FIG. 17). If the engine revolution number variation: DLN is greater than the second reference value: DLNS2, the CPU 38 further corrects the opening degree of the throttle valve 20 to the opening direction by the predetermined amount: V$\Delta$TA. Such a correction of the opening degree of the throttle valve 20 to the opening direction is repeated until the engine revolution number variation: DLN becomes equal to or smaller than the second reference value: DLNS2.

On the other hand, in the case that the engine revolution number variation becomes equal to or smaller than the second reference value: DLNS2 by correcting the opening degree of the throttle valve 20 to the opening direction, the CPU 38 corrects the opening degree of the solenoid valve 34 to the opening direction stepwise by the predetermined amount: K·$\Delta$DPG in the same manner as in the seventh embodiment.

In the present embodiment, it is described an example in which in the case that the combustion state becomes unstable, the opening degree of the solenoid valve 34 is first corrected to the closing direction, and if the combustion state does not become stable by this operation, the opening degree of the throttle valve 20 is corrected to the opening direction. Alternatively, the opening degree of the throttle valve 20 may be first corrected to the opening direction, and if the combustion state does not become stable by this operation, the opening degree of the solenoid valve 34 may be then corrected to the closing direction Operations and effects of the present embodiment will be explained below.

Figure 18:
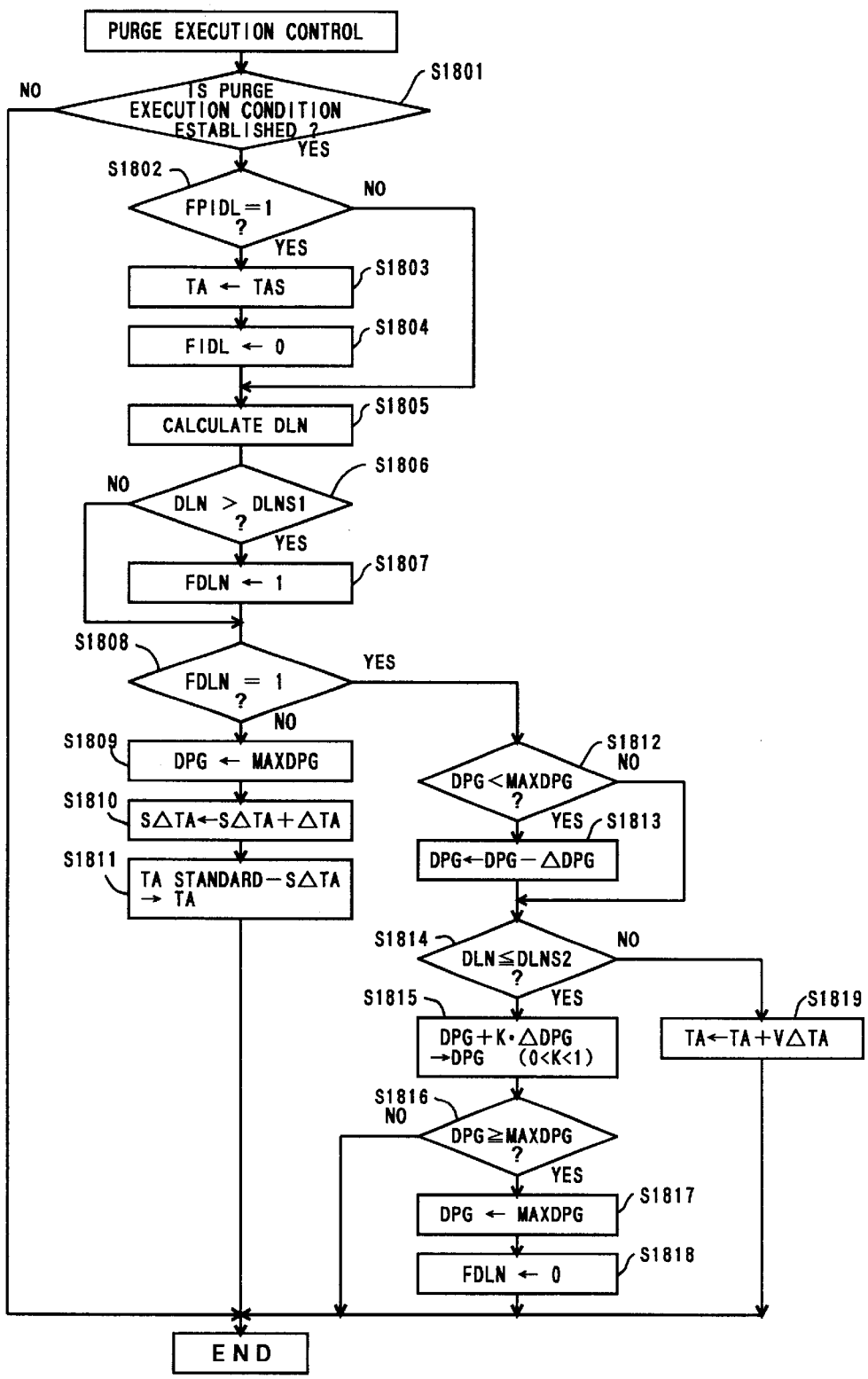
FIG. 18 is a flowchart showing a purge execution control routine according to the eighth embodiment.

The CPU 38 executes the purge execution control routine as shown in FIG. 18 every predetermined time. The processes of S1801 to S1818 are the same as those of S1601 to S1618 shown in FIG. 16.

However, in the case that it is determined in S1807 that "1" is stored in the combustion state identification flag (FDLN) storing region, and it is determined in S1814 that the engine revolution number variation: DLN after the opening degree of the solenoid valve 34 is corrected to the closing direction is greater than the second reference value: DLNS2, the CPU 38 determines that the combustion state could not be stabilized only by correcting the opening degree of the solenoid valve 34, and advances to S1819.

In S1819, the CPU 38 adds the predetermined value VΔTA to the opening degree: TA of the throttle valve 20 at that time to calculate a new opening degree: TA(=TA+VΔTA). The CPU 38 controls the actuator 21 such that the actual opening degree of the throttle valve 20 coincides with the opening degree: TA(=TA+VΔTA) calculated in S1819, and terminates the execution of the present routine.

In this case, since the throttle valve 20 is opened by the predetermined amount: VΔTA, the amount of new air flowing to the intake pipe 18 downstream the throttle valve 20 is increased, and the degree of negative pressure of the intake pipe negative pressure in the intake pipe 18 downstream the throttle valve 20 is lowered. As a result, the differential pressure between the upstream portion and the downstream portion of the purge passage 46 is reduced, the flow rate of atmosphere flowing through the charcoal canister 30 is reduced, the amount of evaporative fuel to be purged from the charcoal canister 31 to the intake pipe 18 is reduced, and the engine revolution number variation is reduced.

Thereafter, when the present routine is again executed, the CPU 38 determines that "1" is stored in the combustion state identification flag (FDLN) storing region in S1808 and the opening degree: DPG of the solenoid valve 34 is smaller than the maximum opening degree: MAXDPG in S1812, and advances to S1814.

In S1814, the CPU 38 compares the engine revolution number variation: DLN with the second reference value: DLNS2, and if the engine revolution number variation: DLN is equal to or smaller than the second reference value: DLNS2, the CPU 38 executes the processing in S1815 to S1818 so as to correct the opening degree of the solenoid valve 34 to the opening direction.

On the other hand, in the case that it is determined in S1814 that the engine revolution number variation: DLN is greater than the second reference value: DLNS2, the CPU 38 again executes the processing of S1819 to further correct the opening degree: TA of the throttle valve 20 by the predetermined amount: VΔTA to the opening direction.

By repeatedly executing the purge execution control routine by the CPU 38 in this manner, the same effect as that of the seventh embodiment can be obtained.

NINTH EMBODIMENT

A ninth embodiment of the evaporative fuel processing apparatus of the present invention will be explained based on FIGS. 19 and 20. Here, a structure different from the above-described seventh embodiment will be explained, and a description of the same structure will be omitted.

In the seventh and eighth embodiments, it is described an example in which in the case that the combustion state of the internal combustion engine 1 is unstabilized by the purge of the evaporative fuel, the combustion state is stabilized without returning the opening degree: TA of the throttle valve 20 to the standard opening degree: TAS. In the present embodiment, it is described an example in which the opening degree: TA of the throttle valve 20 is once returned to the standard opening degree: TAS for stabilizing the combustion state and then, the opening degree of the throttle valve 20 is again corrected to the closing direction.

In this case, when the combustion state of the internal combustion engine 1 becomes unstable during the execution of the purge control, the CPU 38 controls the actuator 21 so as to return the opening degree: TA of the throttle valve 20 to the standard opening degree: TAS. As to the solenoid valve 34, it is controlled such that the opening degree: DPG at that time is maintained as it is.

In the case that the combustion state of the internal combustion engine 1 is stabilized by returning the opening degree: TA of the throttle valve 20 to the standard opening degree: TAS, the CPU 38 corrects the opening degree: DPG of the solenoid valve 34 to the opening direction stepwisely by a predetermined amount so as to increase the purge amount.

On the other hand, in the case that the combustion state of the internal combustion engine is not stabilized only by returning the opening degree of the throttle valve 20 to the standard opening degree, the CPU 38 38 corrects the opening degree: DPG of the solenoid valve 34 to the closing direction stepwisely by a predetermined amount so as to stabilize the combustion state.

Figure 19:
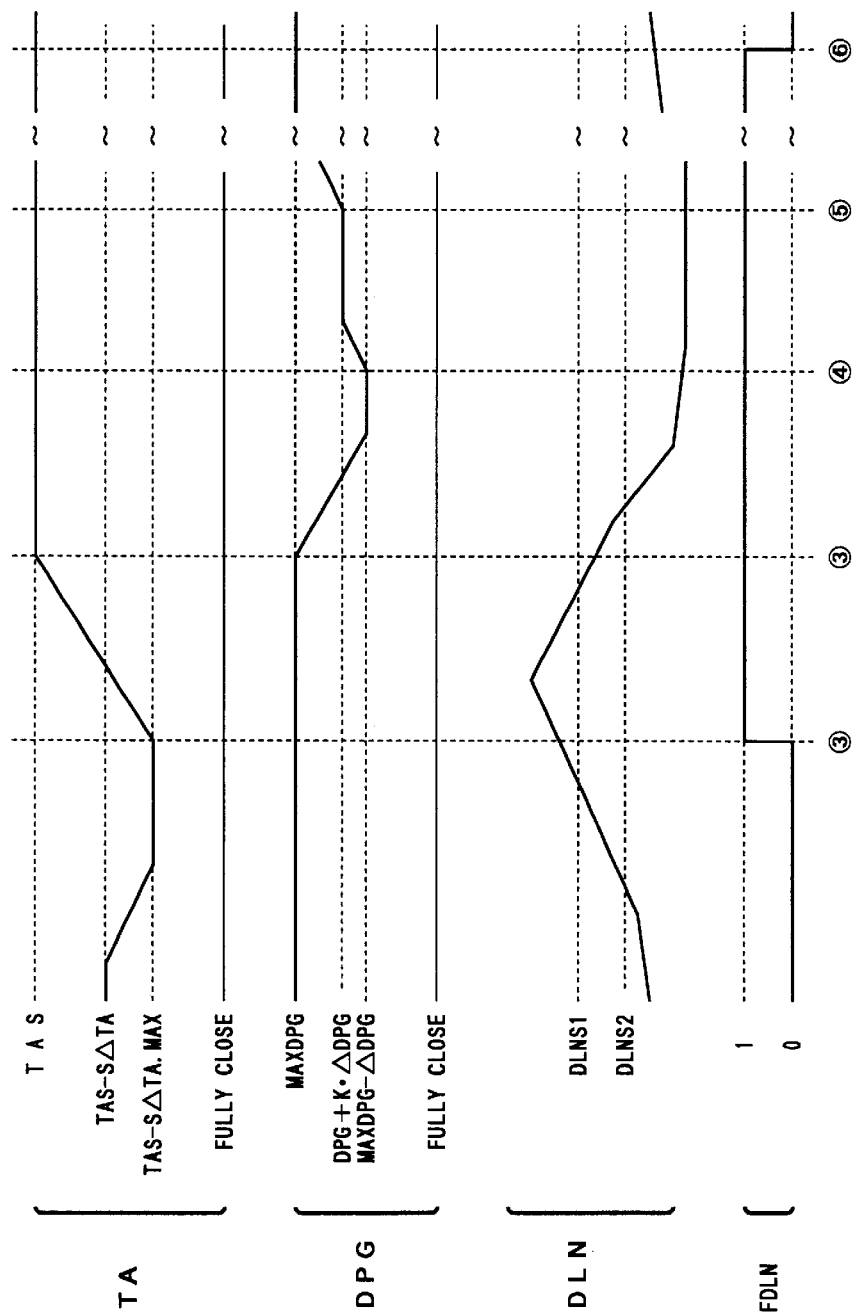
FIG. 19 is a timing chart showing a purge execution control routine according to a ninth embodiment.

More specifically, after repeating the correction of the opening degree of the throttle valve 20 to the closing direction ((3) in FIG. 19) as shown in FIG. 19, in the case that the engine revolution number variation: DLN becomes greater than the first reference value: DLNS1, the CPU 38 writes "1" in the combustion state identification flag (FDLN) storing region in the RAM 40, and controls the actuator 21 so as to return the opening degree: TA of the throttle valve 20 to the standard opening degree: TAS.

After the opening degree: TA of the throttle valve 20 is returned to the standard opening degree: TAS ((3)' in FIG. 19), the CPU 38 again calculates the engine revolution number variation: DLN and compares the same with the second reference value: DLNS2.

At that time, if the engine revolution number variation: DLN is equal to or smaller than the second reference value: DLNS2, the CPU 38 corrects the opening degree: DPG of the solenoid valve 34 in the opening degree by the predetermined amount: K·ΔDPG in the same manner as in the seventh embodiment. However, in the example shown in FIG. 19, since the engine revolution number variation: DLN becomes greater than the second reference value: DLNS2 at the time point of (3)' in FIG. 19, the CPU 38 corrects the opening degree: DPG of the solenoid valve 34 to the closing direction by the predetermined amount: ΔDPG.

After a predetermined time is elapsed from the time point when the opening degree: DPG of the solenoid valve 34 is corrected to the closing direction, the CPU 38 again compares the engine revolution number variation: DLN with the second reference value: DLNS2.

At that time, if the engine revolution number variation: DLN is greater than the second reference value: DLNS2, the CPU 38 further corrects the opening degree: DPG of the solenoid valve 34 in the opening degree by the predetermined amount:ΔDPG. However, in the example shown in FIG. 19, since the engine revolution number variation: DLN becomes smaller than the second reference value: DLNS2 at the time point of (4) in FIG. 19, the CPU 38 corrects the opening degree: DPG of the solenoid valve 34 to the opening direction by the predetermined amount: K·ΔDPG.

Operations and effects of the present embodiment will be explained below.

The CPU 38 repeatedly executes the purge execution control routine as shown in FIG. 20 every predetermined time. The processings of this purge execution control routine in S2001 to S2011 are the same as those of S1601 to S1618 shown in FIG. 16.

However, when it is determined in S2008 that "1" is stored in the combustion state identification flag (FDLN) storing region in the RAM 40, and the CPU 38 drives the actuator 21 so as to return the opening degree: TA of the throttle valve 20 to the standard opening degree: TAS.

In this case, since the throttle valve 20 is returned to the standard opening degree: TAS, the amount of new air flowing into the intake pipe 18 downstream the throttle valve 20 is largely increased, and the degree of negative pressure of the intake pipe negative pressure is largely lowered. As a result, the differential pressure between the upstream portion and the downstream portion of the purge passage 46 is also largely reduced, the amount of evaporative fuel to be purged from the charcoal canister 31 to the intake pipe 18 is largely reduced, and the engine revolution number variation: DLN is also largely reduced.

After the throttle valve 20 is returned to the standard opening degree: TA, the CPU 38 advances to S2013, where the CPU 38 calculates the engine revolution number variation: DLN, and accesses to the second reference value control map in ROM 39 to calculate the second reference value: DLNS2. Then, the CPU 38 compares the engine revolution number variation: DLN with the second reference value: DLNS2.

In the case that it is determined in S2013 that the engine revolution number variation: DLN is equal to or smaller than the second reference value: DLNS2, the CPU 38 determines that the combustion state of the internal combustion engine 1 is stabilized by returning the throttle valve 20 to the standard opening degree: TAS, and advances to S2014.

In S2014, the CPU 38 adds the predetermined amount: K·ΔDPG to the opening degree: DPG of the solenoid valve 34 at that time to calculate a new opening degree: DPG (=DPG+K·ΔDPG).

In S2015, the CPU 38 determines whether the opening degree: DPG (=DPG+K·ΔDPG) calculated in S2014 is equal to or greater than the maximum opening degree: MAXDPG.

In the case that it is determined that the opening degree: DPG (=DPG+K·ΔDPG) calculated in S2014 is smaller than the maximum opening degree: MAXDPG, the CPU 38 applies, to the solenoid valve 34, a driving pulse signal corresponding to the opening degree: DPG (=DPG+K·ΔDPG) calculated in S2014 and then, once terminates the execution of the present routine.

If it is determined in S2015 that the opening degree: DPG (=DPG+K·ΔDPG) calculated in S2014 is equal to or greater than the maximum opening degree: MAXDPG, CPU 38 determines in S2016 that the maximum opening degree: MAXDPG is a new opening degree: DPG of the solenoid valve 34, and applies, to the solenoid valve 34, a driving pulse signal corresponding to the maximum opening degree: MAXDPG.

Sequentially, after the CPU 38 writes "0" in the combustion state identification flag (FDLN) storing region in RAM 40 in S2017, the CPU 38 terminates the execution of the present routine.

On the other hand, in the case that it is determined in S2013 that the engine revolution number variation: DLN is greater than the second reference value: DLNS2, the CPU 38 corrects, in S2018, the opening degree: DPG of the solenoid valve 34 to the closing direction by the predetermined amount: ΔDPG and then, terminates the execution of the present routine.

In this case, since the solenoid valve 34 is closed by the predetermined amount: ΔDPG, the flow path of the purge passage 46 is narrowed, the amount of evaporative fuel introduced from the charcoal canister 31 into the intake pipe 18 is reduced, and the engine revolution number variation is reduced.

Thereafter, when the present routine is again executed, if it is determined in S2013 that the engine revolution number variation: DLN is equal to or smaller than the second reference value: DLNS2, the CPU 38 executes the processing of S2014 to S2017 so as to slightly correct the opening degree: DPG of the solenoid valve 34 to the opening direction.

By repeatedly executing the purge execution control routine by the CPU 38 in this manner, it is possible to increase the purge amount of the evaporative fuel within a range in which the combustion state of the internal combustion engine 1 is not unstabilized. Further, if the combustion state of the internal combustion engine 1 becomes unstable, since the opening degree of the throttle valve 20 is immediately returned to the standard opening degree, it is easy to stabilize the combustion state.

TENTH EMBODIMENT

A tenth embodiment of the evaporative fuel processing apparatus according to the present invention will be explained based on FIGS. 21 to 25. Here, a structure different from the above-described seventh embodiment will be explained, and a description of the same structure will be omitted.

FIG. 21 is a schematic configuration diagram of the internal combustion engine to which an evaporative fuel processing apparatus according to the present embodiment is applied. In the example in FIG. 21, an upstream portion of the atmosphere introducing passage 35, that is, an upstream portion of the purge passage 46 is connected, not to the intake pipe 18 upstream the throttle valve 20, but to a positive pressure pump 51.

Figure 22:
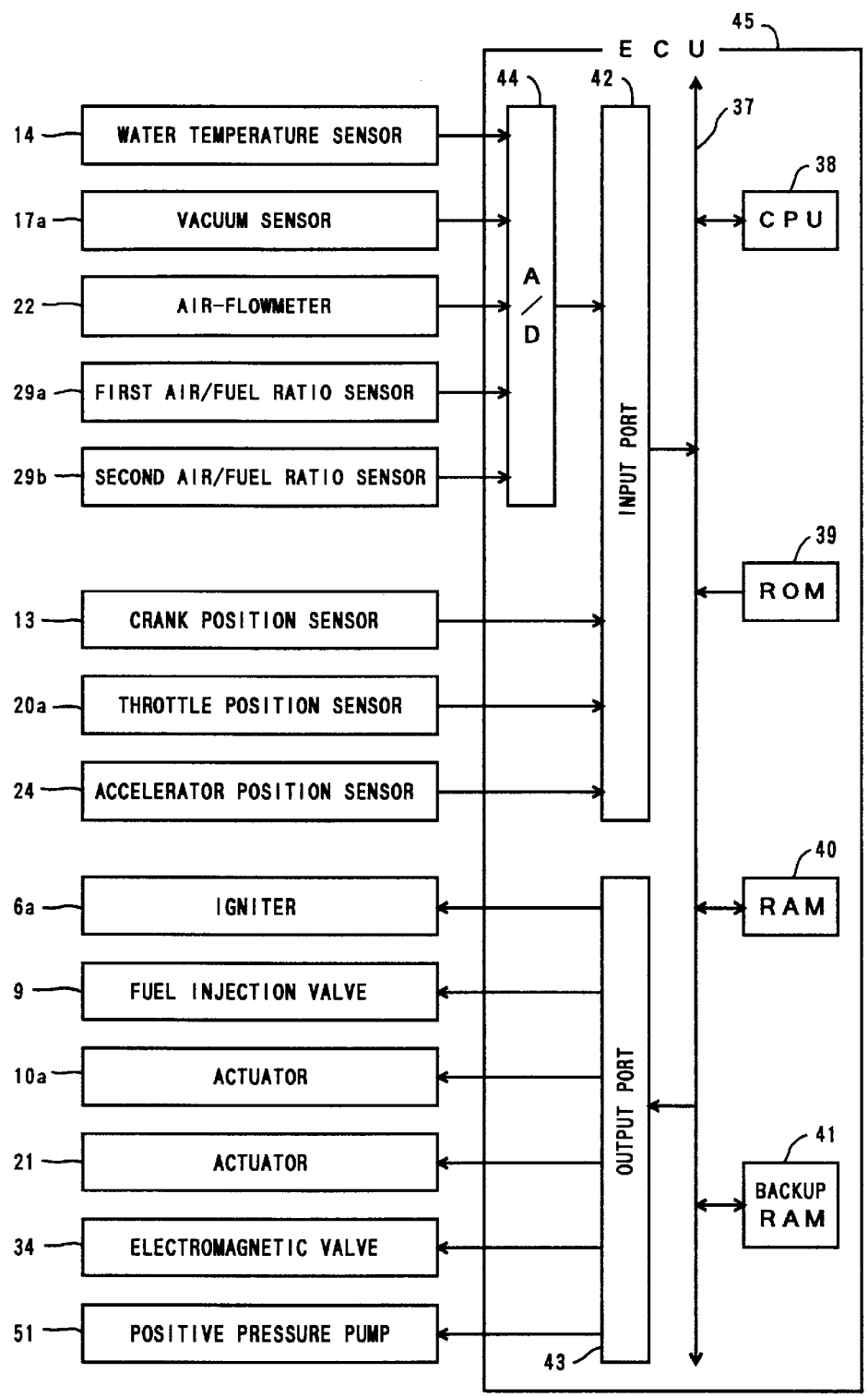
FIG. 22 is a block diagram showing an inside structure of the ECU 45 according to the tenth embodiment.

As shown in FIG. 22, the positive pressure pump 51 is connected to the output port 43 of the ECU 45 through an electric wire, and sends out atmosphere of a pressure corresponding to the magnitude of voltage applied from the ECU 45.

In this case, when the purge of the evaporative fuel is executed, the CPU 38 adjusts the differential pressure between the upstream portion and the downstream portion of the purge passage 46 by changing the voltage applied to the positive pressure pump 51 while keeping the opening degree of the throttle valve 20 at the normal opening degree. In this manner, the positive pressure pump 51 realizes differential pressure changing means according to the present invention.

The CPU 38 roughly adjusts the purge amount by controlling the positive pressure pump 51 while keeping the opening degree: TA of the throttle valve 20 at the constant opening degree (for example, the standard opening degree: TAS), and finely adjusts the purge amount by controlling the solenoid valve 34.

Here, concrete processing of the purge execution control of the present embodiment will be explained with reference to a timing chart in FIG. 23.

At the time point when the purge execution condition is established, the CPU 38 calculates the engine revolution number variation: DLN and the first reference value: DLNS1, and determines whether the engine revolution number variation: DLN is equal to or smaller than the first reference value: DLNS1.

At that time, if the engine revolution number variation: DLN is equal to or smaller than the first reference value: DLNS1, the CPU 38 determines that the combustion state of the internal combustion engine 1 is stable, and if the engine revolution number variation: DLN is greater than the first reference value: DLNS1, the CPU 38 determines that the combustion state of the internal combustion engine 1 is unstable.

Figure 23:
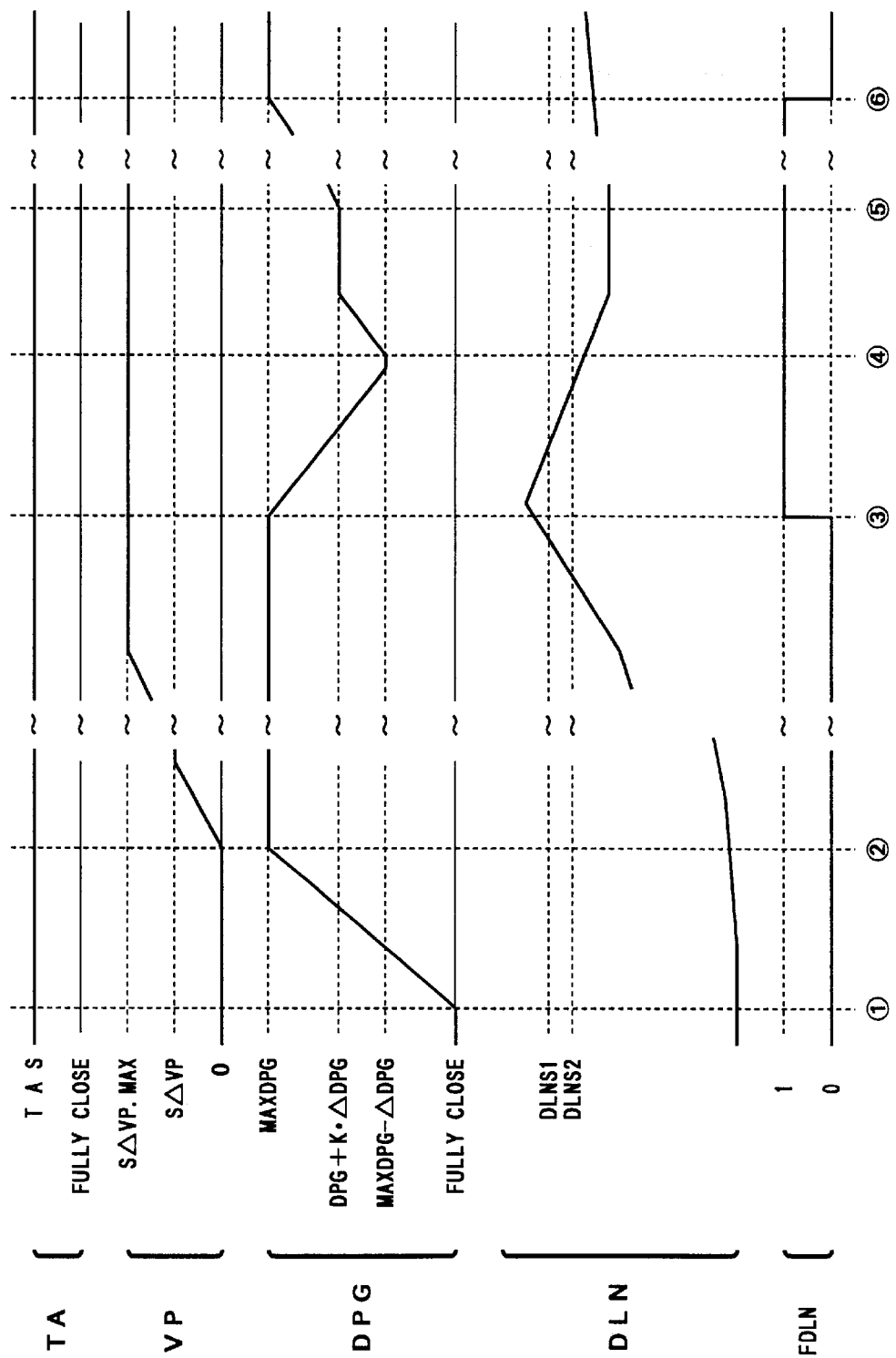
FIG. 23 is a timing chart (1) showing a purge execution control according to the tenth embodiment.
Figure 24:
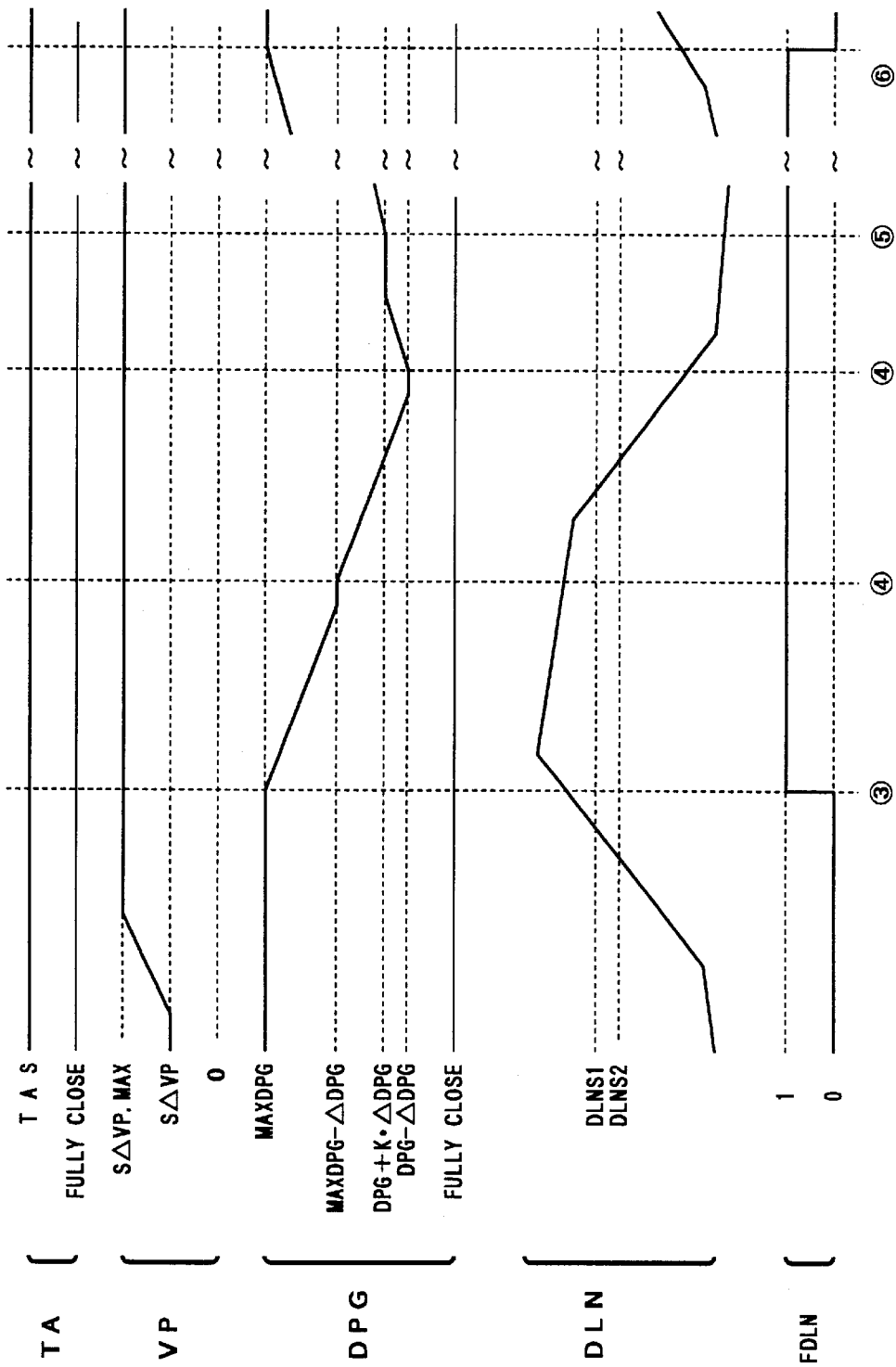
FIG. 24 is a timing chart (2) showing a purge execution control according to the tenth embodiment.

In an example in FIG. 23, since the engine revolution number variation: DLN before the purge is started (on the left side of (1) in FIG. 23) is smaller than the first reference value: DLNS1, the CPU 38 determines that the combustion state of the internal combustion engine 1 is stable, and drives the solenoid valve 34 such that the opening degree becomes equal to the maximum opening degree: MAXDPG ((1) in FIG. 23).

Subsequently, the CPU 38 applies a predetermined voltage: SAVP to the positive pressure pump 51 so as to increase the pressure in the upstream portion of the purge passage 46 ((2) in FIG. 23). The predetermined voltage: SΔAVP is a value which is updated whenever the pumping pressure of the positive pressure pump 51 is increased, and is calculated by adding the predetermined value: ΔVP to the last predetermined voltage: SΔVP. When the initial value of the predetermined voltage: SΔV P is calculated, the last predetermined voltage: SΔVP is regarded as "0 ".

An upper limit value: predetermined voltage: SΔVPMAX is previously set in the predetermined voltage: SΔVP, and if the predetermined voltage: SΔVP calculated at the time of update becomes greater than the upper limit value: SΔVPMAX, the upper limit value: SΔVPMAX is used as the predetermined voltage: SΔAVP.

The positive pressure pump 51 to which the predetermined voltage: SΔVP is applied sends out the atmosphere at a pressure corresponding to the predetermined voltage: SΔVP. Since the atmosphere sent from the positive pressure pump 51 in this manner is introduced into the upstream portion of the purge passage 46, a pressure in the upstream portion of the purge passage 46 is increased. On the other hand, the intake pipe negative pressure is generated in the intake pipe 18 downstream the purge passage 46, that is, downstream the throttle valve 20 and therefore, the differential pressure between the upstream portion and the downstream portion of the purge passage 46 is increased. As a result, the flow rate of atmosphere flowing through the charcoal canister 31 is increased and thus, the amount of evaporative fuel to be introduced from the charcoal canister 31 into the intake pipe 18 is also increased.

When the amount of evaporative fuel introduced into the intake pipe 18 is increased as described above, a state of the mixture to be supplied to the combustion chamber 5 is changed, and the engine revolution number variation: DLN is increased as compared with that before the purge is executed. Therefore, the CPU 38 again calculates the engine revolution number variation: DLN after a predetermined time is elapsed from a time point when the predetermined voltage: SΔVP is applied to the positive pressure pump 51, and compares the calculated engine revolution number variation: DLN with the first reference value: DLNS1.

At that time, if the engine revolution number variation: DLN is equal to or smaller than the first reference value: DLNS1, the CPU 38 updates the predetermined voltage: SΔVP to calculate a new applied voltage: VP, and the calculated applied voltage: VP is applied to the positive pressure pump 51. Such a update processing of the applied voltage: VP is repeated as long as the engine revolution number variation: DLN is equal to or smaller than the first reference value: DLNS1.

When the engine revolution number variation: DLN becomes greater than the first reference value: DLNS1 by repeating the update processing of the applied voltage: VP of the positive pressure pump 51 ((3) in FIG. 23), the CPU 38 determines that the combustion state of the internal combustion engine 1 becomes unstable, and writes "1" in the combustion state identification flag (FDLN) storing region in the RAM 40. Further, the CPU 38 stops the update processing of the applied voltage: VP, and maintain the current applied voltage: VP (VP=SΔVPMAX in the example of FIG. 23) at that time.

Then, the CPU 38 executes the following processing for suppressing the engine revolution number variation: DLN.

First, the CPU 38 corrects the opening degree: DPG of the solenoid valve 34 to the closing direction by the predetermined amount: ΔDPG so as to slightly reduce the purge amount of evaporative fuel. In this case, since the flow path of the purge passage 46 is narrowed, the mount of evaporative fuel introduced into the internal combustion engine 1 is reduced, and the engine revolution number variation: DLN is reduced.

After the opening degree of the solenoid valve 34 is corrected to the closing direction, the CPU 38 determines whether the combustion state of the internal combustion engine 1 is stabilized. More specifically, the CPU 38 calculated the engine revolution number variation: DLN after the opening degree of the solenoid valve 34 is corrected to the closing direction, and determines whether the calculated engine revolution number variation: DLN becomes equal to or smaller than the second reference value: DLNS2 ((4) in FIG. 23).

In the example in FIG. 23, since the engine revolution number variation: DLN becomes smaller than the second reference value: DLNS2 at the time point of (4) in FIG. 23, the CPU 38 determines that the combustion state of the internal combustion engine 1 is sufficiently stabilized, and corrects the opening degree: DPG of the solenoid valve 34 to the opening direction by the predetermined amount: K·ΔDPG so as to increase the purge amount of evaporative fuel. Such a correction of the opening degree of the solenoid valve 34 to the opening direction is repeated as long as the engine revolution number variation: DLN is equal to or smaller than the second reference value: DLNS2 ((5) and (6) in FIG. 23).

When the opening degree: DPG of the solenoid valve 34 reaches the maximum opening degree: MAXDPG by repeating the correction of the opening degree of the solenoid valve 34 to the opening direction, the CPU 38 terminates the correction of the opening degree of the solenoid valve 34, and writes "0" in the combustion state identification flag (FDLN) storing region in the RAM 40 ((6) in FIG. 23). Then, the CPU 38 again starts the renewal processing of the applied voltage: VP.

On the other hand, in the case that the engine revolution number variation: DLN did not become equal to or smaller than the second reference value: DLNS2 at the time point of (4) in FIG. 23, the CPU 38 further corrects the opening degree: DPG of the solenoid valve 34 to the closing direction by the predetermined amount: ΔDPG as shown in a timing chart in FIG. 24.

After a predetermined time is elapsed from a time point when the opening degree: DPG of the solenoid valve 34 is corrected to the closing direction by the predetermined amount: ΔDPG ((4)' in FIG. 23), the CPU 38 calculates the engine revolution number variation: DLN, and again compares the same with the second reference value: DLNS2.

At that time, if the engine revolution number variation: DLN is greater than the second reference value: DLNS2, the CPU 38 further corrects the opening degree: DPG of the solenoid valve 34 to the closing direction by the predetermined amount: ΔDPG. However, since the engine revolution number variation: DLN becomes smaller than the second reference value: DLNS2 at the time point of (4)' in FIG. 24, the CPU 38 determines that the combustion state of the internal combustion engine 1 is sufficiently stabilized, and stepwisely corrects the opening degree: DPG of the solenoid valve 34 to the opening direction by the predetermined amount: K·ΔDPG.

By adjusting the purge amount of evaporative fuel in accordance with the combustion state of the internal combustion engine 1, it is possible to increase the purge amount within a range in which the combustion state is not unstabilized.

When the sate of the internal combustion engine 1 is shifted from non-idling state to idling state during the execution of the purge, or from the homogenous combustion state to the stratified combustion state, the CPU 38 returns the applied voltage: VP of the positive pressure pump 51 to the initial value: ΔVP to stabilize the combustion state.

Further, when the amount of evaporative fuel to be purged is reduced, the CPU 38 may immediately return the applied voltage: VP of the positive pressure pump 51 to the initial value: ΔVP, and may stop the execution of the normal purge control or execution of the purge.

Operations and effects of the present embodiment will be explained below.

The CPU 38 executes the idling determination routine and the purge execution control routine every predetermined time. Since the idling determination routine is the same as that in the seventh embodiment, the explanation thereof will be omitted.

Figure 25:
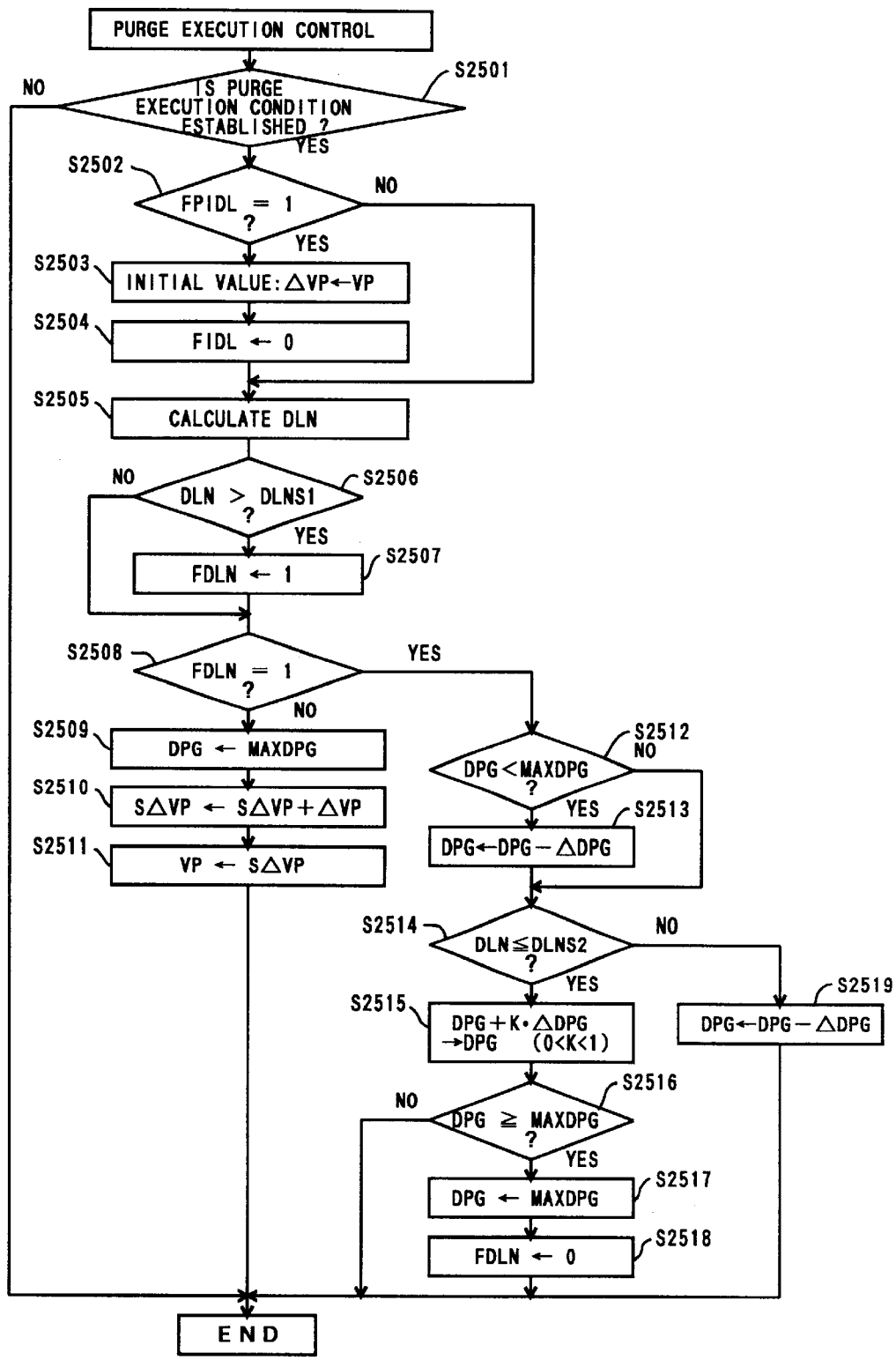
FIG. 25 is a flowchart showing a purge execution control routine according to the tenth embodiment.

FIG. 25 is a flowchart showing a purge execution control routine according to the present embodiment. In this purge execution control routine, the CPU 38 determines in S2501 whether the purge execution condition is established, and in the case that it is determined that the purge execution condition is not established, the CPU 38 terminates the execution of the purge execution.

On the other hand, in the case that it is determined in S2501 that the purge execution control condition is established, the CPU 38 advances to S2502, where the CPU 38 determines whether "1" is stored in the purge idling determining flag (FPIDL) storing region in the RAM 40.

In the case that it is determined in S2502 that "0" is stored in the purge idling determination flag (FPIDL) storing region in the RAM 40, the CPU 38 determines that the internal combustion engine 1 is in the non-idling state, and advances to S2505. In S2505, the CPU 38 calculates the current engine revolution number variation: DLN at that time.

Subsequently, the CPU 38 advances to S2506, where the CPU 38 accesses to the first reference value control map in the ROM 39 to calculate the first reference value: DLNS1 corresponding to the number of engine revolution at that time. Then, the CPU 38 compares the engine revolution number variation: DLN calculated in S2505 with the first reference value: DLNS1.

In the case that it is determined in S2506 that the engine revolution number variation: DLN is equal to or smaller than the first reference value: DLNS1, the CPU 38 determines that the combustion state of the internal combustion engine 1 is stable, and advances to S2508.

In the case that it is determined in S2506 that the engine revolution number variation: DLN is greater than the first reference value: DLNS1, the CPU 38 determines that the combustion state of the internal combustion engine 1 is unstable, and advances to S2507. In S2507, the CPU 38 accesses to the combustion state identification flag (FDLN) storing region in RAM 40 and writes "1" therein.

In the case that the CPU 38 determines in S2506 that the engine revolution number variation: DLN is equal to or smaller than the first reference value: DLNS1, or after the CPU 38 terminates the execution of the processing of S2507, the CPU 38 advances to S2508 where the CPU 38 accesses to the combustion state identification flag (FDLN) storing region in the RAM 40 to judge whether "1" is stored therein.

In the case that it is determined in S2508 that "0" is stored in the combustion state identification flag (FDLN) storing region, the CPU 38 advances to S2509 where the CPU 38 sets the opening degree: DPG of the solenoid valve 34 to the maximum opening degree: MAXDPG, and applies, to the solenoid valve 34, a driving pulse signal corresponding to the maximum opening degree: MAXDPG.

In S2510, the CPU 38 reads out, from the predetermined region in the RAM 40, the predetermined voltage: SΔVP calculated at the last time, and adds the predetermined value: ΔVP to the predetermined voltage: SΔVP to calculate a new predetermined voltage: SΔVP (=SΔVP+VP).

In S2511, the CPU 38 sets the predetermined voltage: SΔVP calculated in S2510 as a new applied voltage: VP. Then, the CPU 38 applies the new applied voltage: VP to the positive pressure pump 51, and once terminates the execution of the present routine.

In this case, since the applied voltage of the positive pressure pump 51 is increased, and the pressure of the atmosphere sent out from the positive pressure pump 51 is increased, the differential pressure between the upstream portion and the downstream portion of the purge passage 46 is increased. As a result, the flow rate of atmosphere flowing through the charcoal canister 31 is increased and thus, the amount of evaporative fuel to be purged from the charcoal canister 31 to the intake pipe 18 is also increased.

On the other hand, in the case that it is determined in S2508 that "1" is stored in the combustion state identification flag (FDLN) storing region, the CPU 38 determines that the purge of the evaporative fuel has already been executed and that the combustion state of the internal combustion engine 1 is unstabilized by the purge, and advances to S2512.

In S2512, the CPU 38 determines whether the opening degree: DPG of the solenoid valve 34 at that time is smaller than the maximum opening degree: MAXDPG, that is, whether the opening degree: DPG of the solenoid valve 34 has already been corrected so as to stabilize the combustion state of the internal combustion engine 1.

In the case that it is determined in S2512 that the opening degree: DPG of the solenoid valve 34 is not smaller than the maximum opening degree: MAXDPG (DPG=MAXDPG), the CPU 38 advances to S2513, where the CPU 38 subtracts the predetermined amount: ΔDPG from the opening degree: DPG of the solenoid valve 34 at that time to calculate a new opening degree: DPG, and applies, to the solenoid valve 34, a driving pulse signal corresponding to this new opening degree: DPG.

At that time, since the solenoid valve 34 is closed by the predetermined value: ΔDPG, the flow path of the purge passage 46 is narrowed, the mount of evaporative fuel introduced from the charcoal canister 31 into the intake pipe 18 is reduced. As a result, the evaporative fuel to be supplied to the internal combustion engine 1 is reduced, and the engine revolution number variation of the internal combustion engine 1 is reduced.

In S2514, after the opening degree of the solenoid valve 34 is corrected to the closing direction, the CPU 38 calculates the engine revolution number variation: DLN, and accesses to the second reference value control map in the ROM 39 to calculate the second reference value: DLNS2 corresponding to the number of engine revolutions at that time. Then, the CPU 38 determines whether the engine revolution number variation: DLN is equal to or smaller than the second reference value: DLNS2, that is, whether the combustion state of the internal combustion engine 1 is stabilized by correcting the opening degree of the solenoid valve 34 to the closing direction.

In the case that it is determined in S2514 that the engine revolution number variation: DLN is equal to or smaller than the second reference value: DLNS2, the CPU 38 determines that the combustion state of the internal combustion engine 1 is stable, and advances to S2515.

In S2515, the CPU 38 adds the predetermined amount: K·ΔDPG to the opening degree: DPG of the solenoid valve 34 at that time to calculate a new opening degree: DPG (=DPG+K·ΔDPG). Then, in S2516 the CPU 38 determines whether the opening degree: DPG (=DPG+K·ΔDPG) calculated in S2515 is equal to or greater than the maximum opening degree: MAXDPG.

In S2516, if it is determined that the opening degree: DPG (=DPG+K·ΔDPG) calculated in S2515 is smaller than the maximum opening degree: MAXDPG, the CPU 38 applies, to the solenoid valve 34, a driving pulse signal corresponding to the opening degree: DPG calculated in S2515 and then, terminates the execution of the present routine.

In this case, since the solenoid valve 34 is opened by the predetermined amount: K·ΔDPG, the flow path of the purge passage 46 is slightly enlarged, and the amount of evaporative fuel to be introduced from the charcoal canister 31 into the intake pipe 18 is slightly increased.

In S2516, in the case that it is determined that the opening degree: DPG (=DPG+K·ΔDPG) calculated in S2515 is equal to or greater than the maximum opening degree: MAXDPG, the CPU 38 advances to S2517, where the CPU 38 determines that the maximum opening degree: MAXDPG is a new opening degree: DPG of the solenoid valve 34, and applies, to the solenoid valve 34, a driving pulse signal corresponding to the maximum opening degree: MAXDPG.

Subsequently, in S2518, the CPU 38 writes "0" in the combustion state identification flag (FDLN) storing region in the RAM 40, and terminates the execution of the present routine.

Thereafter, when the present routine is again executed, if the engine revolution number variation: DLN is equal to or smaller than the first reference value: DLNS1 in S2506, that is, if the combustion state of the internal combustion engine 1 is stable even after the opening degree: DPG of the solenoid valve 34 is changed to the maximum opening degree: MAXDPG, the CPU 38 determines in S2508 that "0" is stored in the combustion state identification flag (FDLN). Then, in S2509 to S2511, the CPU 38 again starts the update processing of the applied voltage of the positive pressure pump 51.

In the case that it is determined in S2514 that the engine revolution number variation: DLN is greater than the second reference value: DLNS2, the CPU 38 advances to S2519, where the CPU 38 corrects the opening degree: DPG of the solenoid valve 34 to the closing direction by the predetermined amount: ΔDPG, applies, to the solenoid valve 34, a driving pulse signal corresponding to the opening degree: DPG (=DPG−ΔDPG) after correction, and terminates the execution of the present routine.

Then, when the present routine is again executed, the CPU 38 determines in S2508 that "1" is stored in the combustion state identification flag (FDLN) storing region, and determines in S2512 that the opening degree: DPG of the solenoid valve 34 is not the maximum opening degree: MAXDPG.

Then, in S2514, the CPU 38 again compares the engine revolution number variation: DLN with the second reference value: DLNS2. If the engine revolution number variation: DLN is greater than the second reference value: DLNS2, the CPU 38 corrects the opening degree: DPG of the solenoid valve 34 by the predetermined value: ΔDPG(to the closing direction in S2519, and if the engine revolution number variation: DLN is equal to or smaller than the second reference value: DLNS2, the CPU 38 corrects the opening degree: DPG of the solenoid valve 34 by the predetermined value: K·ΔDPG in S2516 to S2518.

On the other hand, when a state of the internal combustion engine 1 is shifted from the non-idling state to the idling state during the execution of the purge, the CPU 38 determines in S2502 that "1" is stored in the purge idling determination flag (FPIDL) storing region. In this case, the CPU 38 returns the applied voltage: VP of the positive pressure pump 51 to the initial value (=ΔVP) in S2503 and then, writes "0" in the purge idling determination flag (FPIDL) storing region in the RAM 40 in S2504 and then, executes the processing in S2505 and thereafter.

That is, when the state of the internal combustion engine 1 is shifted from the non-idling state to the idling state during the execution of the purge, the CPU 38 once return the applied voltage of the positive pressure pump 51 to the initial value and then, controls the execution of the purge.

By repeatedly executing the purge execution control routine by the CPU 38, the purge amount of evaporative fuel becomes the maximum amount within a range in which the combustion state of the internal combustion engine 1 is not unstabilized. As a result, it is possible both to stabilize the combustion state and to secure the maximum purge amount at high level.

ELEVENTH EMBODIMENT

An eleventh embodiment of the evaporative fuel processing apparatus according to the present invention will be explained based on FIGS. 26 to 28.

In the tenth embodiment, it is dexcribed an example in which the differential pressure changing means is realized only by the positive pressure pump 51. In the present embodiment, it is described an example in which the differential pressure changing means is realized by using the throttle valve 20 and the positive pressure pump 51.

In this case, the CPU 38 roughly adjusts the purge amount by controlling the opening degree: TA of the throttle valve 20 while keeping the opening degree: DPG of the solenoid valve 34 at the constant opening degree (for example, the fully opening degree), and finely adjusts the purge amount by controlling the applied voltage: VP of the positive pressure pump 51.

Here, concrete control of the purge amount of present embodiment will be explained with reference to a timing chart in FIG. 26.

At the time when the purge execution condition is established, the CPU 38 calculates the engine revolution number variation: DLN and the first reference value: DLNS1, and determines whether the engine revolution number variation: DLN is equal to or smaller than the first reference value: DLNS1.

Figure 26:
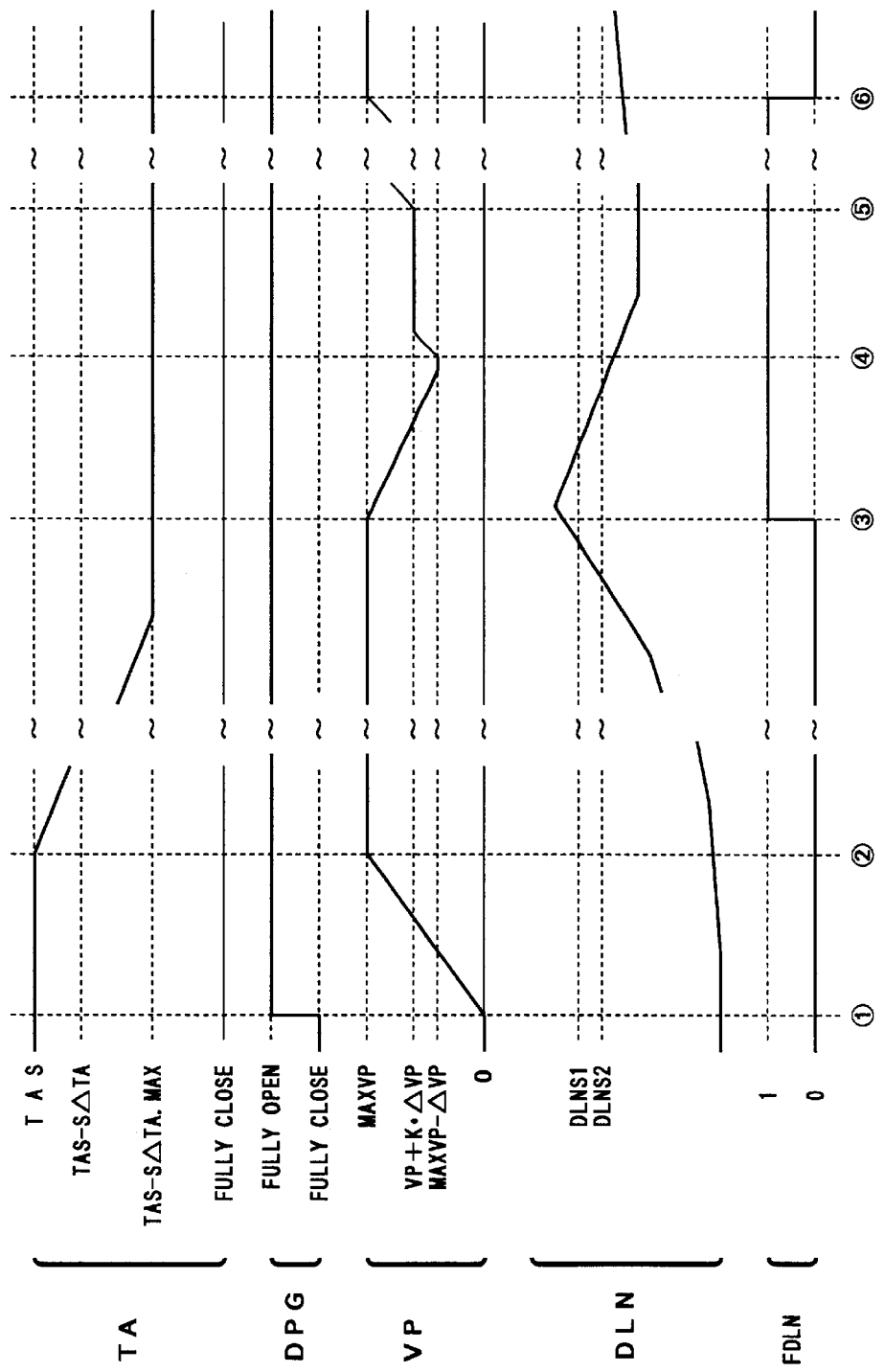
FIG. 26 is a timing chart (1) showing a purge execution control according to an eleventh embodiment.
Figure 27:
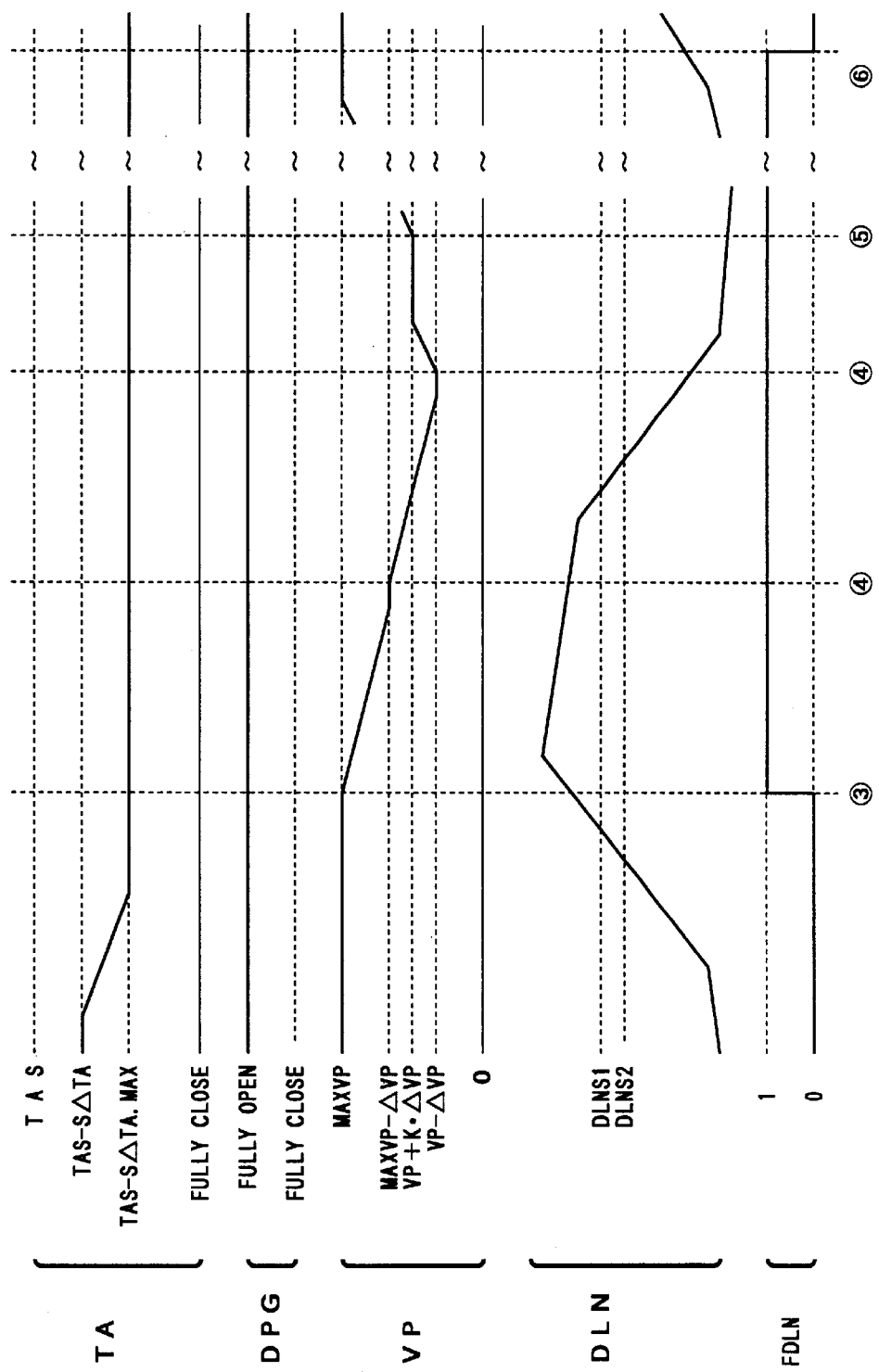
FIG. 27 is a timing chart (2) showing a purge execution control according to the eleventh embodiment.

In an example in FIG. 26, since the engine revolution number variation: DLN before the purge is started (on the left side of (1) in FIG. 26) is smaller than the first reference value: DLNS1, the CPU 38 determines that the combustion state of the internal combustion engine 1 is stable, and fully opens the solenoid valve 34, and applies, to the positive pressure pump 51, a voltage (maximum voltage: MAXVP) such that an atmosphere pumping pressure from the positive pressure pump 51 becomes maximum ((1) in FIG. 26).

At this time, a flow of atmosphere flowing through the charcoal canister 31 is generated due to the differential pressure between the pressure of atmosphere pumped out from the positive pressure pump 51 and the intake pipe negative pressure generated in the intake pipe 18. Due to this flow of atmosphere, the evaporative fuel in the charcoal canister 31 is introduced into the intake pipe 18, and the purge is started.

Subsequently, in order to increase the intake pipe negative pressure downstream the throttle valve 20, the CPU 38 changes the opening degree: TA of the throttle valve 20 to an opening degree (TAS−SΔTA) which is obtained by closing the standard opening degree: TAS by the predetermined opening degree: SΔTA ((2) in FIG. 26).

When the opening degree: TA of the throttle valve 20 is corrected to the closing direction by the predetermined opening degree: SΔTA, the amount of new air flowing into the intake pipe 18 downstream the throttle valve 20 and therefore, the degree of negative pressure of the intake pipe negative pressure is increased, and the differential pressure between the upstream portion and the downstream portion of the purge passage 46 is increased. As a result, the flow rate of atmosphere flowing through the charcoal canister 31 is increased, and the amount of evaporative fuel to be purged from the charcoal canister 31 to the intake pipe 18 is also increased.

On the other hand, when the amount of evaporative fuel to be introduced into the intake pipe 18 is increased, a state of mixture supplied to the combustion chamber 5 is changed, and the engine revolution number variation: DLN is increased as compared with that before the purge is executed. Therefore, the CPU 38 again calculates the engine revolution number variation: DLN after a predetermined time is elapsed from a time when the opening degree: TA of the throttle valve 20 is corrected to the closing direction by the predetermined opening degree: AΔTA, and compares the calculated engine revolution number variation: DLN with the first reference value: DLNS1.

At that time, if the engine revolution number variation: DLN is equal to or smaller than the first reference value: DLNS1, the CPU 38 updates the predetermined opening degree: SΔTA to further corrects the opening degree: TA of the throttle valve 20 by the predetermined amount: ΔTA, and to further increase the degree of negative pressure of the intake pipe negative pressure.

When the engine revolution number variation: DLN becomes greater than the first reference value: DLNS1 by the correction of the opening degree of the throttle valve 20 to the closing direction, ((3) in FIG. 26), the CPU 38 determines that the combustion state of the internal combustion engine 1 becomes unstable, and writes "1" in the combustion state identification flag (FDLN) storing region in the RAM 40.

Further, the CPU 38 stops the correction of the opening degree of the throttle valve 20 to the closing direction, and controls the actuator 21 such as to maintain the opening degree: TA (in the example in FIG. 26, TA=TAS−SΔTAMAX) of the throttle valve 20 at that time.

Then, in order to slightly reduce the purge amount of evaporative fuel, the CPU 38 reduces the applied voltage: VP of the positive pressure pump 51 by the predetermined amount: ΔVP. In this case, since the atmosphere pumping pressure of the positive pressure pump 51 is slightly reduced, the differential pressure between the upstream portion and the downstream portion of the purge passage 46 is also reduced slightly. As a result, the flow rate of atmosphere flowing through the charcoal canister 31 is slightly reduced, and the amount of evaporative fuel to be supplied from the charcoal canister 31 to the intake pipe 18 is also slightly reduced.

After the applied voltage: VP of the positive pressure pump 51 is reduced, the CPU 38 calculates the engine revolution number variation: DLN, and determines whether the calculated engine revolution number variation: DLN becomes equal to or smaller than the second reference value: DLNS2 ((4) in FIG. 26).

In the example of FIG. 26, since the engine revolution number variation: DLN becomes smaller than the second reference value: DLNS2 at the time point of (4) in FIG. 26, the CPU 38 determines that the combustion state of the internal combustion engine 1 is sufficiently stabilized, and slightly increase the applied voltage: VP of the positive pressure pump 51 so as to increase the purge amount of evaporative fuel. The amount of correction in this case is an amount obtained by multiplying the predetermined value: ΔVP by a positive number: K which is smaller than "1" (=K·ΔVP), and this amount of correction is smaller than the predetermined value: ΔVP. This processing is repeated as long as the engine revolution number variation: DLN is equal to or smaller than the second reference value: DLNS2 ((5) to (6) in FIG. 26).

When the applied voltage: VP reaches the maximum voltage: MAXVP by repeating the correction of the applied voltage: VP, the CPU 38 terminates the correction of the applied voltage, and accesses to the combustion state identification flag (FDLN) storing region in the RAM 40 to write "0" therein ((6) in FIG. 26). Then, the CPU 38 again starts the correction of the opening degree of the throttle valve 20 to the opening direction.

On the other hand, in the case that the engine revolution number variation: DLN did not become equal to or smaller than the second reference value: DLNS2 by the correction of the applied voltage:VP at the time point of (4) in FIG. 26, the CPU 38 further reduced the applied voltage: VP by the predetermined value: ΔVP as shown in a timing chart in FIG. 27.

The CPU 38 calculates the engine revolution number variation: DLN after a predetermined time is elapsed from a time when the applied voltage: VP is reduced by the predetermined value: ΔVP ((4)' in FIG. 27), and compares the calculated engine revolution number variation: DLN with the second reference value: DLNS2.

At that time, if the engine revolution number variation: DLN is greater than the second reference value: DLNS2, the CPU 38 further reduces the applied voltage: VP by the predetermined value: ΔVP. However, in the example of FIG. 27, since the engine revolution number variation: DLN becomes smaller than the second reference value: DLNS2 at the time point of (4)' in FIG. 27, the CPU 38 determines that the combustion state of the internal combustion engine 1 is sufficiently stabilized, and stepwisely increases the applied voltage: VP by the predetermined value: K·ΔVP.

Operations and effects of the present embodiment will be explained below.

Figure 28:
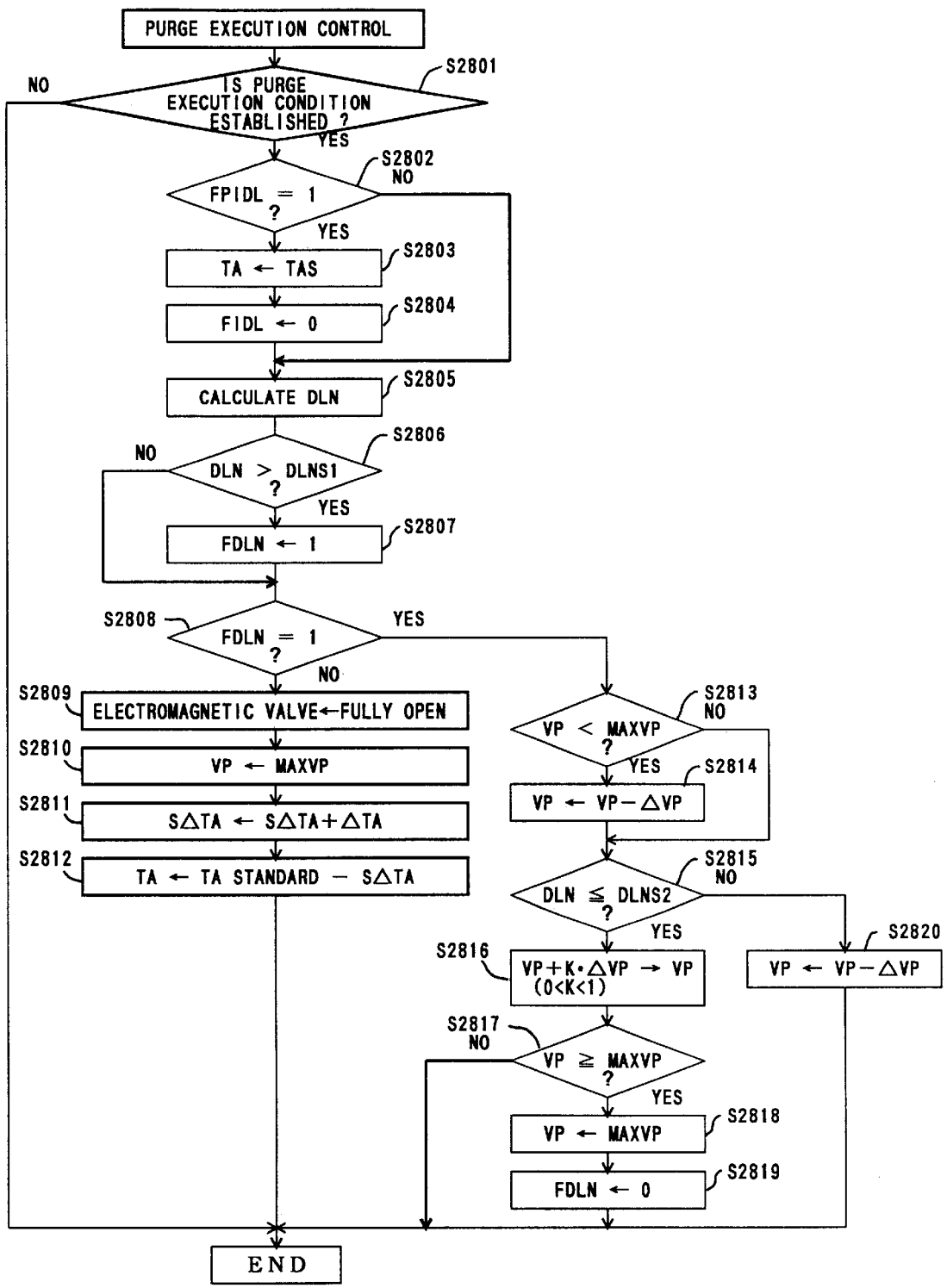
FIG. 28 is a flowchart showing a purge execution control routine according to the eleventh embodiment.

The CPU 38 executes the purge execution control routine shown in FIG. 28 every predetermined time. In this purge execution control routine, the CPU 38 determines in S2801 whether the purge execution condition is established. In the case that it is determined that the purge execution condition is not established, the CPU 38 terminates the execution of the present routine.

On the other hand, in the case that it is determined in S2801 that the purge execution condition is established, the CPU 38 advances to S2802, where the CPU 38 determines whether "1" is stored in the purge idling determination flag (FPIDL) storing region in the RAM 40.

In the case that it is determined in S2802 that "0" is stored in the purge idling determination flag (FPIDL) storing region, the CPU 38 determines that the internal combustion engine 1 is in the non-idling state, and advances to. S2805. In S2805, the CPU 38 calculates the engine revolution number variation: DLN at that time.

Subsequently, the CPU 38 advances to S2806, where the CPU 38 accesses to the first reference value control map in the ROM 39 to calculates the first reference value: DLNS1 corresponding to the number of engine revolutions at that time. Then, the CPU 38 compares the calculated engine revolution number variation: DLN with the first reference value: DLNS1.

In the case that it is determined in S2806 that the engine revolution number variation: DLN is equal to or smaller than the first reference value: DLNS1, the CPU 38 determines that the combustion state of the internal combustion engine 1 is stable, and advances to S2808.

In the case that it is determined in S2806 that the engine revolution number variation: DLN is greater than the first reference value: DLNS1, the CPU 38 determines that the combustion state of the internal combustion engine 1 is unstable, and advances to S2807. In S2807, the CPU 38 accesses to the combustion state identification flag (FDLN) storing region in RAM 40 to write "1" therein.

When the CPU 38 determines in S2806 that the engine revolution number variation: DLN is equal to or smaller than the first reference value: DLNS1, or when the CPU 38 terminates the execution of processing in S2807, the CPU 38 advances to S2808, where the CPU 38 determines whether "1" is stored in the combustion state identification flag (FDLN) storing region in the RAM 40.

In the case that it is determined in S2808 that "0" is stored in the combustion state identification flag (FDLN) storing region, the CPU 38 advances to S2809, where the CPU drives the solenoid valve 34 so as to fully open the same.

Next, in S2810, the CPU 38 sets the applied voltage: VP of the positive pressure pump 51 to the maximum voltage: MAXVP, and applies the maximum voltage: MAXVP to the positive pressure pump 51.

In this case, the atmosphere pumped from the positive pressure pump 51 flows to the upstream portion of the purge passage 46, and the intake pipe negative pressure generated in the intake pipe 18 downstream the throttle valve 20 is applied to the downstream portion of the purge passage 46. Therefore, a large differential pressure is generated between the upstream portion and the downstream portion of the purge passage 46, and a flow of atmosphere flowing through the charcoal canister 31 is generated. Due to this flow of atmosphere, the evaporative fuel adsorbed by the adsorbent in the charcoal canister 31 is separated from the adsorbent and introduced into the intake pipe 18.

Next, the CPU 38 advances to S2811 where the CPU 38 reads out the predetermined opening degree: SΔTA calculated at the last time from the predetermined region in the RAM 40, and adds the predetermined value:ΔTA to the predetermined opening degree: SΔTA to calculate a new predetermined opening degree: SΔTA (=SΔTA+ΔTA).

Subsequently, the CPU 38 advances to S2812, where the CPU 38 subtracts the predetermined opening degree: SΔTA calculated in S2811 from the standard opening degree: TAS to calculate a new opening degree: TA (=TAS−SΔTA) of the throttle valve 20. Then, the CPU 38 control the actuator 21 such that the actual opening degree of the throttle valve 20 coincides with the new opening degree: TA and once terminates the execution of the present routine In this case, since the throttle valve 20 is driven to the closing direction, and the amount of new air flowing into the intake pipe 18 downstream the throttle valve 20 is reduced, a degree of negative pressure of the intake pipe negative pressure is increased. Due to this, the differential pressure between the upstream portion and the downstream portion of the purge passage 46 is further increased, the flow rate of atmosphere flowing through the charcoal canister 31 is increased and therefore, the amount of evaporative fuel to be purged from the charcoal canister 31 to the intake pipe 18 is increased.

On the other hand, in the case that it is determined in S2808 that "1" is stored in the combustion state identification flag (FDLN) storing region in the RAM 40, the CPU 38 determines that the purge of the evaporative fuel has already been executed, and the combustion state of the internal combustion engine 1 becomes unstable due to the purge, and advances to S2813.

In S2813, the CPU 38 determines whether the applied voltage: VP of the positive pressure pump 51 at that time is smaller than the maximum voltage: MAXVP, that is, whether the applied voltage: VP has already been corrected to stabilize the combustion state of the internal combustion engine 1.

In the case that it is determined in S2813 that the applied voltage: VP of the positive pressure pump 51 at that time is not smaller than the maximum voltage: MAXVP (VP= MAXVP), the CPU 38 advances to S2814, where the CPU 38 subtracts the predetermined value: _¢VP from the applied voltage: VP (=MAXVP) at that time to calculate a new applied voltage: VP (=MAXVP−ΔVP), and applies the new applied voltage: VP to the positive pressure pump 51.

At that time, since the atmosphere pumping pressure of the positive pressure pump 51 is reduced, the differential pressure between the upstream portion and the downstream portion of the purge passage 46 is reduced, and the amount of evaporative fuel to be introduced from the charcoal canister 31 into the intake pipe 18 is reduced. As a result, the evaporative fuel to be supplied to the internal combustion engine 1 is reduced, and the engine revolution number variation of the internal combustion engine 1 is reduced.

In S2815, the CPU 38 calculates the engine revolution number variation: DLN after the applied voltage of the positive pressure pump 51 is corrected, and accesses to the second reference value control map in the ROM 39 to calculate the second reference value: DLNS2 corresponding to the number of engine revolutions at that time. Then, the CPU 38 determines whether the engine revolution number variation: DLN is equal to or smaller than the second reference value: DLNS2, that is, whether the combustion state of the internal combustion engine 1 is stabilized by the correction of the applied voltage: VP.

In S2815, in the case that it is determined that the engine revolution number variation: DLN is equal to or smaller than the second reference value: DLNS2, the CPU 38 determines that the combustion state of the internal combustion engine 1 is stable, and advances to S2816.

In S2816, the CPU 38 adds the predetermined value: K·ΔVP to the applied voltage: VP at that time to calculate a new applied voltage: VP (=VP+K·ΔVP).

In S2817, the CPU 38 determines whether the applied voltage: VP (=VP+K·ΔVP) calculated in S2816 is equal to or greater than the maximum voltage: MAXVP.

In the case that it is determined in S2817 that the applied voltage: VP (=VP+K·ΔVP) calculated in S2816 is smaller than the maximum voltage: MAXVP, the CPU 38 applies, to the positive pressure pump 51, the applied voltage: VP (=VP+K·ΔVP) calculated in S2816, and terminates the execution of the present routine.

In this case, the atmosphere pumping pressure of the positive pressure pump 51 is slightly increased, the flow rate in the purge passage 46 is also slightly increased, and the amount of evaporative fuel to be introduced from the charcoal canister 31 into the intake pipe 18 is also slightly increased.

In the case that it is determined in S2817 that the applied voltage: VP (=VP+KΔVP) calculated in S2816 is equal to or greater than the maximum voltage: MAXVP, the CPU 38 advances to S2818, where the CPU 38 determines that the maximum voltage: MAXVP is a new applied voltage: VP, and applies the maximum voltage: MAXVP to the positive pressure pump 51.

Subsequently, in S2819, the CPU 38 writes "0" in the combustion state identification flag (FDLN) storing region in the RAM 40, and terminates the execution of the present routine.

After that, when the present routine is again executed, if the engine revolution number variation: DLN is equal to or smaller than the first reference value: DLNS1 in S2806, that is, if the combustion state of the internal combustion engine 1 is stable even after the applied voltage of the positive pressure pump 51 is changed to the maximum voltage: MAXVP, the CPU 38 determines in S2808 that "0" is stored in the combustion state identification flag (FDLN) storing region. Then, the CPU 38 again starts the correction of the opening degree of the throttle valve 20 to the closing direction in S2809 to S2812.

In S2815, in the case that it is determined that the engine revolution number variation: DLN is greater than the second reference value: DLNS2, the CPU 38 advances to S2820, where the CPU 38 further reduce the applied voltage: VP of the positive pressure pump 51 by the predetermined value: ΔVP, and terminates the execution of the present routine.

Thereafter, in the case that the present routine is again executed, the CPU 38 determines in S2808 that "1" is stored in the combustion state identification flag (FDLN) storing region, and determines in S2813 that the applied voltage: VP is not the maximum voltage: MAXVP.

Then, the CPU 38 again compares the engine revolution number variation: DLN with the second reference value: DLNS2 in S2815, and if the engine revolution number variation: DLN is greater than the second reference value: DLNS2, the CPU 38 further reduces the applied voltage: VP by the predetermined value: ΔVP in S2820, and if the engine revolution number variation: DLN is equal to or smaller than the second reference value: DLNS2, the CPU 38 increases the applied voltage: VP by the predetermined value: K·ΔVP in S2816 to S2819.

When a state of the internal combustion engine 1 is shifted from the non-idling state to the idling state during the execution of the purge, the CPU 38 determines in S2802 that "1" is stored in the purge idling determination flag (FPIDL) storing region. In this case, in S2803 the CPU 38 drives the actuator 21 such that the opening degree: TA of the throttle valve 20 is returned to the standard opening degree: TAS, writes "0" in the purge idling determination flag (FPIDL) storing region in the RAM 40 in S2804 and then, executes the processing in S2805 and subsequent processing. That is, when the state of the internal combustion engine 1 is shifted from the non-idling state to the idling state during the execution of the purge, the CPU 38 once returns the throttle valve 20 to the standard opening degree: TAS and then, carries out the purge execution control.

As described above, even in the case that the differential pressure changing means is realized by using both the throttle valve 20 and the positive pressure pump 51, the same operations and effect as those of the seventh embodiment can be obtained.

In the seventh to eleventh embodiments, the CPU 38 may change the injection state of the fuel injection valve 9, for example, the amount of fuel injection, the fuel injection timing, the injection direction and the like when the differential pressure between the upstream portion and the downstream portion of the purge passage 46 is changed or the opening degree of the solenoid valve 34 is corrected. Further, the CPU 38 may change various predetermined values (TAS, ΔTA, ΔDPG, ΔVP) or various reference values (DLNS1, DLNS2) and the like using, as parameters, the concentration of evaporative fuel, the operating state of the engine (amount of intake air, number of engine revolutions, engine load) and the like.

What is claimed is:

1. An evaporative fuel processing apparatus for a lean-burn internal combustion engine, comprising;

the lean-burn internal combustion engine capable of burning a mixture excessively containing oxygen;

a purge passage for introducing an evaporative fuel generated in a fuel tank provided in parallel to the lean-burn internal combustion engine into an intake system of the lean-burn internal combustion engine, the purge passage including a portion upstream of a throttle valve and a portion downstream of the throttle valve, the downstream portion connected between a fuel canister and the intake pipe;

evaporative fuel amount changing means for changing an amount of evaporative fuel to be purged by the purge passage based on at least a state of the lean-burn internal combustion engine; and differential pressure changing means for changing a differential pressure between the upstream portion and the downstream portion of the purge passage in accordance with the amount of evaporative fuel to be purged.

2. An evaporative fuel processing apparatus for a lean-burn internal combustion engine, comprising:

the lean-burn internal combustion engine capable of burning a mixture excessively containing oxygen;

a purge passage for introducing an evaporative fuel generated in a fuel tank provided in parallel to the lean-burn internal combustion engine into an intake system of the lean-burn internal combustion engine, the purge passage including a portion upstream of a throttle valve and a portion downstream of the throttle valve, the downstream portion connected between a fuel canister and the intake pipe;

evaporative fuel amount calculating means for calculating an amount of required evaporative fuel to be introduced into the intake system based on a state of the fuel tank and a state of the lean-burn internal combustion engine; and differential pressure changing means for changing a differential pressure between the upstream portion and the downstream portion of the purge passage in accordance with the amount of required evaporative fuel.

3. An evaporative fuel processing apparatus for a lean-burn internal combustion engine according to claim 2, wherein the differential pressure changing means is activated when the amount of required evaporative fuel exceeds a predetermined amount, and changes the differential pressure between the upstream portion and the downstream portion of the purge passage.

4. An evaporative fuel processing apparatus for a lean-burn internal combustion engine according to claim 2, wherein the differential pressure changing means determines an amount of change of the differential pressure in accordance with an operating state.

5. An evaporative fuel processing apparatus for a lean-burn internal combustion engine according to claim 2, wherein the differential pressure changing means adjusts an opening degree of a throttle valve provided in the intake system, and changes the differential pressure between the upstream portion and the downstream portion of the purge passage.

6. An evaporative fuel processing apparatus for a lean-burn internal combustion engine according to claim 2, wherein the differential pressure changing means controls an operating state of a supercharger provided in the intake system, and changes the differential pressure between the upstream portion and the downstream portion of the purge passage.

7. An evaporative fuel processing apparatus for a lean-burn internal combustion engine according to claim 2, wherein the differential pressure changing means selectively controls a throttle opening degree of a throttle valve provided in the intake system and an operating state of a supercharger provided in the intake system, and changes the differential pressure between the upstream portion and the downstream portion of the purge passage.

8. An evaporative fuel processing apparatus for a lean-burn internal combustion engine, comprising:

the lean-burn internal combustion engine capable of burning a mixture excessively containing oxygen;

a purge passage for introducing an evaporative fuel generated in a fuel tank provided in parallel to the lean-burn internal combustion engine into an intake passage of the lean-burn internal combustion engine, the purge passage including a portion upstream of a throttle valve and a portion downstream of the throttle valve, the downstream portion connected between a fuel canister and the intake pipe;

a flow rate control valve for adjusting a flow rate of the purge passage;

combustion state determining means for determining whether a combustion state of the lean-burn internal combustion engine is stable when a purge of the evaporative fuel is executed;

differential pressure changing means for changing a differential pressure between the upstream portion and the downstream portion of the purge passage; and purge control means for controlling at least the differential pressure changing means in accordance with the combustion state of the lean-burn internal combustion engine to adjust an amount of evaporative fuel to be introduced from the purge passage into the intake passage.

9. An evaporative fuel processing apparatus for a lean-burn internal combustion engine according to claim 8, wherein the purge control means control the differential pressure changing means so as to increase the differential pressure between the upstream portion and the downstream portion of the purge passage as long as the combustion state of the lean-burn internal combustion engine is stable, thereby increasing the amount of evaporative fuel to be introduced from the purge passage into the intake passage.

10. An evaporative fuel processing apparatus for a lean-burn internal combustion engine according to claim 8, wherein, when the combustion state determining means determines that the combustion state is unstable when the purge of the evaporative fuel is executed, the purge control means controls the differential pressure changing means so as to reduce the differential pressure between the upstream portion and the downstream portion of the purge passage, thereby reducing the amount of evaporative fuel to be introduced from the purge passage into the intake passage.

11. An evaporative fuel processing apparatus for a lean-burn internal combustion engine according to claim 8, wherein, if the combustion state determining means determines that the combustion state is unstable when the purge of the evaporative fuel is executed, the purge control means controls the differential pressure changing means so as to maintain the current differential pressure between the upstream portion and the downstream portion of the purge passage, thereby correcting an opening degree of the flow rate control valve by a predetermined amount to the closing direction.

12. An evaporative fuel processing apparatus of a lean-burn internal combustion engine according to claim 11, wherein, when the combustion state determining means determines that the combustion state is stable after the opening degree of the flow rate control valve has been corrected to the closing direction, the purge control means corrects the opening degree of the flow rate control valve by an correction amount smaller than the predetermined amount to the opening direction.

13. An evaporative fuel processing apparatus for a lean-burn internal combustion engine according to claim 11, wherein, when the combustion state determining means determines that the combustion state is unstable after the opening degree of the flow rate control valve is corrected to the closing direction, the purge control means controls the differential pressure changing means so as to reduce the differential pressure between the upstream portion and the downstream portion of the purge passage.

14. An evaporative fuel processing apparatus for a lean-burn internal combustion engine according to claim 8, wherein, when the combustion state determining means determines that the combustion state is unstable when the purge of the evaporative fuel is executed, the purge control means controls the flow rate control valve to maintain the opening degree at that time, and controls the differential pressure changing means so as to reduce the differential pressure between the upstream portion and the downstream portion of the purge passage.

15. An evaporative fuel processing apparatus for a lean-burn internal combustion engine according to claim 14, wherein, when the combustion state determining means determines that the combustion state is stable after the differential pressure between the upstream portion and the downstream portion of the purge passage is reduced, the purge control means corrects the opening degree of the flow rate control valve by a predetermined amount to the opening direction.

16. An evaporative fuel processing apparatus for a lean-burn internal combustion engine according to claim 14, wherein, when the combustion state determining means determines that the combustion state is unstable after the differential pressure between the upstream portion and the downstream portion of the purge passage is reduced, the purge control means controls the differential pressure changing means so as to further reduce the differential pressure between the upstream portion and the downstream portion of the purge passage.

17. An evaporative fuel processing apparatus for a lean-burn internal combustion engine according to claim 8, wherein the differential pressure changing means is a throttle valve for adjusting a flow rate of intake air of the intake passage, and is controlled such that a first opening degree which is a substantially fully opened state is maintained in a normal operating region and that a second opening degree which is closed narrower than the first opening degree is established when the purge is executed.

18. An evaporative fuel processing apparatus for a lean-burn internal combustion engine according to claim 8, wherein the purge control means controls the differential pressure changing means so as to return the differential pressure between the upstream portion and the downstream portion of the purge passage into a normal differential pressure when the operating state of the internal combustion engine is changed.

19. An evaporative fuel processing apparatus for a lean-burn internal combustion engine according to claim 8, wherein the differential pressure changing means is a positive pressure pump for pumping atmosphere having a desired pressure from the upstream portion of the purge passage to the downstream portion.

* * * * *